(12) United States Patent
Agasti et al.

(10) Patent No.: US 10,235,710 B2
(45) Date of Patent: Mar. 19, 2019

(54) SYSTEMS AND METHODS FOR SCANNING ITEMS AND DELIVERY TO FITTING ROOM

(71) Applicant: Sears Brands, LLC, Hoffman Estates, IL (US)

(72) Inventors: Varun Reddy Agasti, Schaumburg, IL (US); Leena Munjal, Algonquin, IL (US); Tara Stewart, McHenry, IL (US); Scott Multer, Chicago, IL (US); Catherine Michalski, Wauconda, IL (US); Mark Mahurin, La Grange, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 809 days.

(21) Appl. No.: 13/926,383

(22) Filed: Jun. 25, 2013

(65) Prior Publication Data

US 2014/0379532 A1 Dec. 25, 2014

(51) Int. Cl.
*G06Q 30/00* (2012.01)
*G06Q 30/06* (2012.01)

(52) U.S. Cl.
CPC ..... *G06Q 30/0641* (2013.01); *G06Q 30/0643* (2013.01)

(58) Field of Classification Search
CPC .............. G06Q 30/00; G06Q 30/0601; G06Q 30/0607; G06Q 30/0633; G06Q 30/0641
See application file for complete search history.

(56) References Cited

U.S. PATENT DOCUMENTS

| 4,473,373 A * | 9/1984 | Weiss ...................... D06F 93/00 209/702 |
| 8,401,915 B1 | 3/2013 | Kim |
| 8,403,215 B2 | 3/2013 | Aihara et al. |
| 2005/0010475 A1* | 1/2005 | Perkowski ............. G06Q 30/02 705/14.51 |
| 2005/0055361 A1 | 3/2005 | Deal |

(Continued)

OTHER PUBLICATIONS

Burke, Raymond R. "Technology and the customer interface: what consumers want in the physical and virtual store." Journal of the academy of Marketing Science 30.4 (2002): 411-432. (Year: 2002).*

(Continued)

*Primary Examiner* — Christopher B Seibert
(74) *Attorney, Agent, or Firm* — McAndrews, Held & Malloy, Ltd.

(57) ABSTRACT

A method for scan, try and/or buy may include receiving, from a mobile device, information that is representative of a clothing outfit. The clothing outfit may include a plurality of merchandise items available for purchase through a store. The information may be obtained by the mobile device by scanning a single code associated with the clothing outfit. The obtained information may be used to cause at least one user interface element associated with the clothing outfit to be displayed on the mobile device. In response to receiving a selection from the mobile device of the at least one user interface element, the plurality of merchandise items associated with the clothing outfit may be delivered to a merchandise check-out location within the store. The merchandise check-out location may be operable to receive payment from the user for the clothing outfit.

20 Claims, 63 Drawing Sheets

(56) References Cited

U.S. PATENT DOCUMENTS

| | | | |
|---|---|---|---|
| 2005/0203810 A1 | 9/2005 | Listenberg | |
| 2006/0004592 A1* | 1/2006 | Faith | A47F 10/00 345/173 |
| 2007/0138268 A1 | 6/2007 | Tuchman | |
| 2010/0030663 A1 | 2/2010 | Wannier et al. | |
| 2011/0258059 A1 | 10/2011 | Fowler | |
| 2012/0085828 A1* | 4/2012 | Ziegler | G09F 3/0335 235/493 |
| 2012/0101876 A1* | 4/2012 | Turvey | G06Q 30/02 705/14.1 |
| 2012/0303154 A1* | 11/2012 | Stiernagle | G07F 9/023 700/214 |
| 2013/0046648 A1* | 2/2013 | Calman | G06Q 30/08 705/26.3 |
| 2013/0218721 A1* | 8/2013 | Borhan | G06Q 20/322 705/26.41 |
| 2014/0244442 A1* | 8/2014 | Hirsch | 705/26.62 |
| 2015/0073907 A1* | 3/2015 | Purves | G06Q 20/32 705/14.58 |
| 2016/0012465 A1* | 1/2016 | Sharp | G06Q 20/18 705/14.17 |
| 2017/0316656 A1* | 11/2017 | Chaubard | G07G 1/0045 |

OTHER PUBLICATIONS

Bianca London, That's one way to get Top Gear! Futuristic fashion car scans stylish pedestrians, buys their clothes and has them delivered to the vehicle . . . before turning itself into a changing room, Mail Online, http://www.dailymail.co.uk/femail/article-2292135/Top-gear-New-shopping mobile from Zanando scans stylish pedestrians, Mar. 12, 2013, 10 pages.

Jennifer Bergen, Korea's Tesco reinvents grocer shopping with QR-code "stores", Geek Newsletter, http://www.geek.com/mobile/koreas-tesco-reinvents-grocery-shopping-with QR-code stores, Jun. 28, 2011, 4 pages.

Canadian Intellectual Property Office, Requisition by Examiner, in Application No. 2,853,035 dated Sep. 30, 2016 (7 pages).

Canadian Intellectual Property Office, Requisition by Examiner, in Application No. 2,853,035 dated Aug. 9, 2017 (6 pages).

* cited by examiner

A mannequin can have a complete outfit on a sales floor. A member can scan the QR code on the mannequin and try or buy the entire outfit...

Once the member decides they need to try it on they would get the next screen to choose the size and color before the products are delivered to them.

Once the product is added to the Trial list they can still choose to move forward with the trial, Buy the products or Add more products to the list.

If the member chooses to try it on the experience will be similar to the customer facing application.

In addition the tablet application can have the mannequin looks available for the member to choose from since they cannot scan the QR codes..

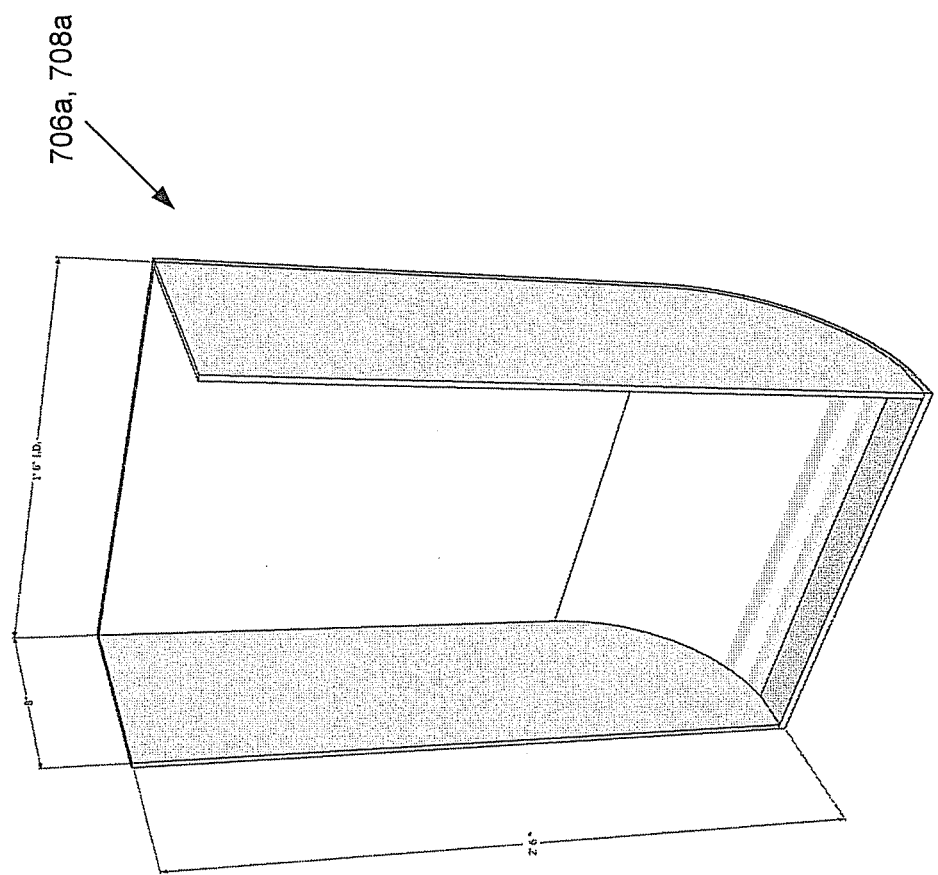

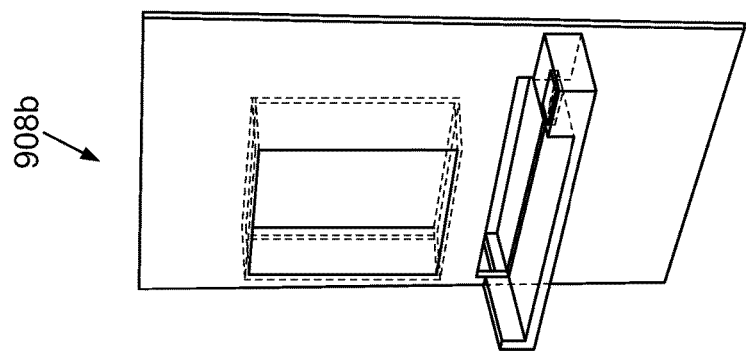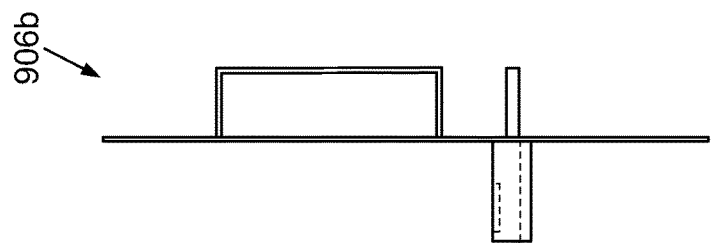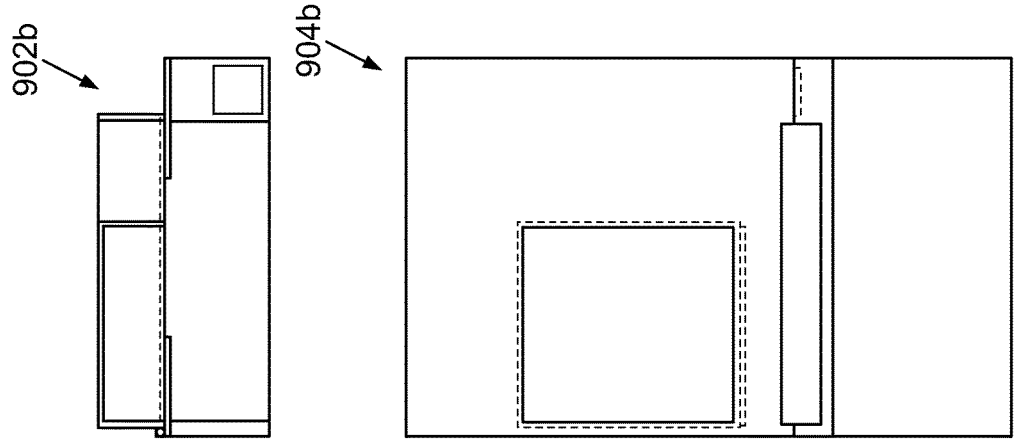
FIG. 9B

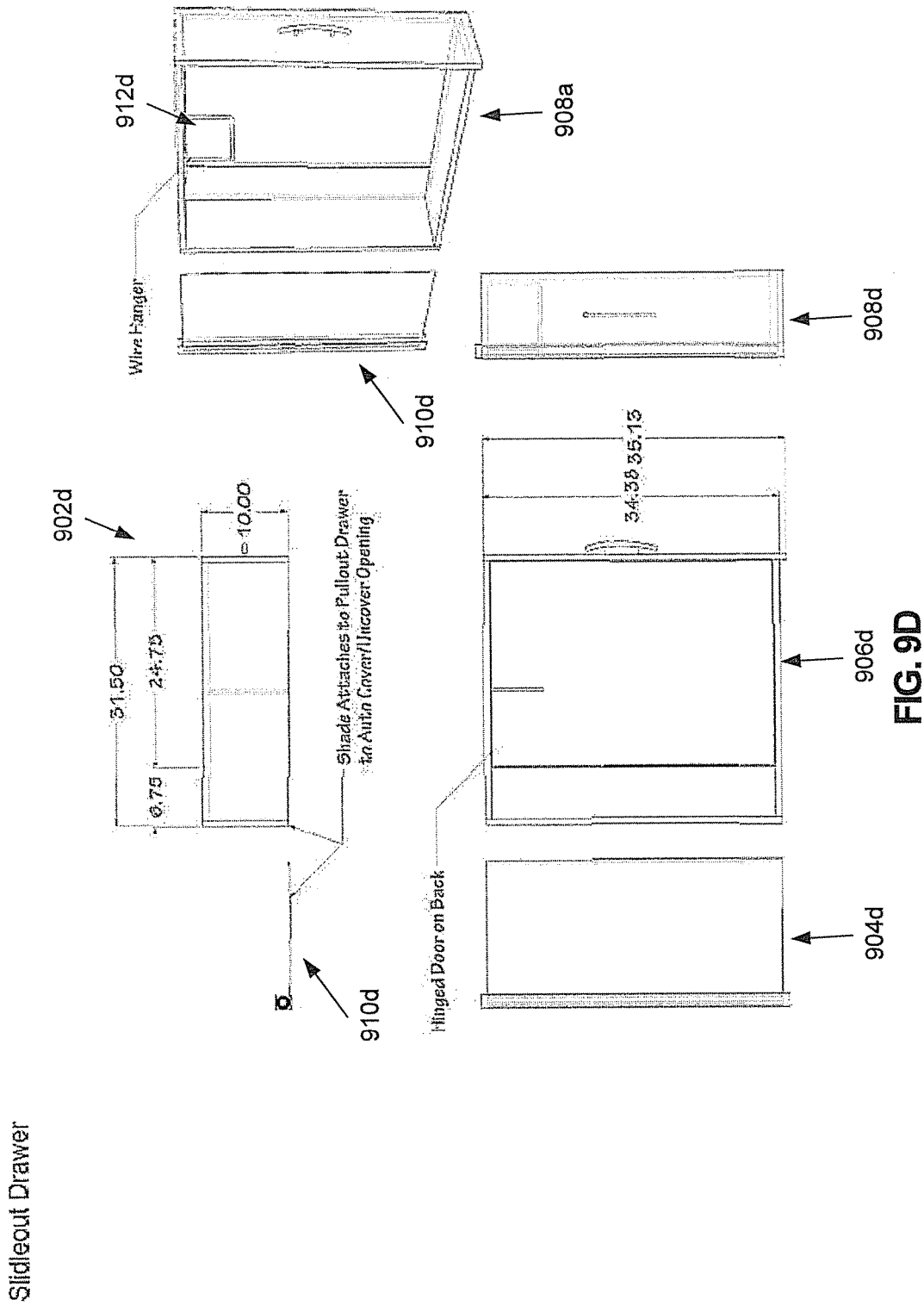

SYSTEMS AND METHODS FOR SCANNING ITEMS AND DELIVERY TO FITTING ROOM

FIELD OF THE DISCLOSURE

The subject disclosure relates generally to retail systems and, more particularly, relates to systems and methods for scan, try and buy.

BACKGROUND

Conventional retail stores are constantly increasing their inventory of items available for sale to customers. For example, a clothing section in a retail store may stock a certain model of clothing (e.g., a pair of jeans), and then display a variety of sizes and colors for the given style. However, the great variety of items that are stocked and displayed inside the store reduces the open floor space, which results in slow customer flow, lower number of fitting rooms and difficulty managing the displayed and warehoused items inventory.

Further limitations and disadvantages of conventional and traditional approaches will become apparent to one of skill in the art, through comparison of such approaches with some aspects of the present method and apparatus set forth in the remainder of this disclosure with reference to the drawings.

SUMMARY

A system and/or method is disclosed for providing a scan, try and/or buy experience, substantially as shown in and/or described in connection with at least one of the figures, as set forth more completely in the claims.

These and other advantages, aspects and features of the present disclosure, as well as details of illustrated implementation(s) thereof, will be more fully understood from the following description and drawings.

BRIEF DESCRIPTION OF THE DRAWINGS

FIGS. 3Y-3EE illustrates an example check-out area and example check-out functionalities, which may be used during a "scan, try and/or buy" experience, in accordance with an example embodiment of the disclosure.

FIGS. 7A-7E illustrate various views of an example second fitting rooms design using item delivery and item return chutes, which may be used in accordance with an example embodiment of the disclosure.

FIGS. 7F-7I illustrate various views of an example product floor space arrangement using the fitting rooms design of FIGS. 7A-7E, in accordance with an example embodiment of the disclosure.

FIGS. 9A-9D illustrate various views of a fourth fitting room design, which may be used in accordance with an example embodiment of the disclosure.

DETAILED DESCRIPTION

Figure 1:
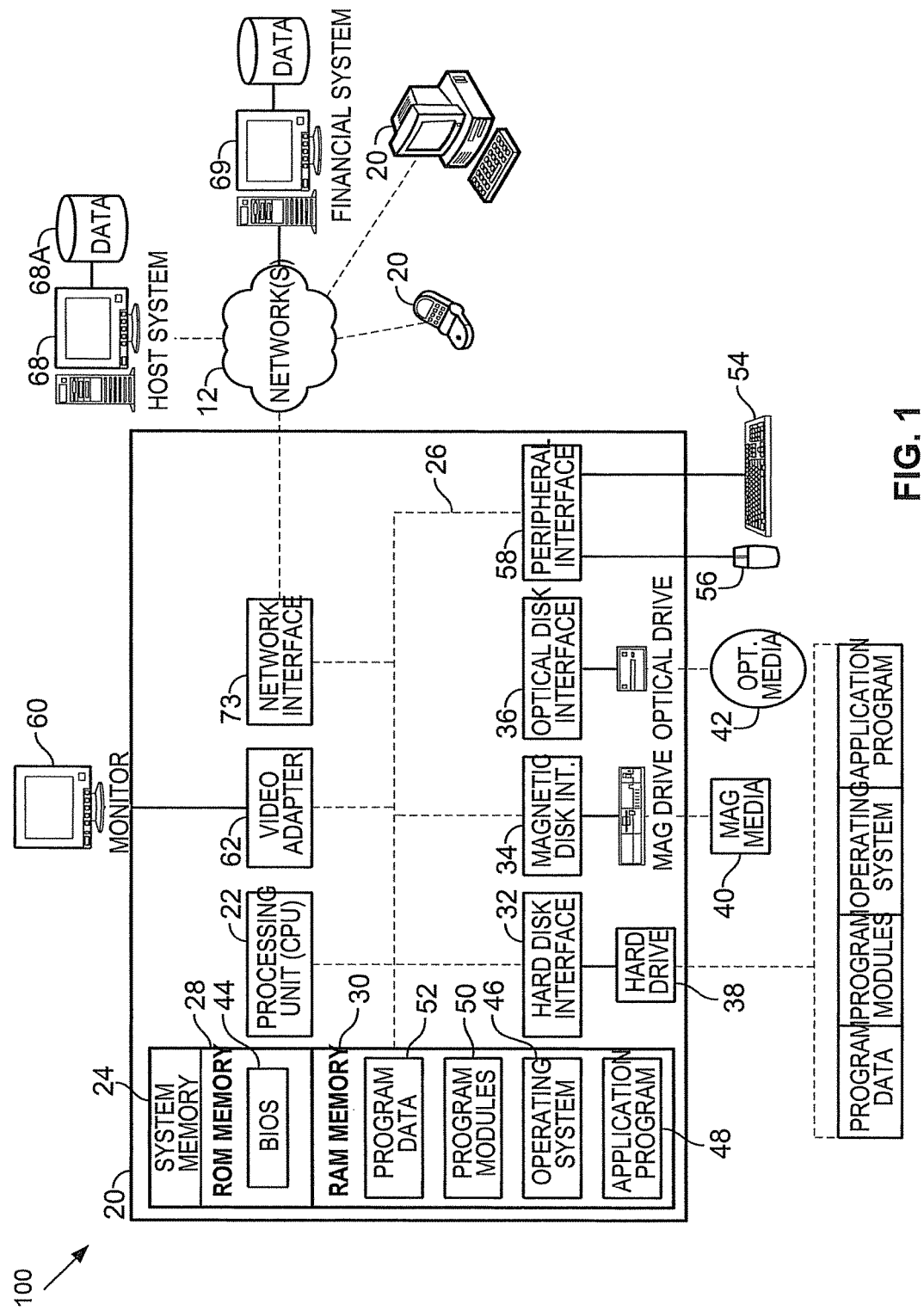
FIG. 1 is a block diagram illustrating an example retail, computer network environment for providing scan, try and/or buy experience, in accordance with an example embodiment of the disclosure.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

The present disclosure relates to systems and methods for providing scan, try and/or buy experiences, which may utilize new retail store floor space design for show-rooming products and mobile interaction with products (e.g., scanning a product tag using a mobile device application to initiate and complete a scan, try and/or buy experience). The mobile interaction with the products may also improve product inventory management in a micro-warehouse and provide product delivery directly to a fitting room, store check-out area or a shipping address of a customer, ensuring fulfillment of product either in-store or via online delivery. A description of various "scan, try and/or buy" experience embodiments is provided herein below.

In accordance with an example embodiment of the disclosure, products may be displayed within a store and a customer may use a personal computing device (e.g., a smart phone) running an application ("app") to scan a product tag (e.g., a UPC, a QR code or a NFC tag). The app may then initiate the capability of selecting the right variant of the product and create a shopping list. Once the customer has their shopping list created, they can try and/or buy the product. If the customer decides to try the product, a fitting room will be assigned to the customer and displayed on the customer device. Once the customer enters the fitting room, they will have the scanned product(s) on their list delivered to them via a chute/delivery mechanism (e.g., automatic and/or manual chute delivery mechanism). The customer may try one or more of the scanned products and discard the ones that they don't like (e.g., via a separate return chute inside the fitting room). The discarded product(s) may be added back into the inventory of the store's micro-warehouse.

In instances when the customer is certain of the product and there is no need to try, a "scan & buy" experience (or "Grab and Go") may be used, where the product may be scanned by the customer using the customer device, product options may be selected via the customer device, and product delivery directly to a store check-out area may take place for the customer to complete a check-out and leave the store with the product. If the desired size and/or color is not available in the store, the correct product may be shipped directly to a customer's shipping address after the check-out and payment process is complete. If the selected product is an "online only" or a "catalog-only" product (e.g., a product not stocked/purchased by the store, where such product may be displayed inside the store and may be available for purchase at the store and shipment directly to customer's shipping address), the customer may use the "scan & buy" experience and have the product shipped directly to their home (e.g., product may be shipped directly from the manufacturer to the customer). In some instances, the product hang tags may also have Augmented Reality ("AR") functionality embedded in the tags so that additional product information, product reviews, instructional videos, photos/views, and other product-related information may be provided to the customer (e.g., displayed on the customer device) when the product tag is scanned.

In accordance with an example embodiment of the disclosure, a customer is able to shop for an outfit (a collection of items forming the outfit), where the outfit is displayed at the store (e.g., on a mannequin) and the outfit is associated with a single tag (e.g., a single tag located on or at the mannequin displaying the outfit). By scanning the single tag placed on or at the mannequin displaying the desired outfit, a list of the products forming the outfit may be automatically added to an electronic or e-commerce shopping cart (associated with the customer), as well as displayed at the customer device (in the electronic shopping cart or otherwise). After the scan of the single tag is complete, the user may select a TRY functionality, which may cause all items from the outfit to be automatically delivered to a fitting room (giving the user the option to discard or select for buying one or more of the items in the outfit). After trying the outfit in a fitting room, the customer may select BUY functionality and the outfit would be delivered to a store check-out location, where it may be packed and waiting for customer payment and pick up. In lieu of trying the outfit, the customer may select the BUY functionality without the need for trying any of the outfit items. In this instance, the outfit may be delivered (e.g., manually by a store associate or via an automatic delivery chute or other delivery mechanism) to a store check-out location, where it may be packed and waiting for customer payment and pick up. As an alternative, the customer may select the BUY functionality and after payment at a store check-out location, the items in the outfit may be shipped directly to a customer's designated shipping location.

In accordance with an example embodiment of the disclosure and in instances when one or more of the above "scan, try and/or buy" experiences are utilized, a "single code check-out" process may be utilized for checking out items selected for purchase by the customer. More specifically, a customer may use a computing device (e.g., a smart phone running an app supplied by the retail store for use during any of the above mentioned experiences) to scan a plurality of items for purposes of trying and then buying (or buying without trying) the items. When the customer has finalized the list of items for purchase and is ready for check-out, the customer's device may generate a single code (e.g., a QR code or a UPC) which, when presented at check-out, may be scanned by another computing device (e.g., a check-out scanner or associate mobile device) used by, e.g., a store cashier. Upon scanning the single code from the customer device, the list of desired items (and associated items attributes, such as quantity, color, model, payment method preference, shipping/pick-up preference, etc.) may be loaded (e.g., from the customer's device and/or from a store server maintaining the customer's shopping list in a shopping profile associated with the customer) into the cashier's computing device. The cashier may then perform a check-out by accepting a payment from the customer for the items on the list, and release the items on the list for shipment to, and/or pick-up by, the customer.

In accordance with an example embodiment of the disclosure, during any of the above experiences, a customer may add products to a shopping list (or an electronic or e-commerce shopping cart). Some products in the shopping list may be designated for trying in a fitting room, and remaining products may be designated for shipment to (or pick-up by) the customer without the need for trying. In instances when the product is unavailable (e.g., desired size/color/model is unavailable), the product may be automatically designated for shipment by the retailer (e.g., upon stock availability and without any charge to the customer).

FIG. 1 is a block diagram illustrating an example retail, computer network environment for providing scan, try and/or buy experience, in accordance with an example embodiment of the disclosure. Referring to FIG. 1, the retail, computer network environment 100 may comprise a processing device 20 and a vendor system server (or a host) 68, which may be associated with a retailer. The processing device 20 may comprise a computing device such as a smart phone, a mobile phone, a tablet and/or other mobile or computing devices, which may be operable to run one or more applications (or apps) for implementing at least one functionality in connection with one or more of the "scan, try and/or buy" experiences described herein.

The host 68 may comprise suitable circuitry, logic and/or code and may be implemented as one or more network servers, which may be operable to implement an online retail channel of a retailer (e.g., one or more online stores of the retailer, where customers may shop for items and/or services sold by the retailer using one or more web sites of the retailer). The host 68 may also be operable to host a shopping profile of one or more customers, where the shopping profile can specify one or more shopping preferences, shipping preferences, payment preferences and other preferences of the customer associated with shopping at the online retail channel or at a conventional store of the retailer during, e.g., one or more of the "scan, try and/or buy" experiences described herein. Additionally, the host 68 may be operable to run one or more applications (or apps) for implementing functionality in connection with one or more of the "scan, try and/or buy" experiences described herein.

Those of ordinary skill in the art will appreciate that the processing device 20 illustrated in FIG. 1 may be embodied in any device having the ability to execute instructions, such as, by way of example, a personal computer, mainframe computer, personal-digital assistant ("FDA"), cellular telephone, a smart phone, a tablet, a laptop, or the like. Furthermore, while described and illustrated in the context of a single processing device 20, those of ordinary skill in the art will also appreciate that the various tasks described hereinafter may be practiced in a distributed environment having multiple processing devices linked via a wired and/or wireless local (LAN) or wide-area network (WAN), whereby the executable instructions may be associated with and/or executed by one or more of multiple processing devices.

For performing the various tasks in accordance with the executable instructions, the processing device 20 may include a processing unit 22 and a system memory 24, which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those of ordinary skill in the art will further appreciate that other types of non-transitory computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories and memory devices.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more application programs 48 (such as a Web browser), other program modules 50, and/or program data 52. Still further, computer-executable instructions may be downloaded to one or more of the computing devices as needed, for example via a network connection. Generally, the computer executable instructions may reside in program modules, which may include routines, programs, objects, components, data structures, etc. that perform particular tasks or implement particular abstract data types.

To allow a user to enter commands and information into the processing device 20, input devices such as a keyboard 54 and/or a pointing device 56 may be provided. While not illustrated, other input devices may include a microphone, a joystick, a game pad, a scanner, a camera, etc. These and other input devices may be connected to the processing unit 22 by means of an interface 58 which, in turn, may be coupled to the bus 26. Input devices may be connected to the processor 22 using interfaces such as, for example, a parallel port, game port, FireWire, or a universal serial bus (USB). To view information from the processing device 20, a monitor 60 (e.g., a touch screen monitor) or other type of display device may also be connected to the bus 26 via an interface, such as a video adapter 62. In addition to the monitor 60, the processing device 20 may also include other peripheral output devices, not shown, such as speakers and/or printers.

The processing device 20, illustrated in the exemplary form of a computer system, is provided with executable instructions to, for example, implement functionality in connection with one or more of the "scan, try and/or buy" experiences described herein. The executable instructions may provide a means (e.g., one or more user interfaces in a web page) for a consumer, e.g., a user, customer, etc., to scan one or more product tags of products displayed in a retail store, create a list of the products associated with the scanned tags, designate one or more of the products for trying and/or buying, generate a single code associated with the items that will be purchased at check-out, and other functionalities described herein.

As noted, the processing device 20 may also utilize logical connections to one or more remote processing devices, such as the vendor system server 68 having associated data repository 68A. In this regard, while the vendor system server 68 has been illustrated in the exemplary form of a computer, it will be appreciated that the vendor system server 68 may, like processing device 20, be any type of a computing device having processing capabilities. Again, it will be appreciated that the vendor system server 68 need not be implemented as a single device but may be implemented in a manner such that the tasks performed by the vendor system server 68 are distributed amongst a plurality of processing devices/databases located at different geographical locations and linked through a wired and/or wireless communication network. Additionally, the vendor system server 68 may have logical connections to other third party systems (e.g., 69) via the network 12 and, via such connections, will be associated with data repositories that are associated with such other third party systems. Such third party systems 69 may include, without limitation, systems of banking, credit, or other financial institutions, systems of third party providers of goods and/or services, systems of shipping/delivery companies, etc.

For performing tasks as needed, the vendor system server 68 may include many or all of the elements described above relative to the processing device 20 and the "scan, try and/or buy" experiences implementation and associated functionalities. In addition, the vendor system server 68 may include executable instructions for, among other things, manage an e-commerce profile of a customer associated with one or more of the "scan, try and/or buy" functionalities described herein. The executable instructions may provide a means (e.g., using an app running on a computing device) for a consumer, e.g., a user, customer, etc., to be able to scan one or more product tags of products displayed at a retail location (or in online catalog) and create a list of the scanned products stored in a customer profile managed by the vendor system server 68. The list of the scanned products may then be used during implementing one or more of the "scan, try and/or buy" functionalities described herein (e.g., designate a product for trial in a fitting room, designate a product for purchase after trying it or without trying it, designate which products in the list will be tried and which will be purchased without trying, designate which products will be shipped to a customer address and which products will be picked up at a check-out location within the store, etc.).

Communications between the processing device 20 and the vendor system server 68 may be exchanged via a further processing device, such as a network router 72, which may be responsible for network routing. Communications with the network router 72 may be performed via a network interface component 73. Thus, within such a networked environment, e.g., the Internet, World Wide Web, LAN, or other similar type of wired and/or wireless network, it will be appreciated that program modules depicted relative to the processing device 20, or portions thereof, may be stored in the non-transitory memory storage device(s) of the vendor system server 68.

Figure 2:
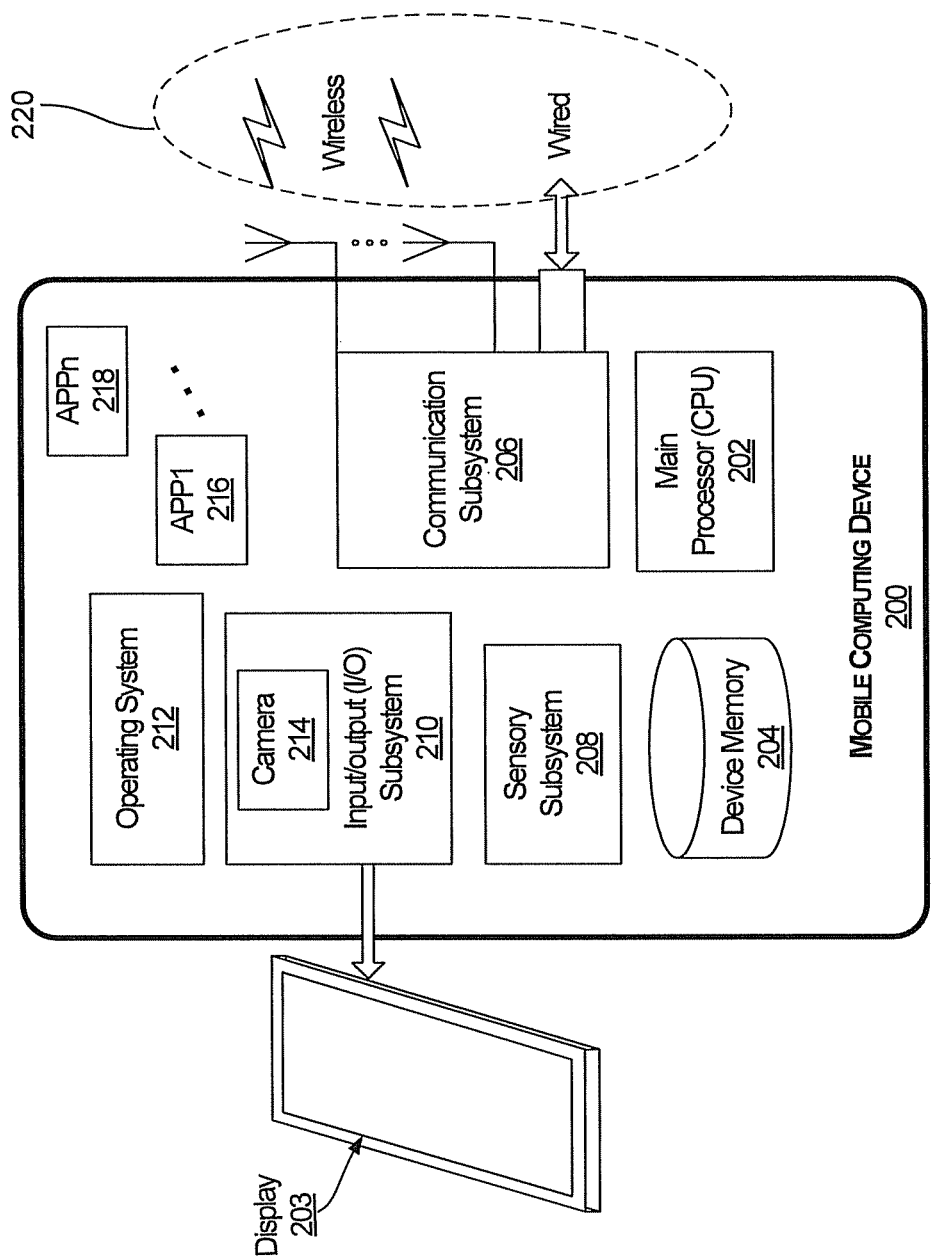
FIG. 2 is a block diagram of an example mobile computing device, which may be used in connection with the retail, computer network environment of FIG. 1, in accordance with an example embodiment of the disclosure.

FIG. 2 is a block diagram of an example mobile computing device, which may be used in connection with the retail, computer network environment of FIG. 1, in accordance with an example embodiment of the disclosure. Referring to FIG. 2, there is illustrated a more detailed diagram of the processing device 20 in instances when it comprises a mobile computing device. More specifically, the computing device 200 may include a handset, a smartphone, a tablet, a laptop, and/or another handheld or portable computing device. The computing device 200 may comprise, for example, a main processor 202, a system memory 204, a communication subsystem 206, a sensory subsystem 208, an input/output (I/O) subsystem 210, and a display 103. The computing device may also comprise an operating system 212 and one or more applications 216, . . . , 218 running on the computing device 200.

The main processor 202 may comprise suitable logic, circuitry, interfaces, and/or code that may be operable to process data, and/or control and/or manage operations of the computing device 200, and/or tasks and/or applications performed therein in connection with the architecture 100 (e.g., tasks associated with the "slip cart" functionalities disclosed herein). In this regard, the main processor 202 may be operable to configure and/or control operations of various components and/or subsystems of the computing device 200, by utilizing, for example, one or more control signals. The main processor 202 enables running and/or execution of applications, programs and/or code, which may be stored, for example, in the system memory 204. Alternatively, one or more dedicated application processors may be utilized for running and/or executing applications (or programs) in the computing device 200.

In some instances, one or more of the applications 216, . . . , 218 running and/or executing on the computing device 200 may generate and/or update video content that may be rendered via the display 203. In some instances, one or more of the applications 216, . . . , 218 may be operable to implement functionalities associated with any of the "scan, try and/or buy" experiences described herein.

The system memory 204 may comprise suitable logic, circuitry, interfaces, and/or code that may enable permanent and/or non-permanent storage, buffering, and/or fetching of data, code and/or other information, which may be used, consumed, and/or processed. In this regard, the system memory 204 may comprise different memory technologies, including, for example, read-only memory (ROM), random access memory (RAM), Flash memory, solid-state drive (SSD), and/or field-programmable gate array (FPGA). The system memory 204 may store, for example, configuration data, which may comprise parameters and/or code, comprising software and/or firmware (e.g., the operating system 212 and/or the one or more applications 216, . . . , 218).

The communication subsystem 206 may comprise suitable logic, circuitry, interfaces, and/or code operable to communicate data from and/or to the computing device, such as via one or more wired and/or wireless connections 220. The communication subsystem 206 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the computing device 200, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 206 may provide wired and/or wireless connections to, for example, the vendor system server 68 using the wired and/or wireless connections 220.

The sensory subsystem 208 may comprise suitable logic, circuitry, interfaces, and/or code for obtaining and/or generating sensory information, which may relate to the computing device 200, its user(s), and/or its environment. For example, the sensory subsystem 208 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 210 may comprise suitable logic, circuitry, interfaces, and/or code for enabling user interactions with the computing device 200, enabling obtaining input from user(s) and/or to providing output to the user(s). The I/O subsystem 210 may support various types of inputs and/or outputs, including, for example, video, audio, and/or textual. In this regard, dedicated I/O devices and/or components, external to or integrated within the computing device 200, may be utilized for inputting and/or outputting data during operations of the I/O subsystem 210. Example I/O devices may comprise the camera 214, displays, mice, keyboards, touchscreens, voice input interfaces, and other input/output interfaces or devices. With respect to video outputs, the I/O subsystem 210 may be operable to generate and/or process video content, graphics, and/or textual data, and/or generate video frames based thereon for display, via the display 203 for example.

In some instances, the I/O subsystem 210 may be operable to provide scanning capabilities (e.g., via the camera 214) associated with functionalities related to any of the "scan, try and/or buy" experiences offered by the one or more apps 216, . . . , 218.

The display 203 may comprise suitable logic, circuitry, interfaces and/or code that may enable displaying of video content, which may be handled and/or processed via the I/O subsystem 210. The display 203 may include a touch-screen and may be used in outputting video data.

The operating system 212 may include software that is used to manage the various hardware resources of the computing device 200. The operating system 212 may also be used to provide common services to computer programs or applications, such as the one or more applications 216, . . . , 218. The operating system 212 may act as an intermediary between the hardware components and the one or more applications 216, . . . , 218.

The one or more applications 216, . . . , 218 may include one or more software applications (i.e., computer programs) that may help a user of the computing device 200 perform a specific task. For example, a software application may include an interactive application that displays content to a user and allows the user to provide input as to the manner in which the content is provided and/or the type of content that is provided. To perform a task (e.g., web browsing, video playback, etc.), the one or more applications 216, . . . , 218 may access the CPU 202, the memory 204, and/or any other circuit within the computing device 102, as well as the operating system 212.

In some instances, one or more of the applications 216, . . . , 218 may be operable to implement functionalities associated with any of the "scan, try and/or buy" experiences described herein. For example, a user at a retail store location may download and install app 216 on the computing device 200. The app 216 may be provided for download by the retailer using, for example, the retailer's host system 68. Once downloaded and installed, the app 216 may enable the user to use the camera 214 and scan one or more product tags (e.g., with a QR code, an UPC, or an NFC tag). The scanned product may then be added to a "shopping cart" associated with a shopping profile of the user (e.g., a profile maintained by the retailer's host system 68).

The app 216 may also be used to designate attributes of the scanned item (e.g., desired quantity, model, size, color, preferred method of payment, selection of shipping or pick-up delivery method, etc.). After desired attributes are specified via the app 216, the user may scan additional items of interest and may select one or more of the scanned items for trial at a store fitting room. The device 200 may receive (e.g., from the retailer's host system 68) a fitting room assignment and the selected items for trial may be delivered to the assigned fitting room via a deliver chute (automatic or manual delivery). After one or more of the scanned items are tried on in the assigned fitting room, the customer may return some items (e.g., via a return chute or other return mechanism). The returned items may be removed from the customer's electronic shopping cart, and the app 216 may be used to designate if the remaining items will be purchased and picked-up or shipped to the customer's shipping location.

The customer may take the desired items from the fitting room to a check-out counter or, in the alternative, the device 200 may communicate with the host system 68 and provide a list of the items selected for purchase. The items may then be delivered (e.g., via a separate chute system, other return mechanism or manually) to a check-out counter or packed for shipment, pending receipt of payment from the customer. Once at the check-out counter, the app 216 may be used to generate a single code (e.g., a QR code), which may be associated with all items in the customer's electronic shopping cart (or purchase list), which have been selected for purchase by the customer.

At the check-out counter, the customer may display the device 200 with the generated single code appearing on its screen 203, and the sales associate may scan the single code using a check-out computing device similar to device 200 (e.g., a check-out scanner or another computing device associated with a cash register and/or check-out functionalities provided by the retailer and managed by the host 68). Once the single code is scanned by the sales associate, the list of desired items in the customer's electronic shopping cart may be transferred to the check-out device, giving the associate the capability to collect payment for the items and release the items for shipment and/or pick-up, as selected by the customer. Other functionalities of the app 216, the computing device 200 (and/or 20), and/or the host 68 may be noted in reference to any of the remaining figures described herein below.

Figure 3A:
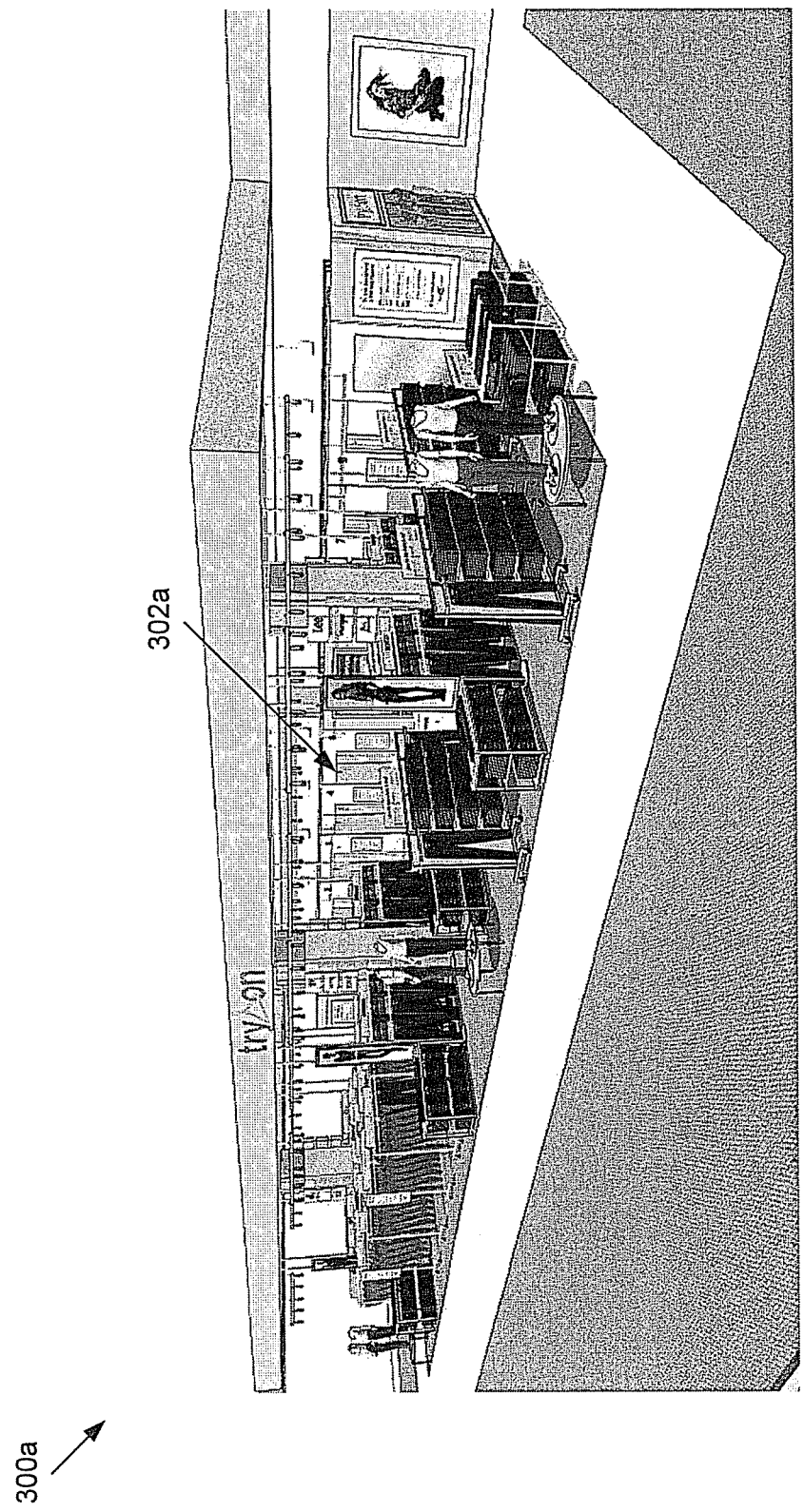
FIGS. 3A-3B are diagrams of an example floor space with fitting rooms for providing "scan & try", "scan & buy", and/or "scan, try and/or buy" experiences, in accordance with an example embodiment of the disclosure.
Figure 3B:
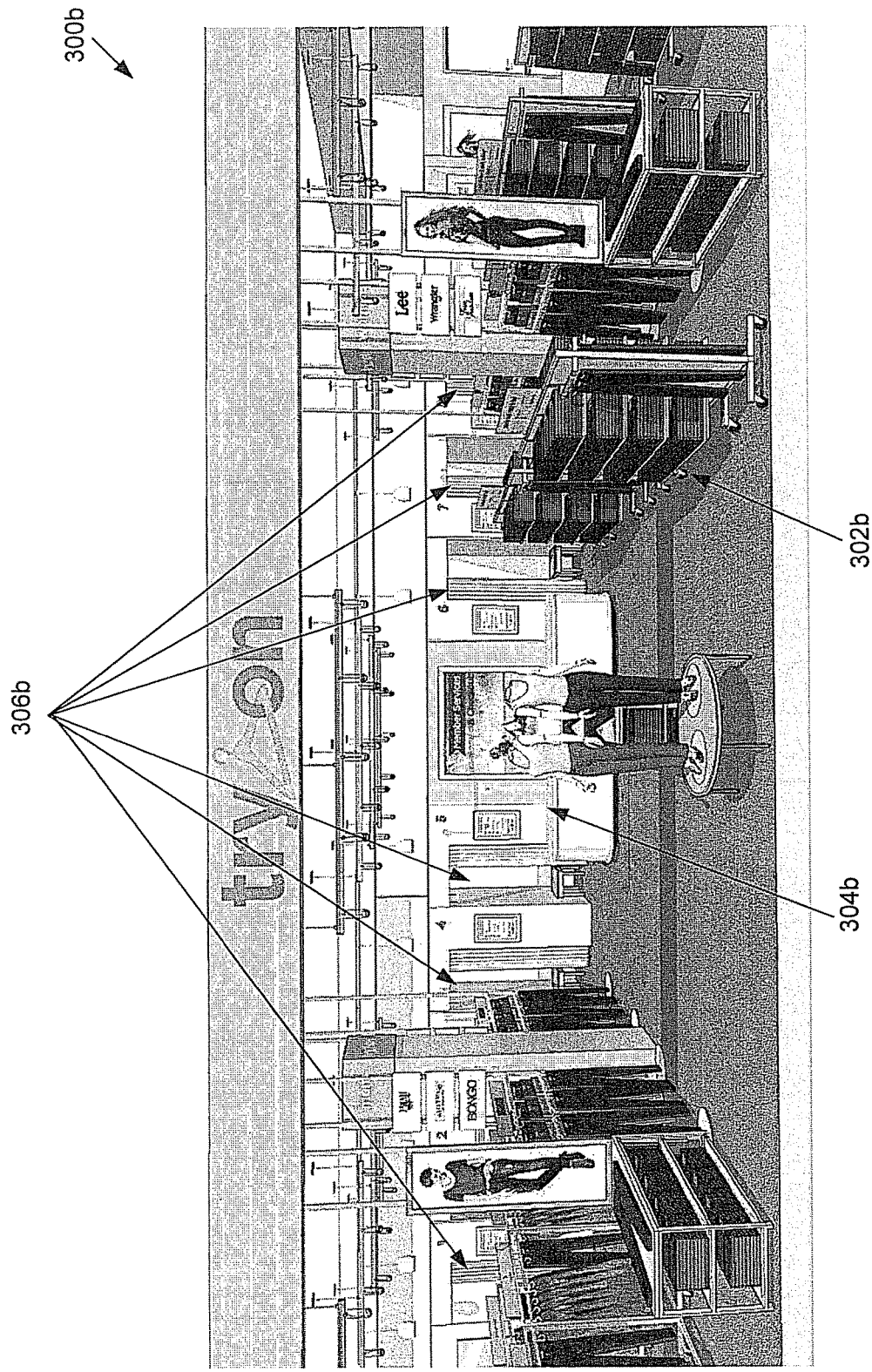

FIGS. 3A-3B are diagrams of an example floor space with fitting rooms for providing "scan & try", "scan & buy", and/or "scan, try and/or buy" experiences, in accordance with an example embodiment of the disclosure. Referring to FIG. 3A, the floor space 300a may be arranged with a variety of products, which may be tried in a plurality of fitting rooms 302a. Referring to FIG. 3B, the products 302b within the floor space 300b may be arranged so that only a limited size/color selection of each style is displayed, so that a more spacious and customer-friendly store space can be achieved. The customer may select (as disclosed herein) a given color/size of a product (for trial at one of the fitting rooms 306b) by scanning a product tag and then specifying the product attributes. After trial of the product is complete, the customer may complete a check-out process at the check-out area 304b.

Figure 3C:
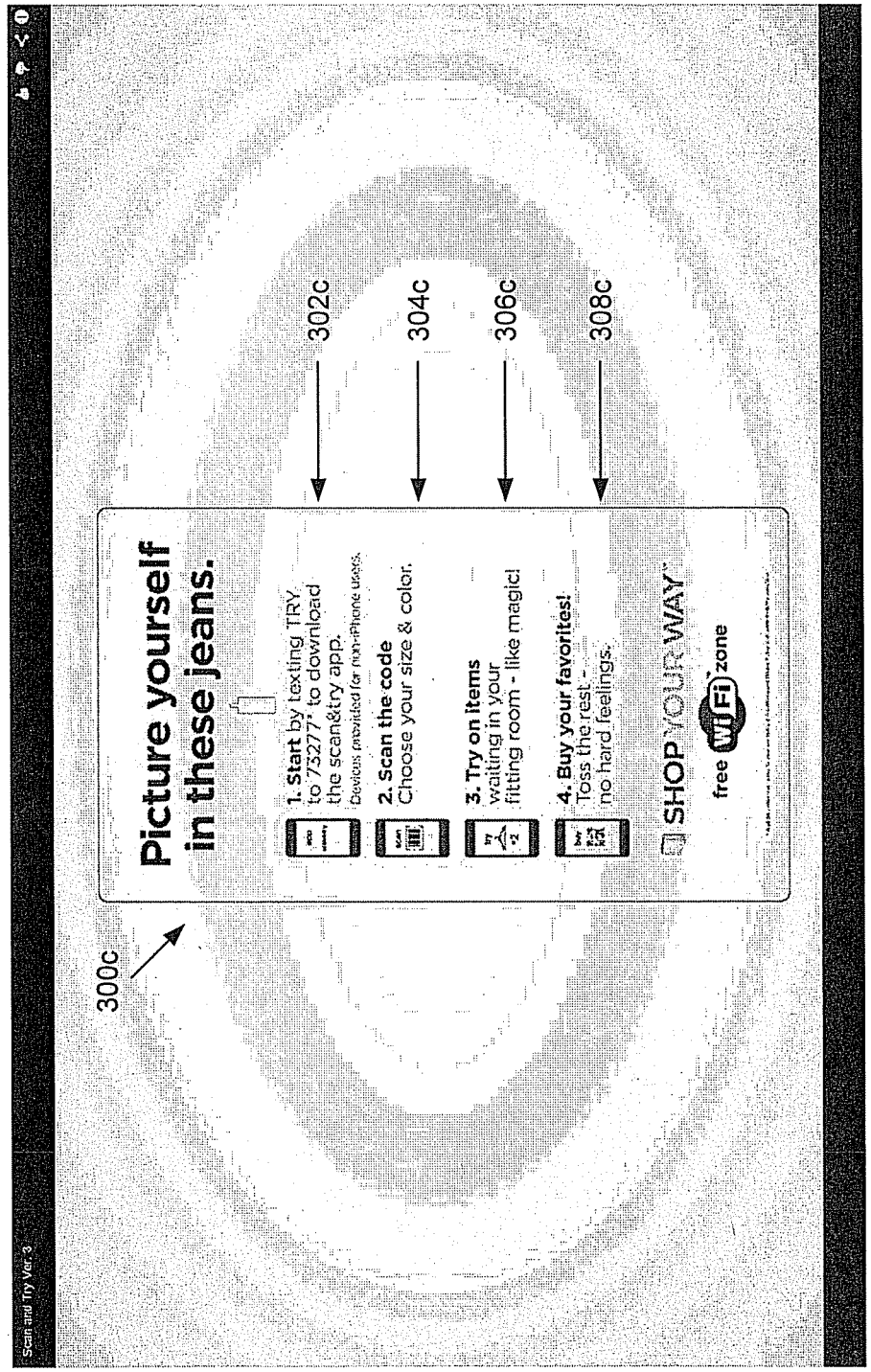
FIG. 3C illustrates an example product tag showing steps for a "scan, try, and buy" experience, in accordance with an example embodiment of the disclosure.

FIG. 3C illustrates an example product tag showing steps for a "scan, try, and buy" experience, in accordance with an example embodiment of the disclosure. Referring to FIG. 3C, the product tag 300c may provide a first step 302c to download an app (e.g., a "scan & try" app 216) onto a customer computing device (e.g., 200). A second step 304c may instruct the customer to use the downloaded app 216 to scan a product tag (e.g., a QR code), and select size/color for the scanned product. A third step 306c may instruct the customer to select one or more scanned product for trying in one of the fitting rooms (e.g., 306b). The selected product may then be delivered via a delivery chute (e.g., automatic chute mechanism or other automatic delivery mechanism) or be manually delivered by a store associate to a designated fitting room. A fourth step 308c may instruct the customer to select the items they would like to purchase and discard the remaining items (e.g., place them in a return chute or other return mechanism inside the fitting room).

Figure 3D:
FIG. 3D illustrates an example product display with instructions for an example "scan & buy" experience, in accordance with an example embodiment of the disclosure.

FIG. 3D illustrates an example product display with instructions for an example "scan & buy" experience, in accordance with an example embodiment of the disclosure. Referring to FIG. 3D, the product display 300d may be used in instances when the customer is familiar with the product they wish to buy, without any need for trial in a fitting room. The product display 300d may indicate a first instruction 302d for downloading an app (e.g., 216), which may be used for any of the disclosed "scan, try and/or buy" experienced disclosed herein. Instruction 304d may indicate that the customer may use the downloaded app 216 to scan a product tag (e.g., a QR code), and select size/color for the scanned product. Instruction 306d may indicate that the customer may select one or more of the scanned items for buying (without trying them on in a fitting room). The items indicated for buying may be delivered (e.g., via an automatic chute or other automatic delivery mechanism, based on a communication from the customer device 200 to the host 68; or via a manual delivery) to a check-out area (e.g., 304b), where the customer may pay for the selected items.

Figure 3E:
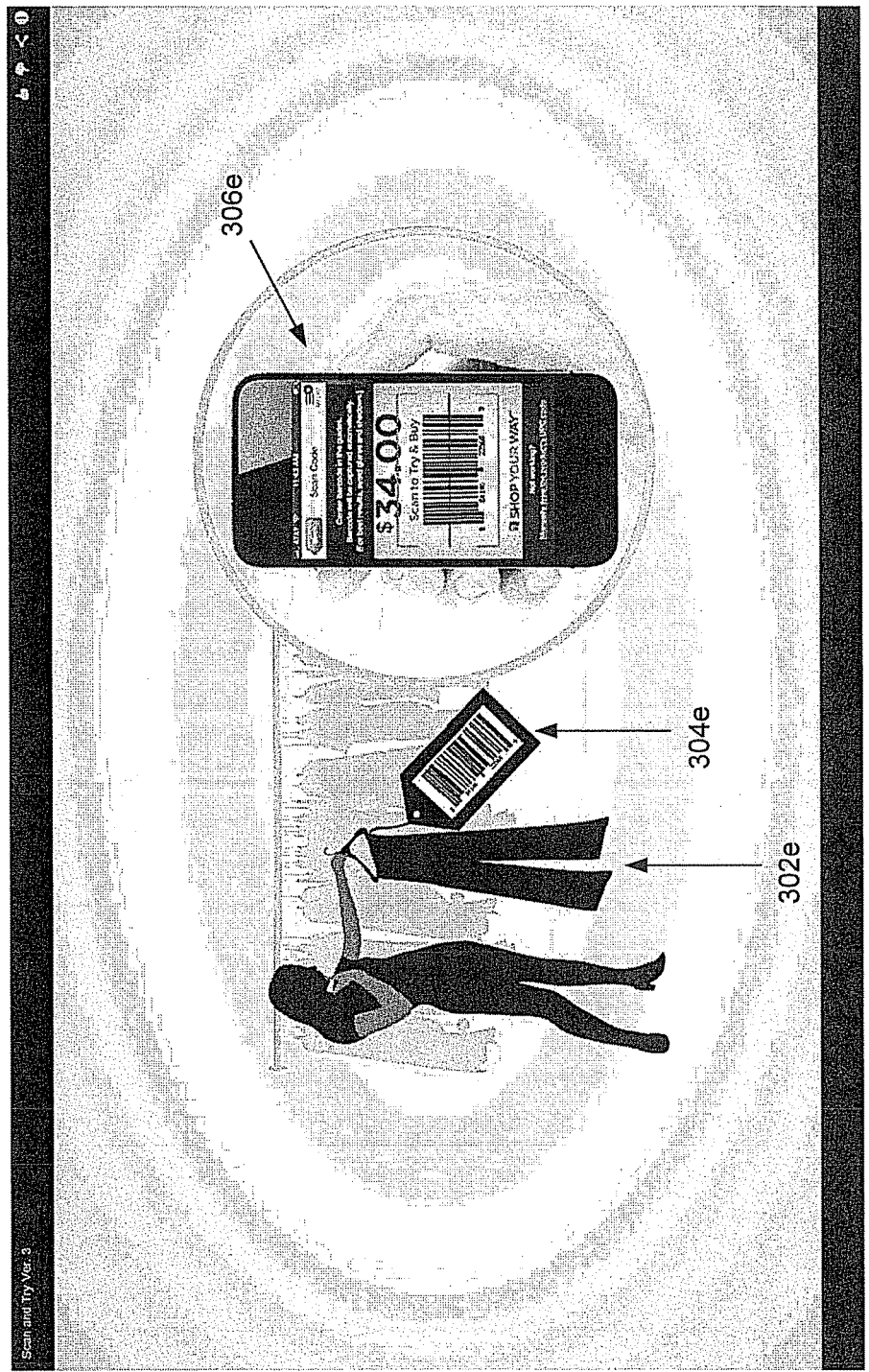
FIG. 3E illustrates an example "scan, try and buy" experience, in accordance with an example embodiment of the disclosure.

FIG. 3E illustrates an example "scan, try and buy" experience, in accordance with an example embodiment of the disclosure. Referring to FIG. 3E, a customer may select an item 302e (e.g., pair of jeans) with a product tag 304e. After the customer has downloaded the store app (e.g., 216, as described in reference to the preceding figures), the customer may use the customer device 306e (which may be the same as 200 and/or 20) to scan the product tag 304e.

Figure 3F:
FIG. 3F illustrates a front side of product hang tags with instructions for an example "scan & try" or "scan & buy" experience, in accordance with an example embodiment of the disclosure.

FIG. 3F illustrates a front side of product hang tags with instructions for an example "scan & try" or "scan & buy" experience, in accordance with an example embodiment of the disclosure. Referring to FIG. 3F, the example product tags 302f, 312f may include information 304f, 314f on the product brand, a code (e.g., QR code) 306f, 316f, description 308f, 318f of the item, and information on the sale price 310f, 320f of the items.

Figure 3G:
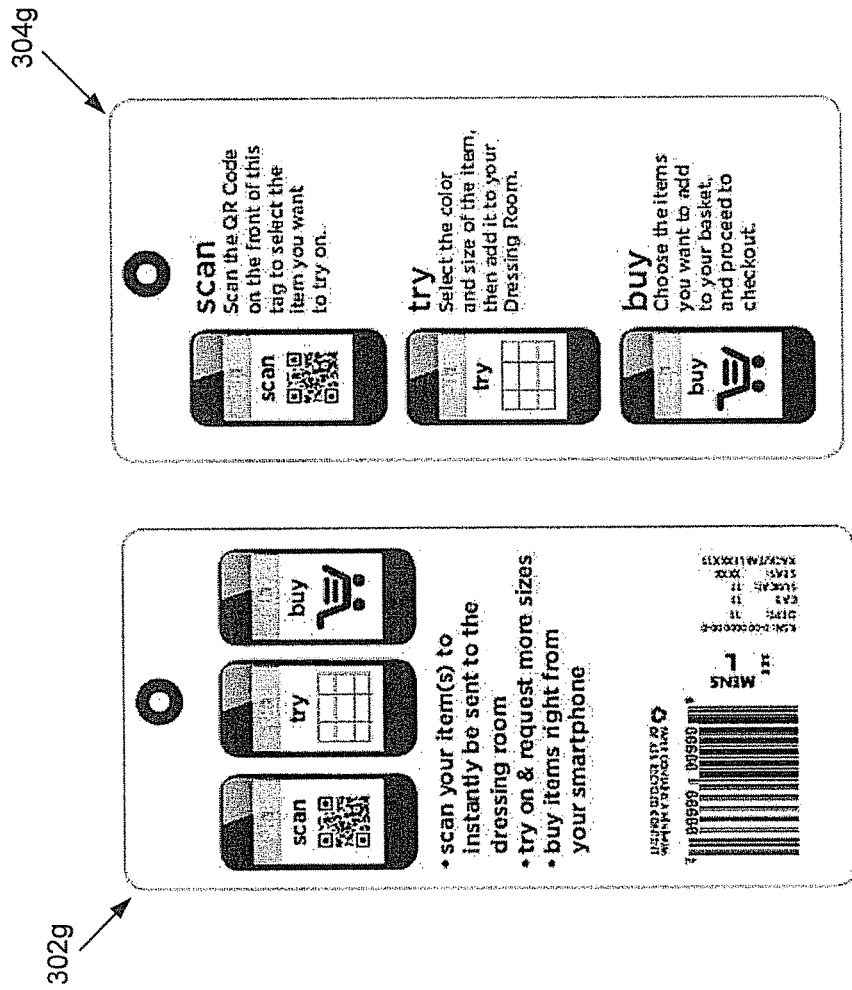
FIG. 3G illustrates a back side of product hang tags with instructions for an example "scan & try" or "scan & buy" experience, in accordance with an example embodiment of the disclosure.

FIG. 3G illustrates a back side of product hang tags with instructions for an example "scan & try" or "scan & buy" experience, in accordance with an example embodiment of the disclosure. Referring to FIG. 3G, the back side of example product tags 302g, 304g may provide instructions for the customer to: (1) scan a product bar code in order to have the product delivered to a fitting room; (2) try the product in the fitting room assigned to the customer (the customer may be able to discard unwanted items inside the fitting room and/or request additional items of the same model but having different size and color, or a different item altogether); and (3) desired items may then be selected for purchase (the items may be paid for at the customer device 200, or at a store check-out location; the purchased items may be designated for shipment to the customer shipping address or picked-up at the check-out location).

Figure 3H:
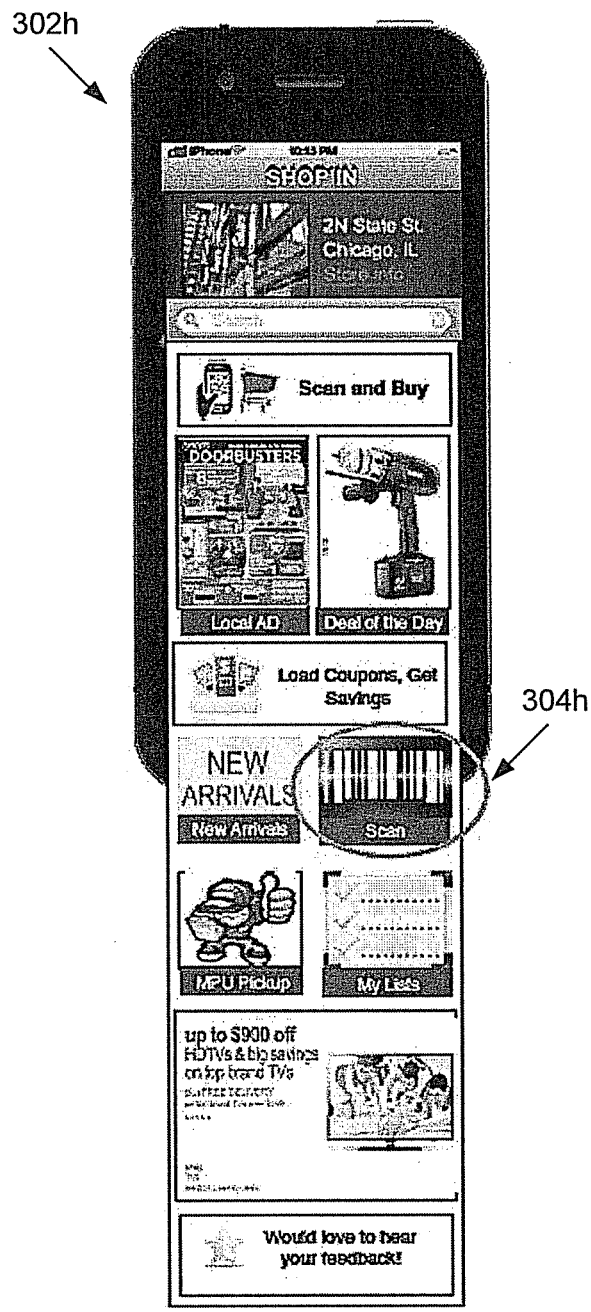
FIG. 3H-3J illustrates a computing device running an application, which may be used in a "scan, try and/or buy" experience, in accordance with an example embodiment of the disclosure.
Figure 3I:
Figure 3J:
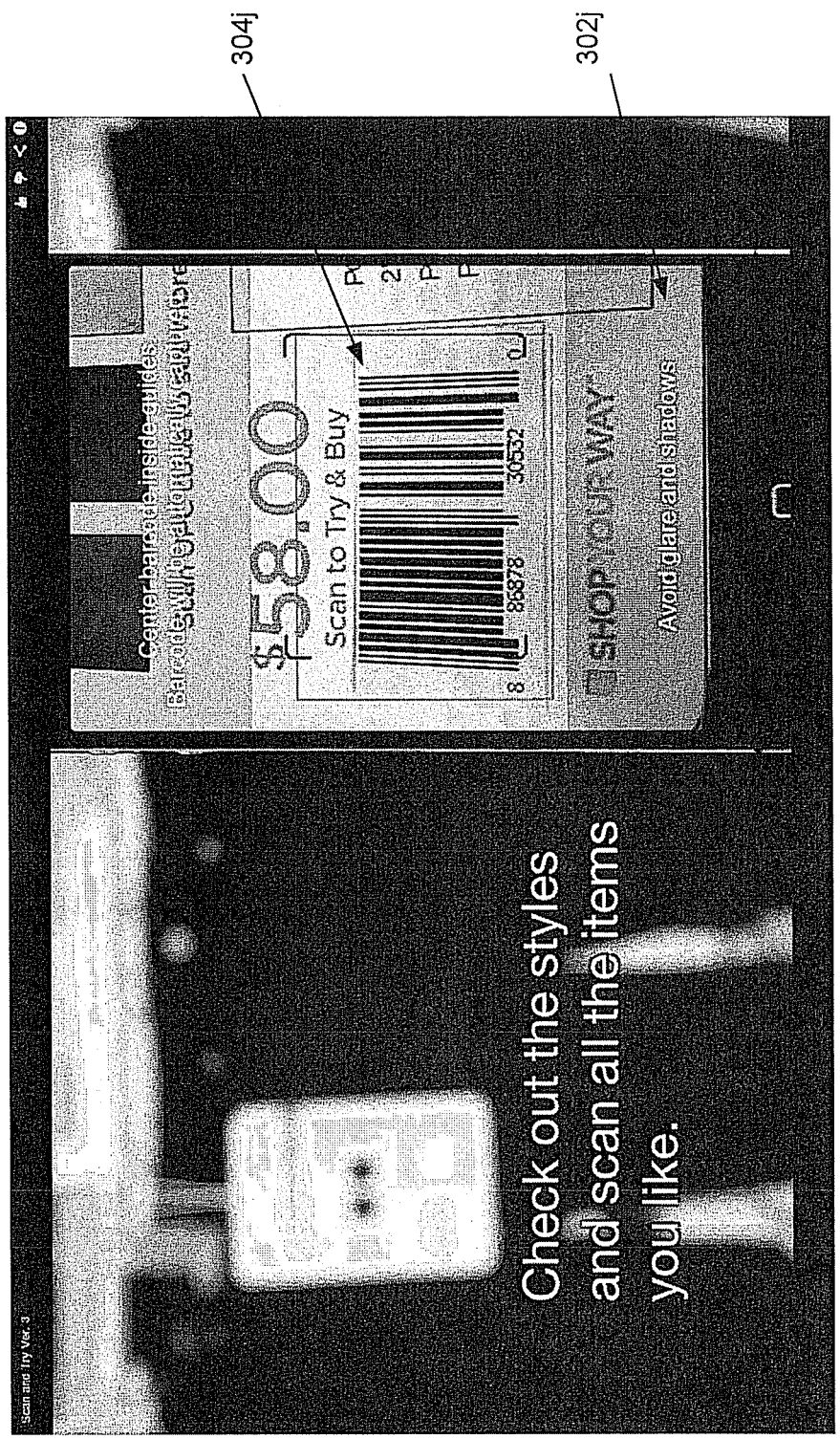

FIG. 3H-3J illustrates a computing device running an application, which may be used in a "scan, try and/or buy" experience, in accordance with an example embodiment of the disclosure. Referring to FIG. 3H, customer device 302h (which may be the same as device 200 or 20) may run an app, which includes scanning functionality (or scanning app) 304h. The scanning app 304h may be executed so that "scan, try and/or buy" functionalities may be utilized by a customer.

FIG. 3I illustrates a customer device 302i after a scanning app 304h has been executed. The device screen displays a partial framed window (in green) 306i, which may be centered at a code (e.g., QR code) of a product tag. After the QR code is within the window 306i, the scan function 304i may be executed. FIG. 3J illustrates another example of a customer device 302j scanning a product tag code (e.g., UPC) 304j.

Figure 3K:
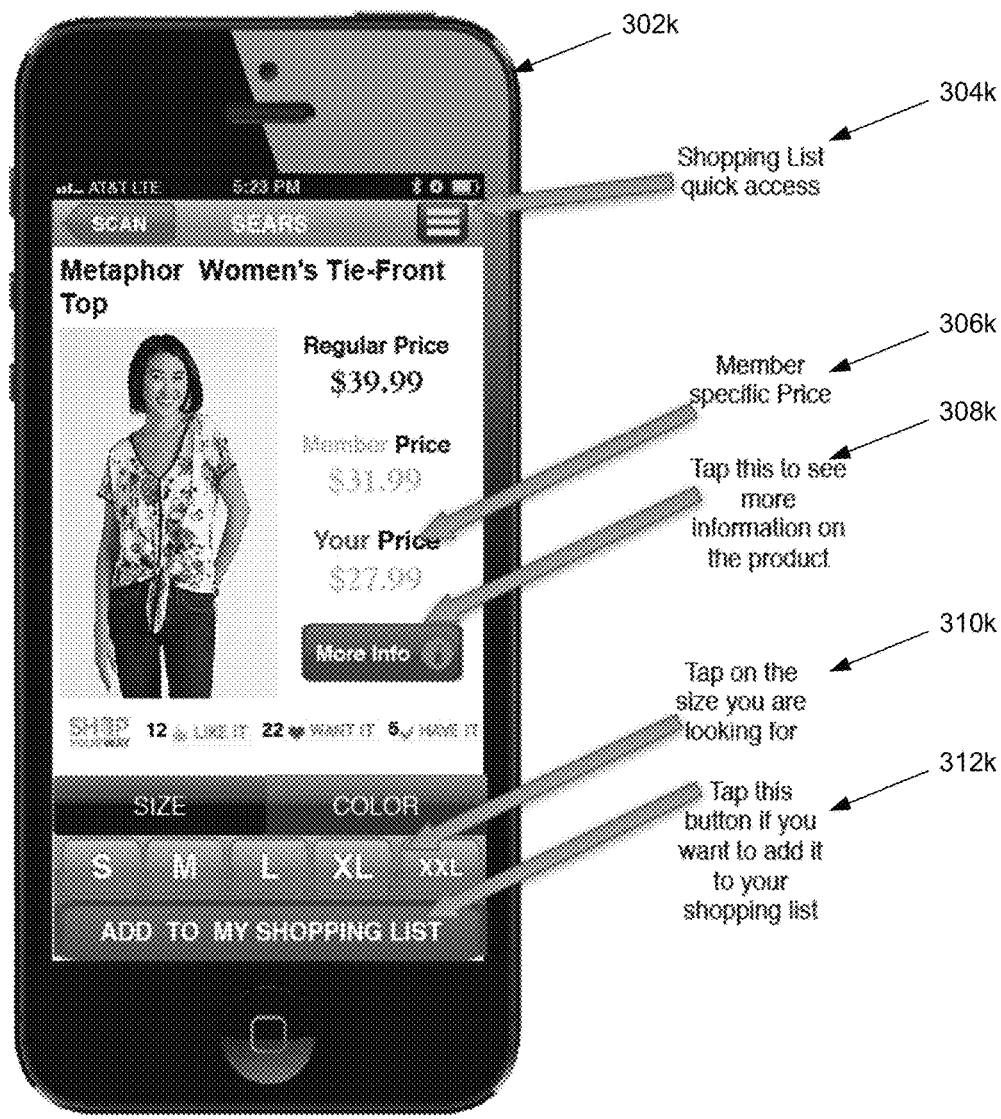
FIGS. 3K-3U illustrate product details and/or functionality selection pages appearing on a customer computing device after a product hang tag scan during a "scan, try and/or buy" experience, in accordance with an example embodiment of the disclosure.
Figure 3L:
Figure 3M:
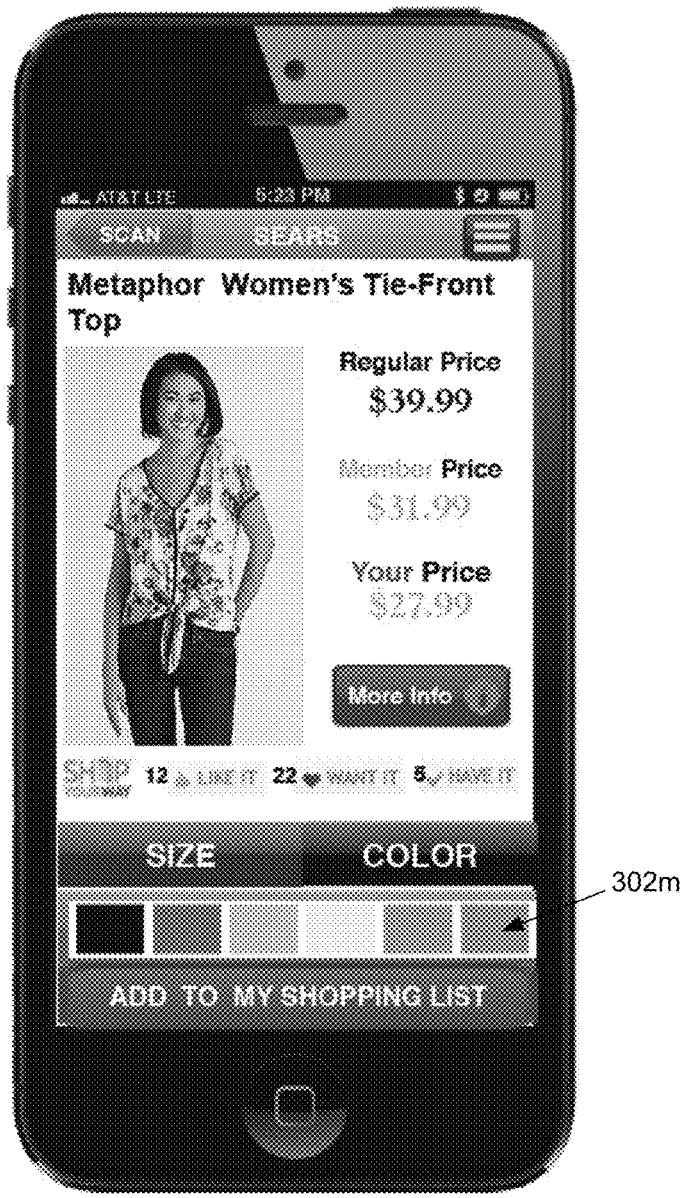

FIGS. 3K-3U illustrate product details and/or functionality selection pages appearing on a customer computing device after a product hang tag scan during a "scan, try and/or buy" experience, in accordance with an example embodiment of the disclosure. Referring to FIG. 3K, after customer device 302k scans a product tag, product details page with additional product information and functionality selection may be displayed. For example, the additional product information and functionality selection may include shopping list quick access button 304k, member specific price 306k, additional information button 308k, size selection 310k, and add to shopping list button 312k. FIG. 3L illustrates additional information 302l, which may be displayed after activating the additional information button 308k. FIG. 3M illustrates color selection choices 302m, which may be displayed after activating the "COLOR" button displayed by device 302k.

Figure 3N:
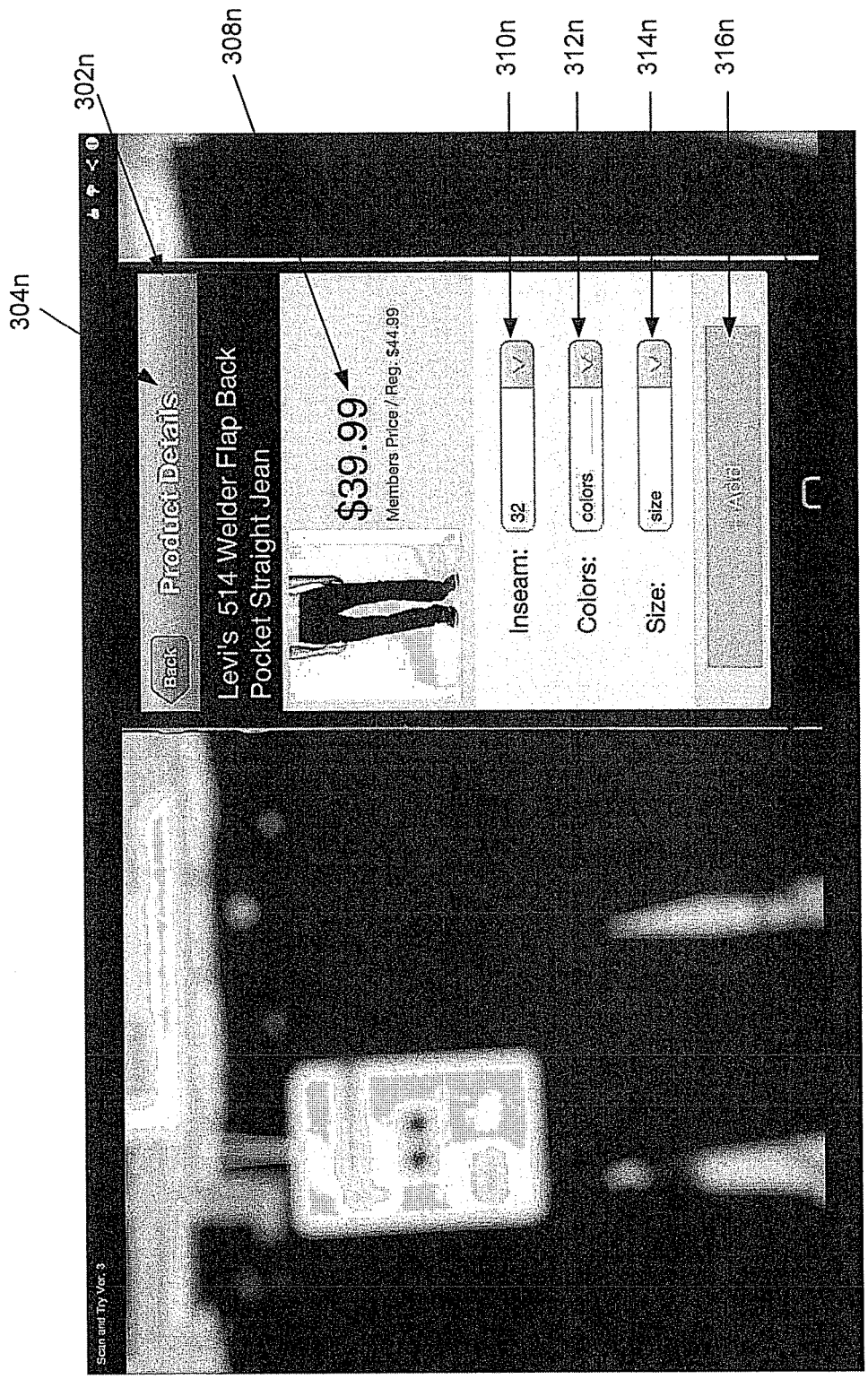
Figure 3O:
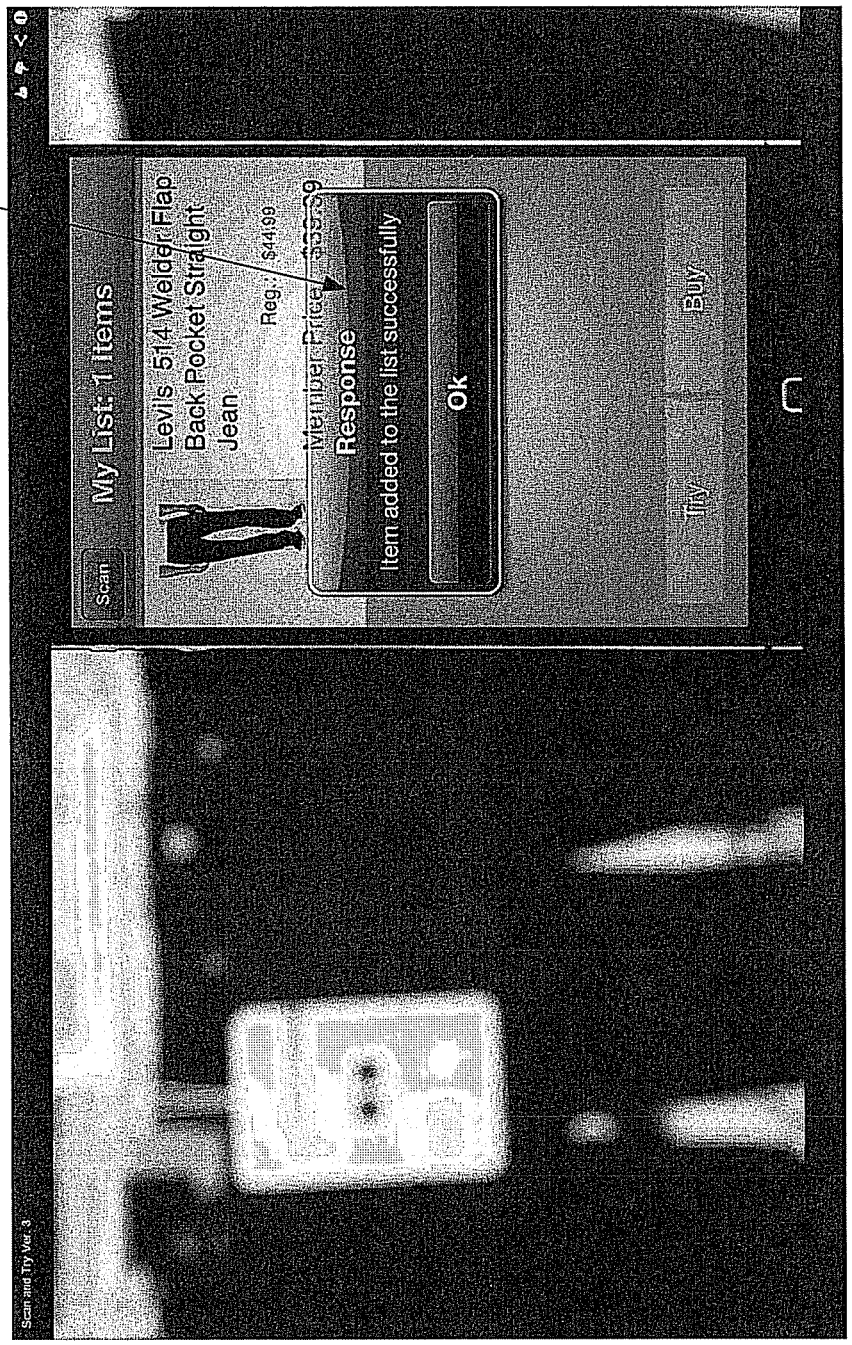

FIG. 3N illustrates another example of a product details page 304n after scanning a product tag code using device 302n. The product details page 304n may include a photo of the scanned item 306n, the product price 308n, product attribute selection menus 310n-314n (e.g., inseam, color and size), and "add to shopping list" button 316n. After selecting the item attributes and "add to shopping list" button 316n, a confirmation 306o (FIG. 3O) may be displayed by the customer device.

Figure 3P:
Figure 3Q:
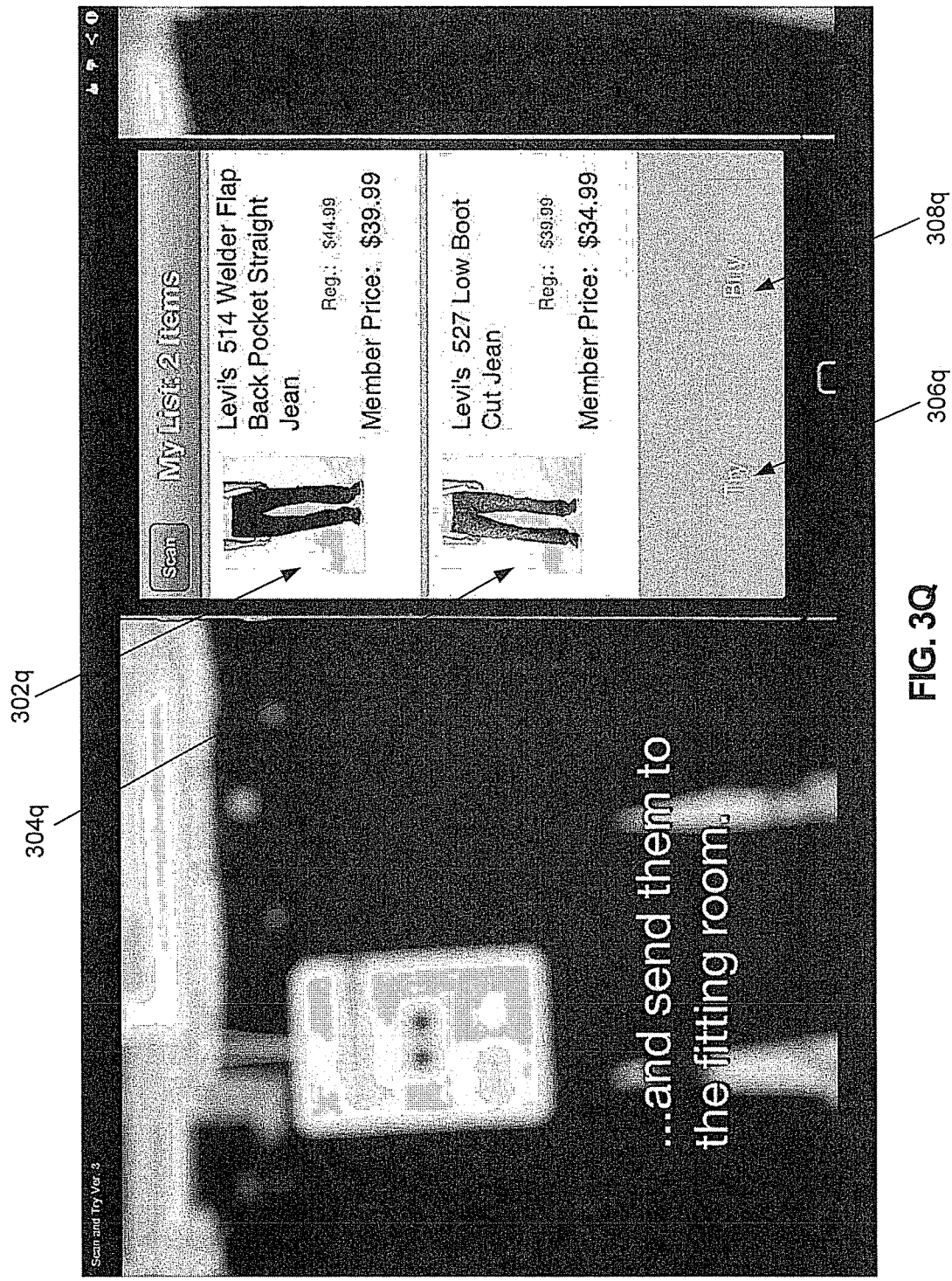

FIG. 3P illustrates a screen shot by a user device 300p after a user has added a scanned product to the user's shopping list. The device 300p may provide the user with a "TRY" functionality (button 302p), "BUY" functionality (button 304p), and "Scan Another Product" functionality (button 306p). FIG. 3Q illustrates a screen shot of a customer device after two products 302q, 304q have been scanned and added to the customer shopping list. The customer may then use the customer device to try or buy the product by activating buttons 306q or 308q, respectively.

Figure 3R:
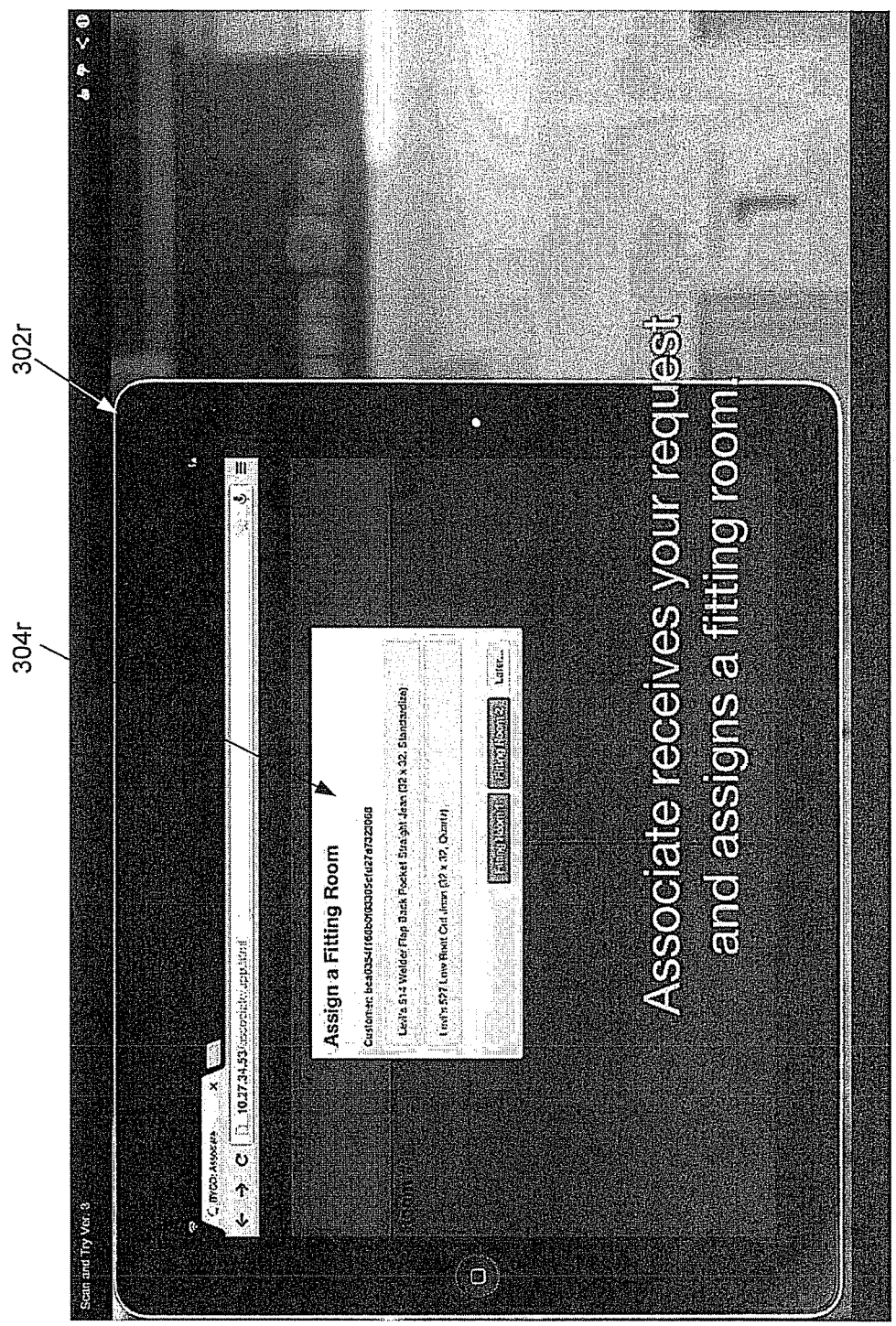
Figure 3S:
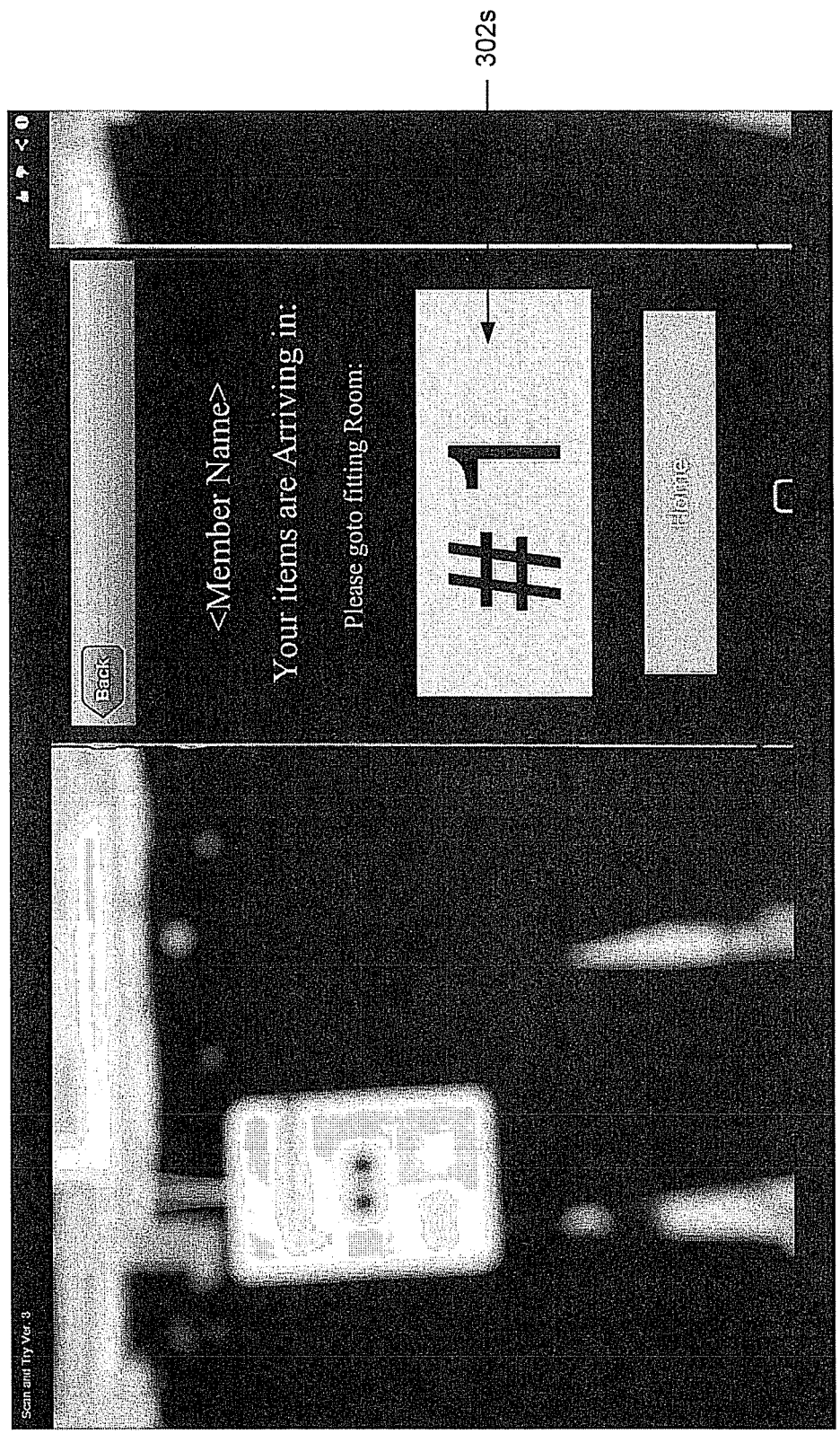
Figure 3T:

Referring to FIG. 3R, in instances when the user activates the "TRY" functionality, a store associate may receive the customer request to try the items in the customer shopping list on a store associate device 302r (e.g., a tablet or another computing device similar to 200 or 20, communicatively coupled to the host 68). More specifically, the associate may receive a message 304r indicating the items the customer would like to try in a fitting room. After the associate assigns a fitting room, example screen shots with the fitting room assignments 302s and 302t are illustrated in FIGS. 3S and 3T, respectively.

Figure 3U:

FIG. 3U illustrates an example screen shot displayed at the customer device after the customer acknowledges the items for trying in a fitting room. More specifically, the customer device (and the app 216) may provide functionality for requesting another size or color of the same item (button 302u), proceeding with the item purchase (button 304u), and request additional similar product for trial (button 306u).

Figure 3V:
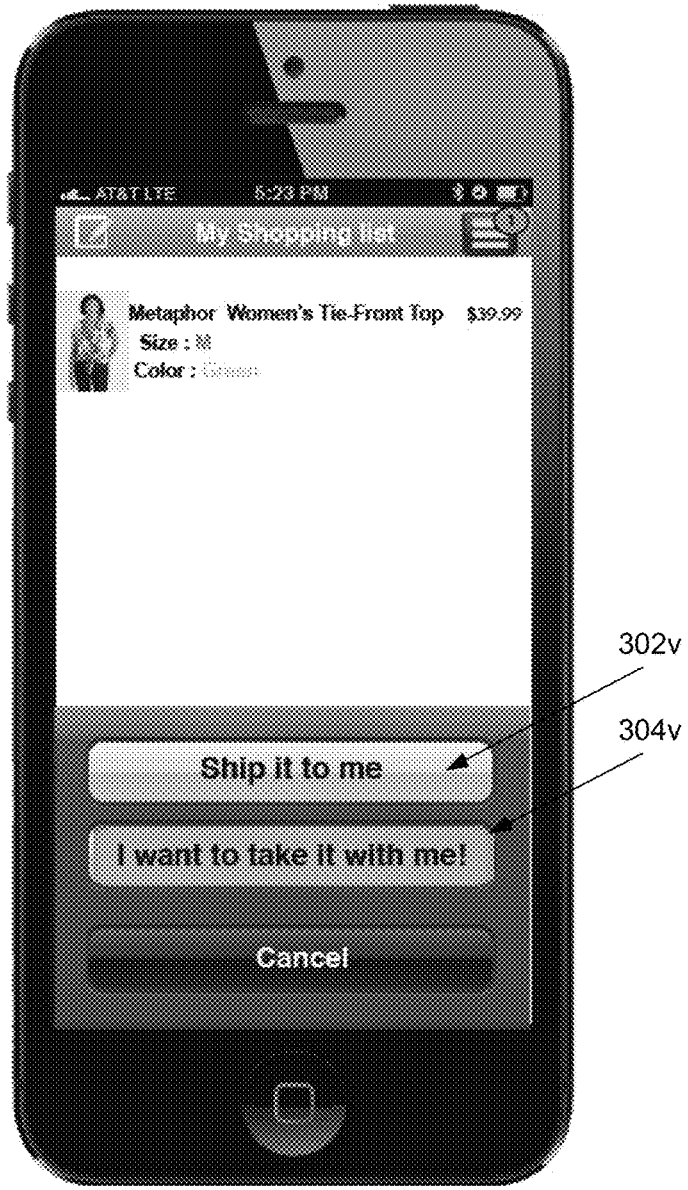
FIG. 3V illustrates example product details and functionality selection page after a product hang tag scan during a "scan & buy" experience, in accordance with an example embodiment of the disclosure.

FIG. 3V illustrates example product details and functionality selection page after a product hang tag scan during a "scan & buy" experience, in accordance with an example embodiment of the disclosure. Referring to FIG. 3V, in instances when the customer would like to purchase the products added to their shopping list (and have pressed button 304u), the app 216 may provide the customer with the option to have the product shipped to the customer's designated shipping (e.g., home) address (by pressing button 302v), or pick up the product at a check-out counter inside the store (e.g., by pressing button 304v).

Figure 3W:
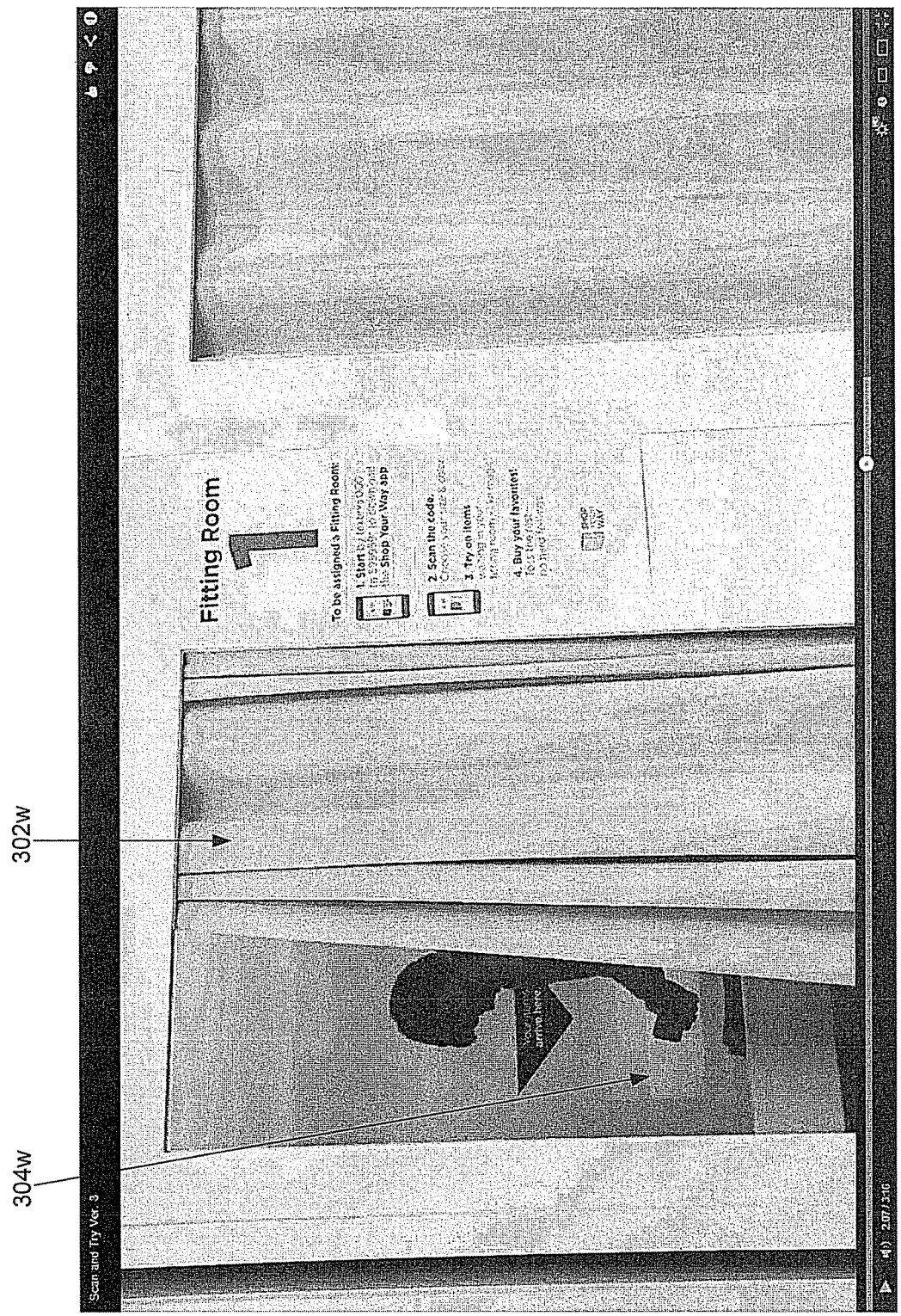
FIGS. 3W-3X illustrate an example fitting room, which may be used during a "scan, try and/or buy" experience, in accordance with an example embodiment of the disclosure.
Figure 3X:
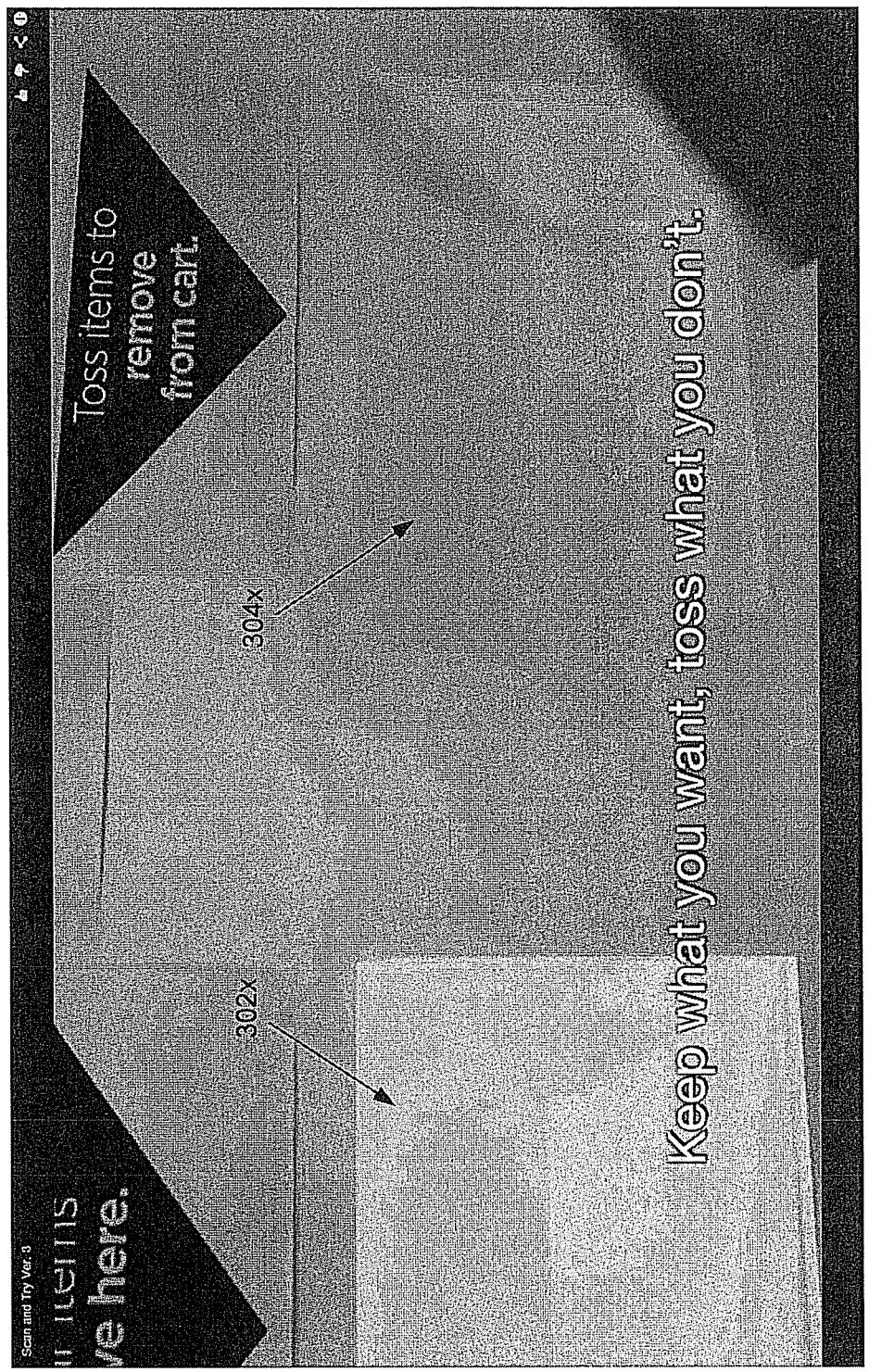

FIGS. 3W-3X illustrate an example fitting room, which may be used during a "scan, try and/or buy" experience, in accordance with an example embodiment of the disclosure. More specifically, the customer may use fitting room 302w, which may have a product delivery chute 304w (FIG. 3W) or 302x (FIG. 3X), and a product return chute 304x (FIG. 3X).

Figure 3Y:
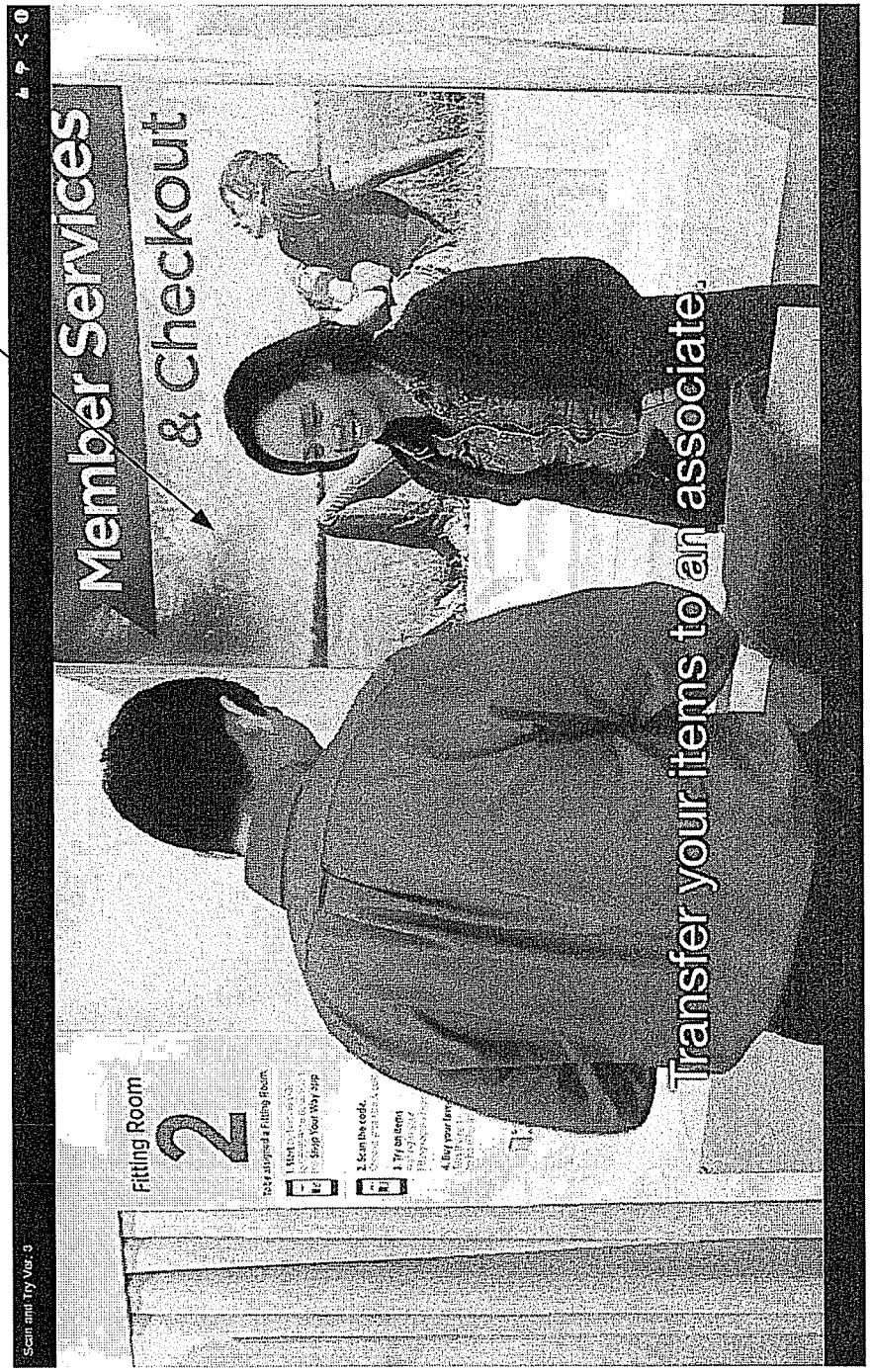
Figure 3Z:
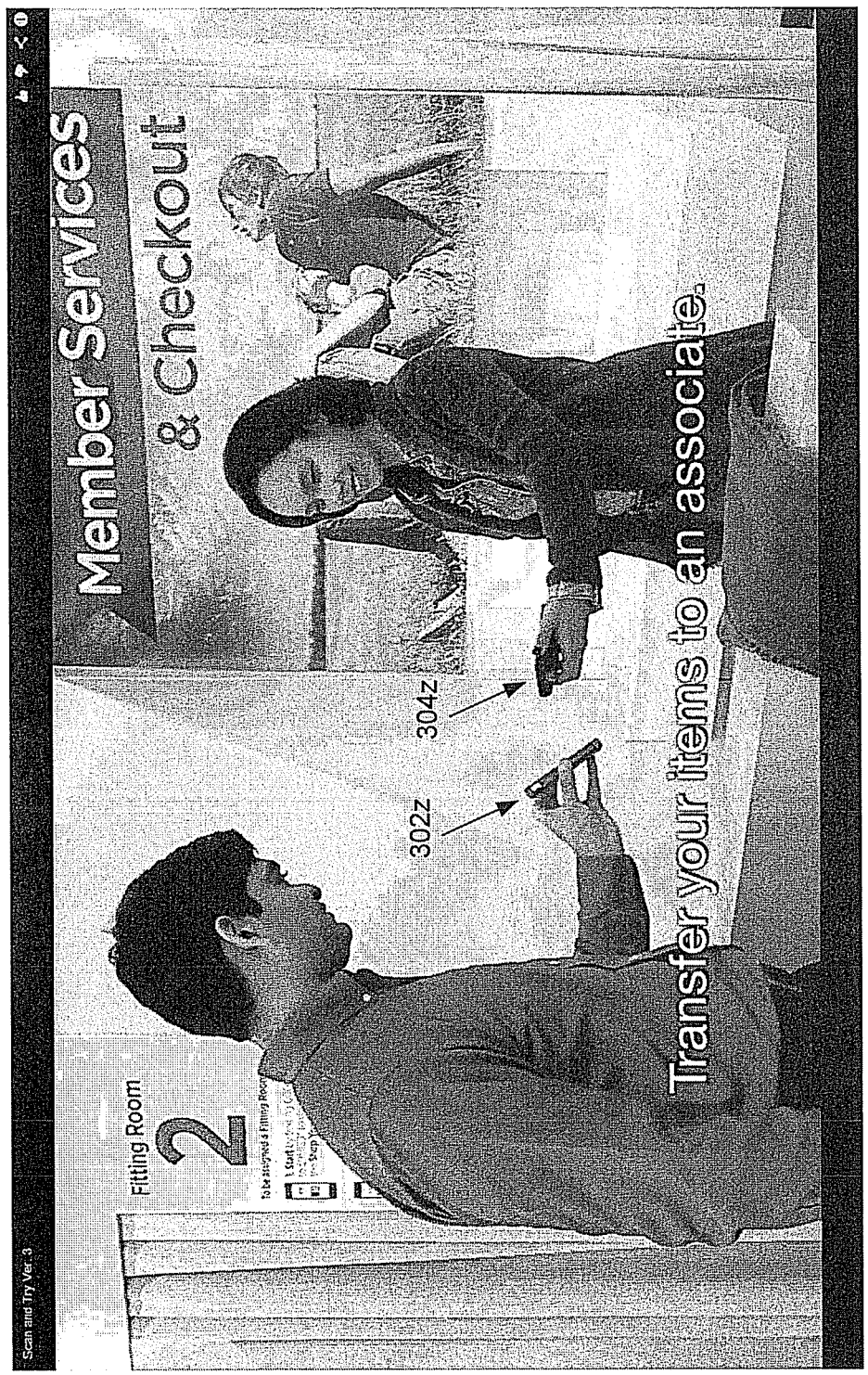
Figure 3A:
Figure 3B:
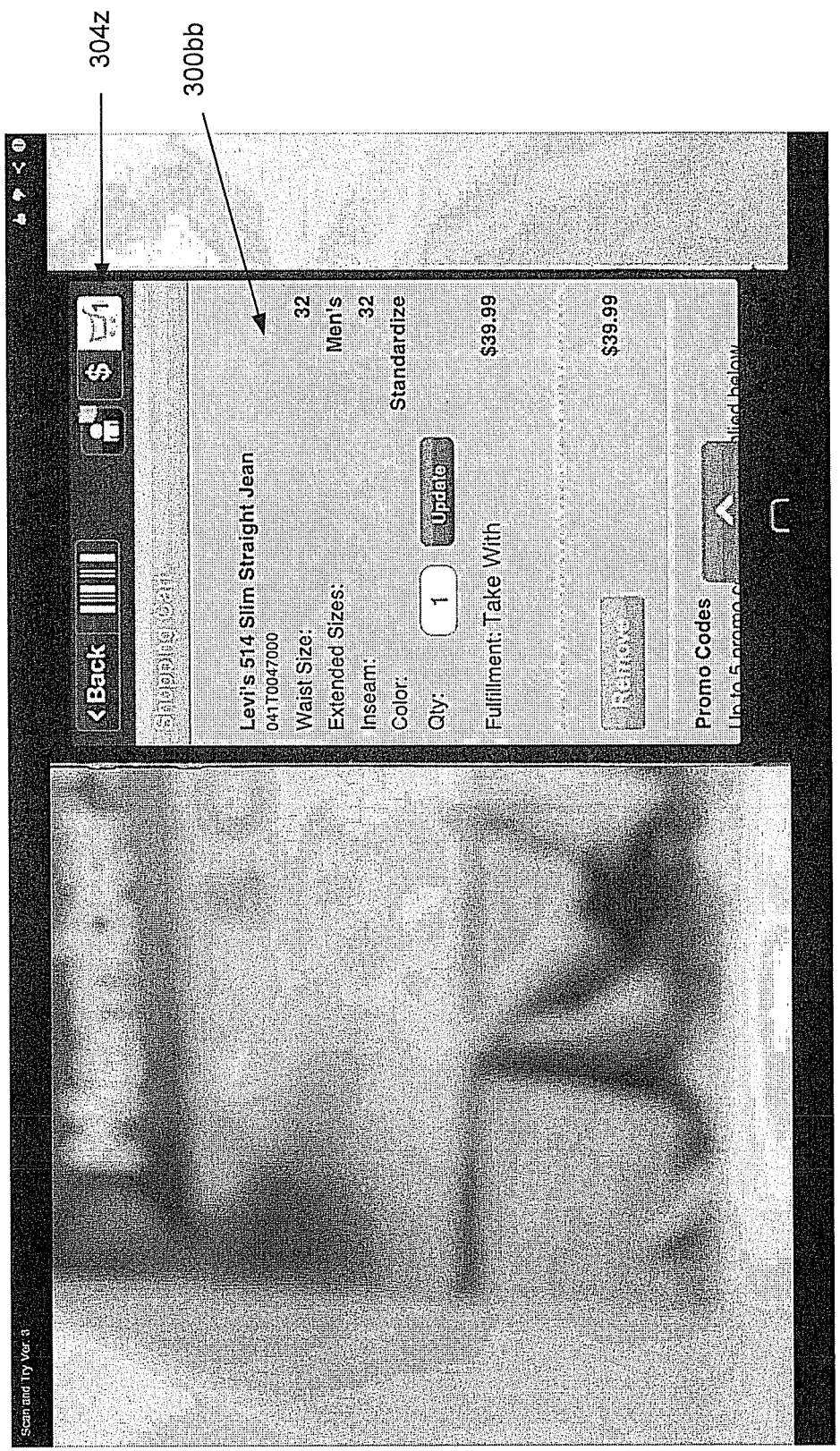
Figure 3C:
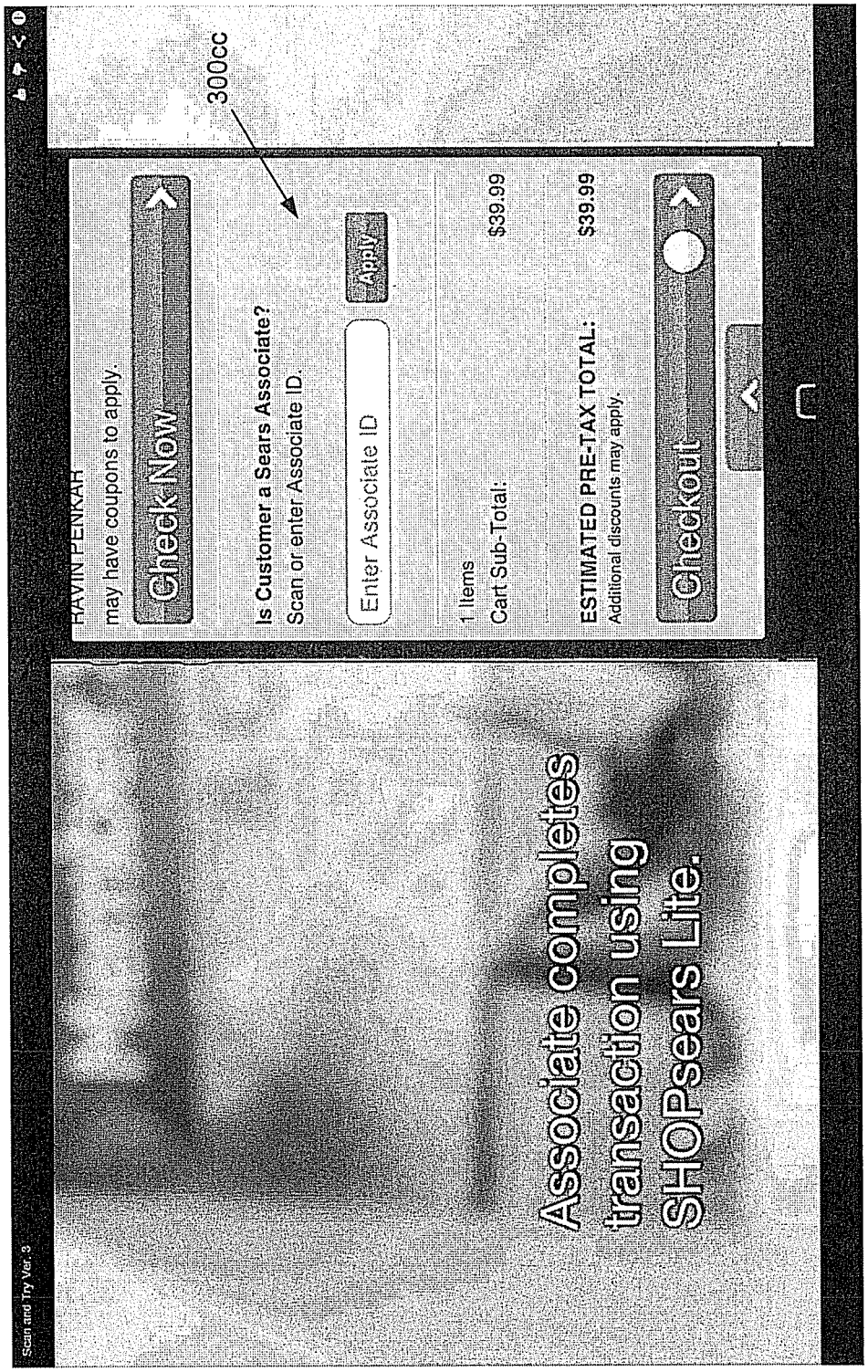
Figure 3D:
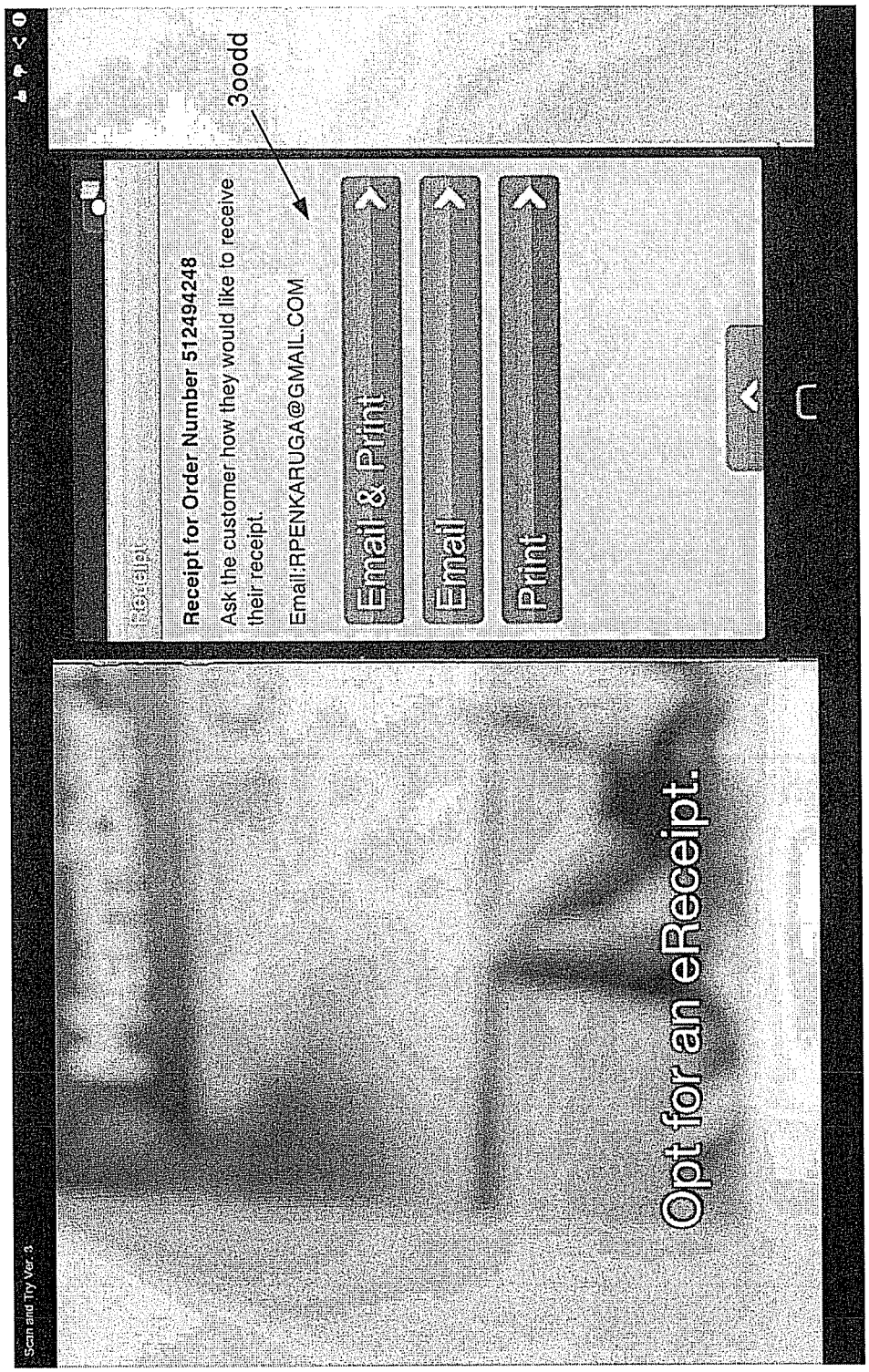
Figure 3E:
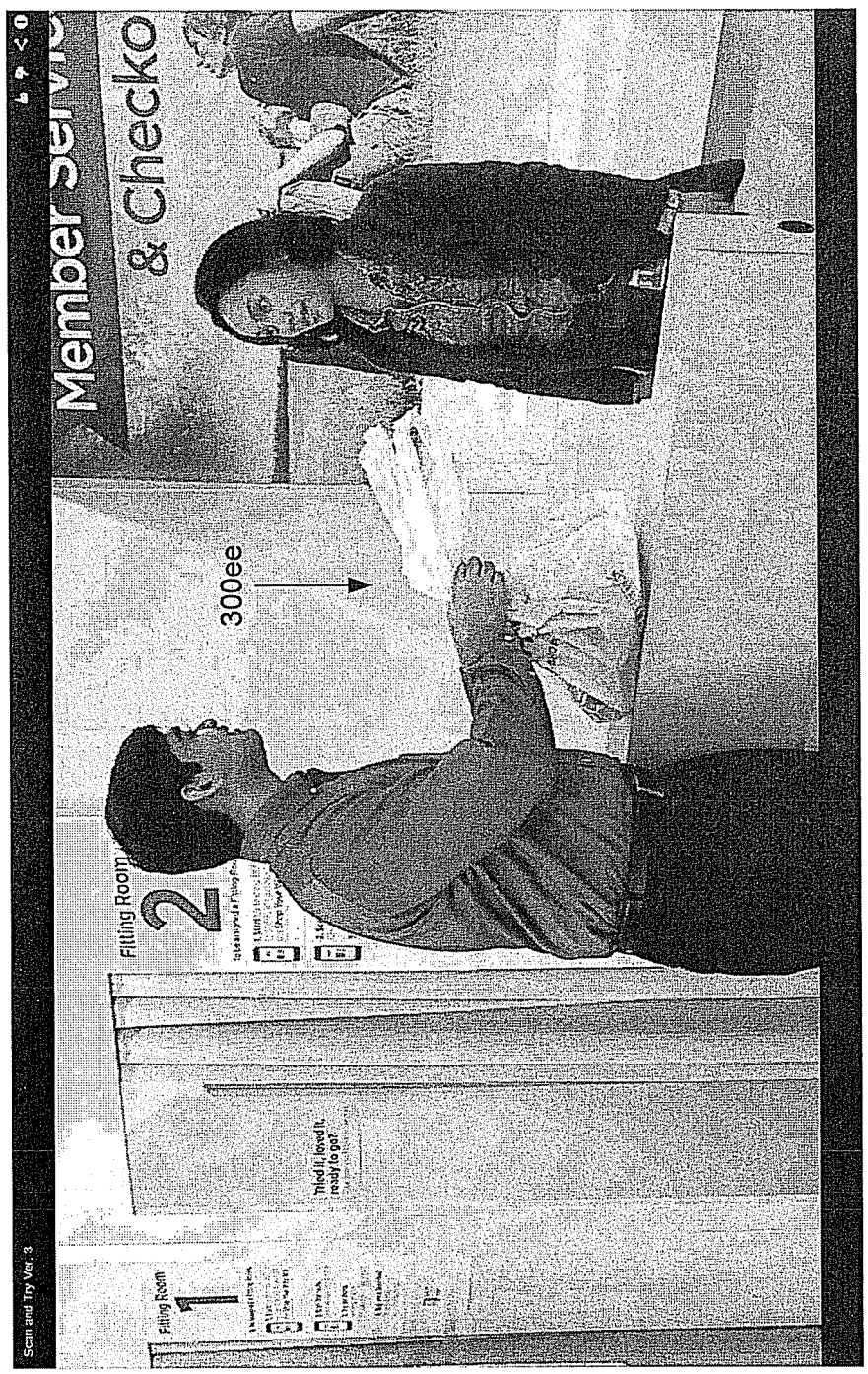

FIGS. 3Y-3EE illustrate an example check-out area and example check-out functionalities, which may be used during a "scan, try and/or buy" experience, in accordance with an example embodiment of the disclosure. Referring to FIGS. 3Y-3EE, after the customer has finalized their shopping list, the app 216 may generate a single code (e.g., QR code 302z in FIG. 3AA) at the check-out location 302y (FIG. 3Y). The check-out associate may scan the single code 302z using a computing device 304z, as illustrated in FIGS. 3Z-3AA (e.g., a device similar to customer device 200 or 20, and communicatively coupled to host 68). After the associate scans the single code 302z using device 304z, the customer's shopping list 300bb (FIG. 3BB) appears on the associate's device 304z so that the associate may proceed with obtaining payment checking out the customer (as illustrated by screen shot 300cc in FIG. 3CC, for example). A confirmation receipt may be emailed and/or printed (as seen in screen shot 300dd in FIG. 3DD), and the packaged items 300ee (FIG. 3EE) may then be picked up by the customer.

Figure 4A:
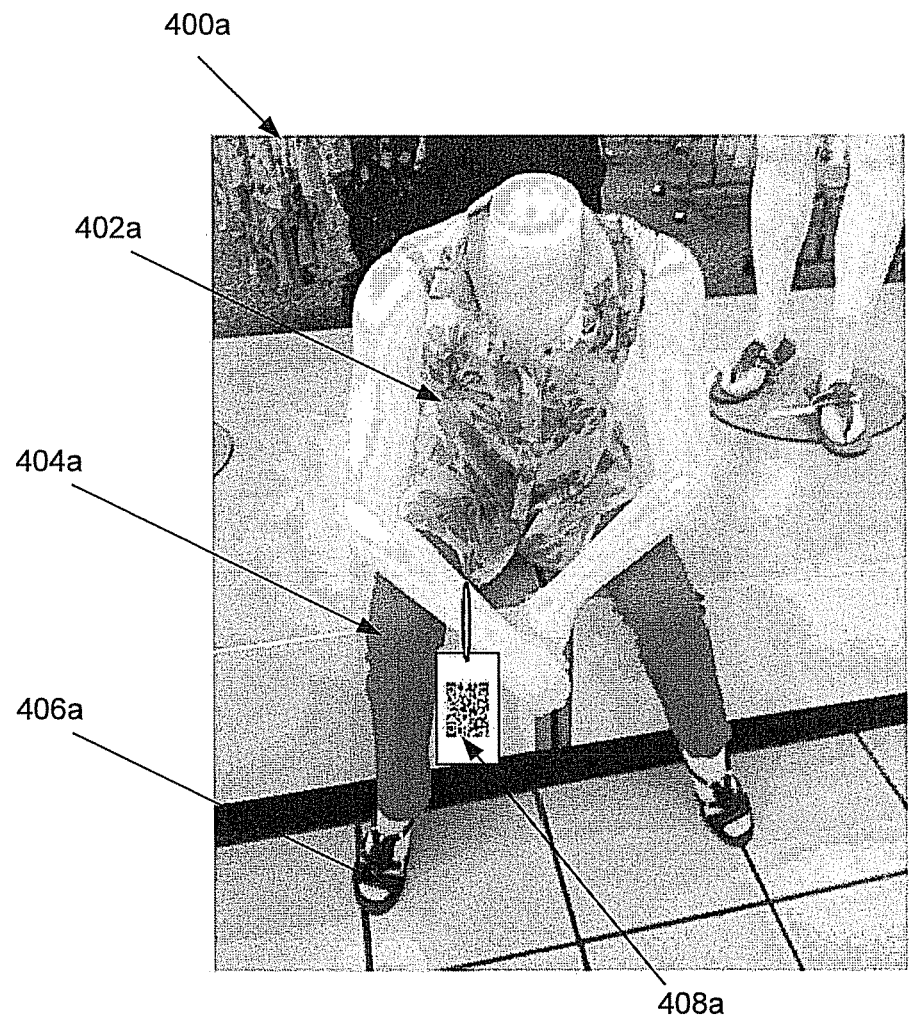
FIGS. 4A-4D illustrate product details and/or functionality selection pages appearing on a customer computing device after an outfit hang tag scan during a "scan, try and/or buy" experience associated with an outfit with a single hang tag, in accordance with an example embodiment of the disclosure.
Figure 4B:
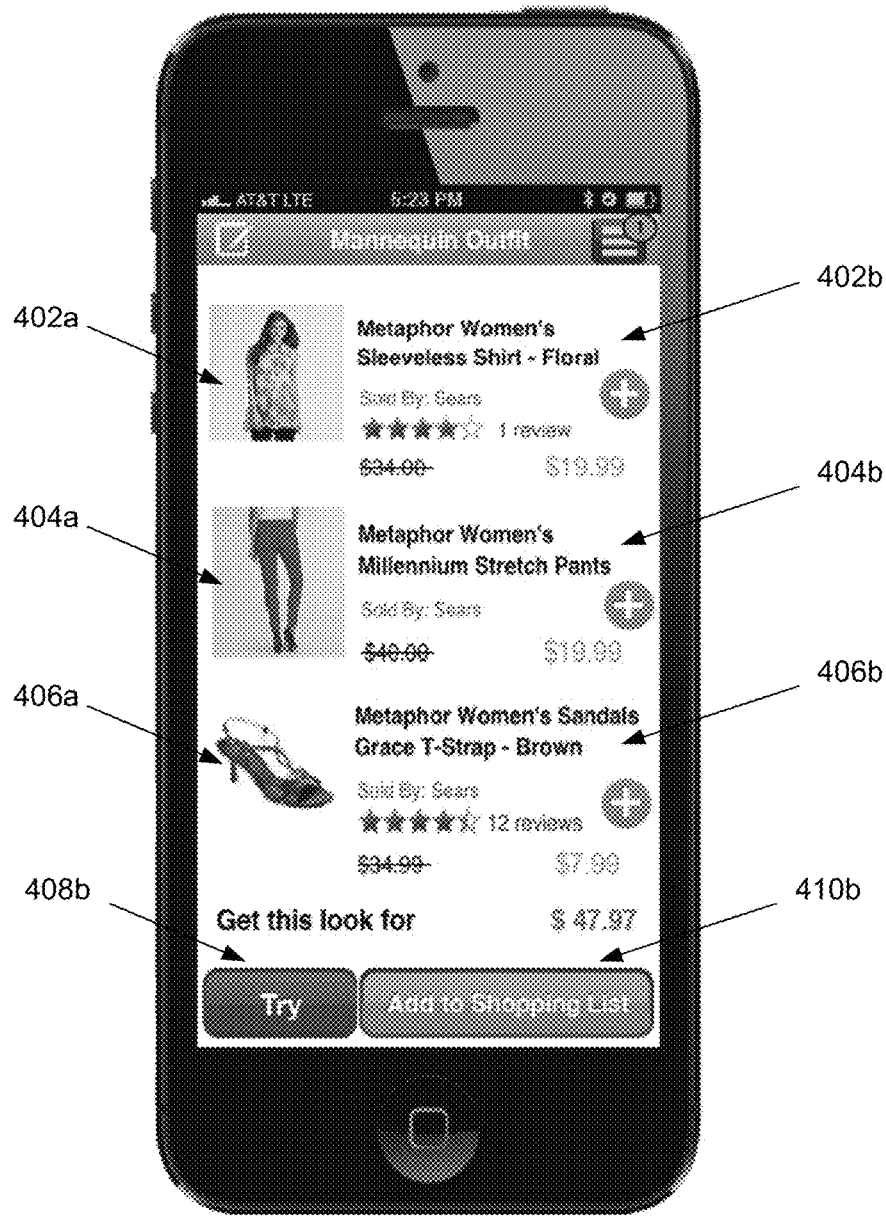

FIGS. 4A-4D illustrate product details and/or functionality selection pages appearing on a customer computing device after an outfit hang tag scan during a "scan, try and/or buy" experience associated with an outfit with a single hang tag, in accordance with an example embodiment of the disclosure. Referring to FIGS. 4A-4D, the app 216 may also provide "scan, try and/or buy" functionalities associated with an outfit. For example, an outfit 400a (FIG. 4A) may include items 402a, 404a, and 406a. The outfit 400a may also be associated with a tag and a single outfit code 408a (e.g., a QR code, a UPC, or an NFC tag). After the customer scans the outfit code 408a (e.g., using functionalities of the app 216 running on the customer device 200), all of the products 402a-406a associated with outfit 400a are displayed by the customer device 200 with an option to be loaded into the customer's electronic shopping cart or shopping list (associated with customer's shopping profile maintained by the host 68). As illustrated in FIG. 4B, outfit items 402a-406a are also displayed on the customer device, with additional item information 402b-406b, respectively. The customer may also be provided with the option to try the outfit items (e.g., by pressing button 408b), or add the displayed outfit items into the customer's shopping list (e.g., by pressing the button 410b).

Figure 4C:
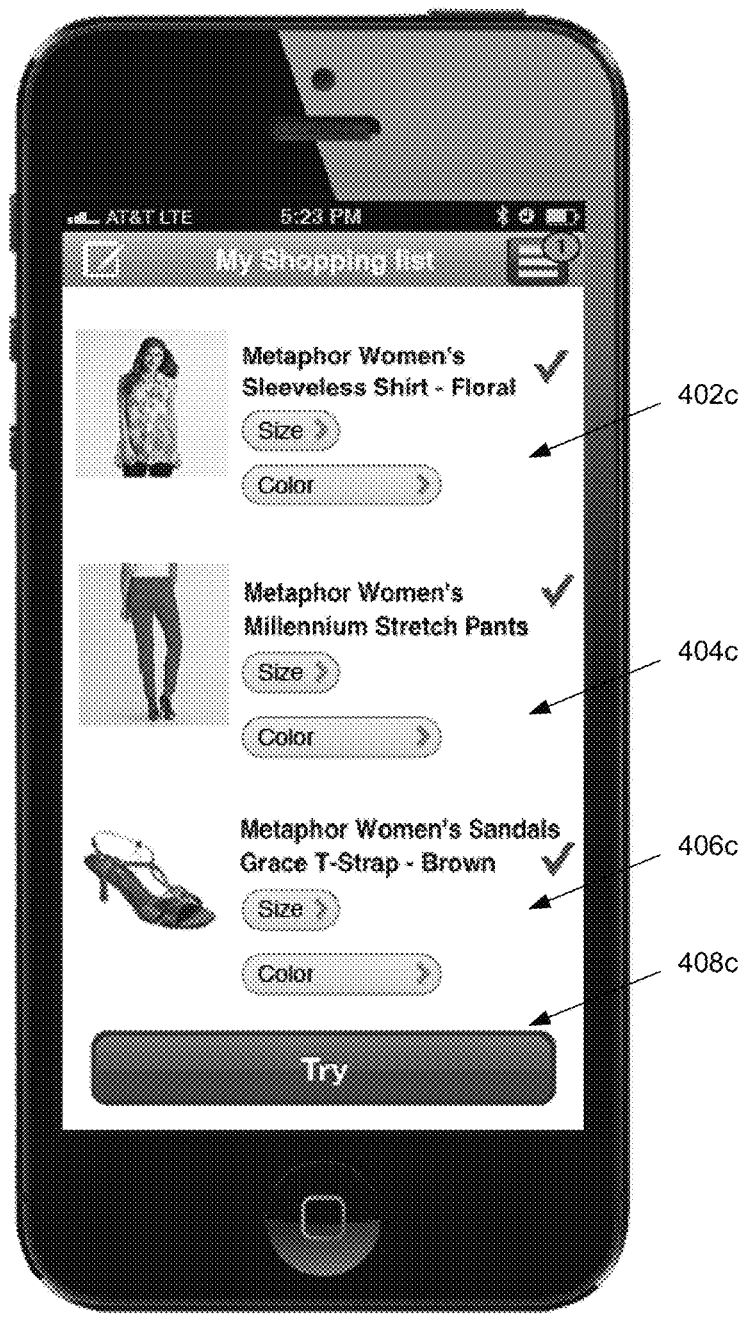
Figure 4D:
Figure 5A:
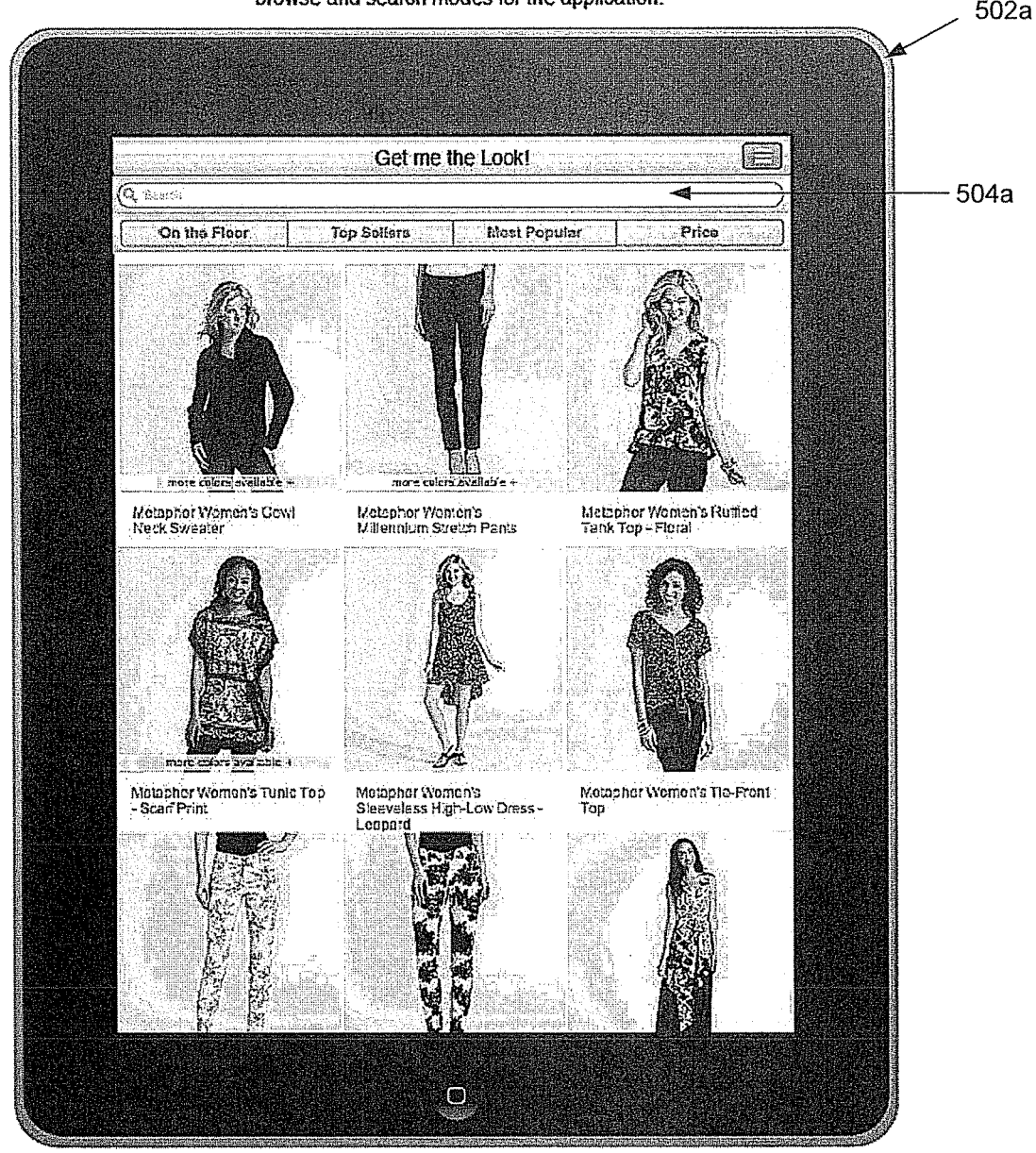
FIGS. 5A-5F illustrate product details and/or functionality selection pages appearing on a customer computing device after an outfit hang tag scan during a "scan, try and/or buy" experience associated with an outfit with a single hang tag, in accordance with an example embodiment of the disclosure.
Figure 5B:
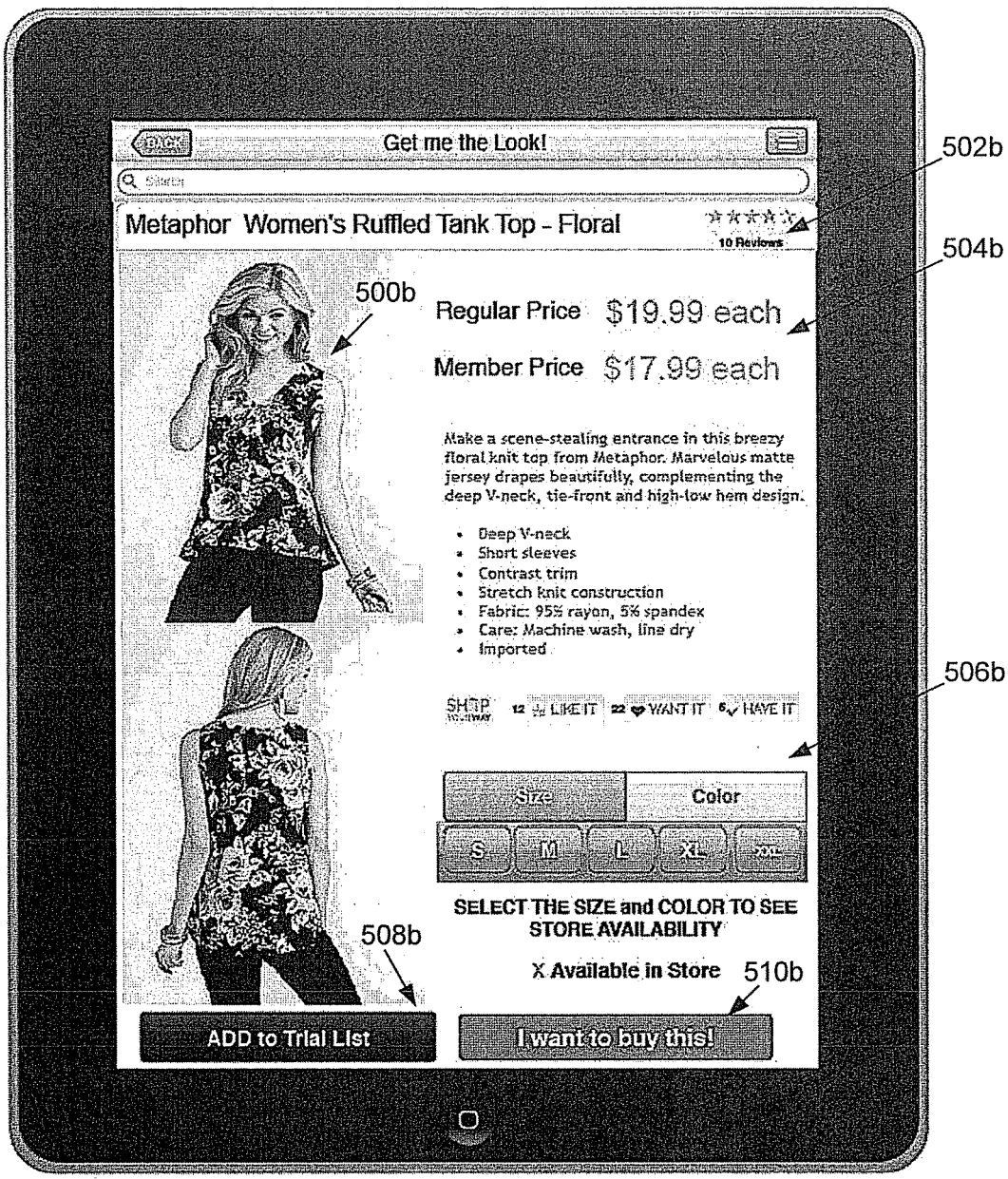
Figure 5C:
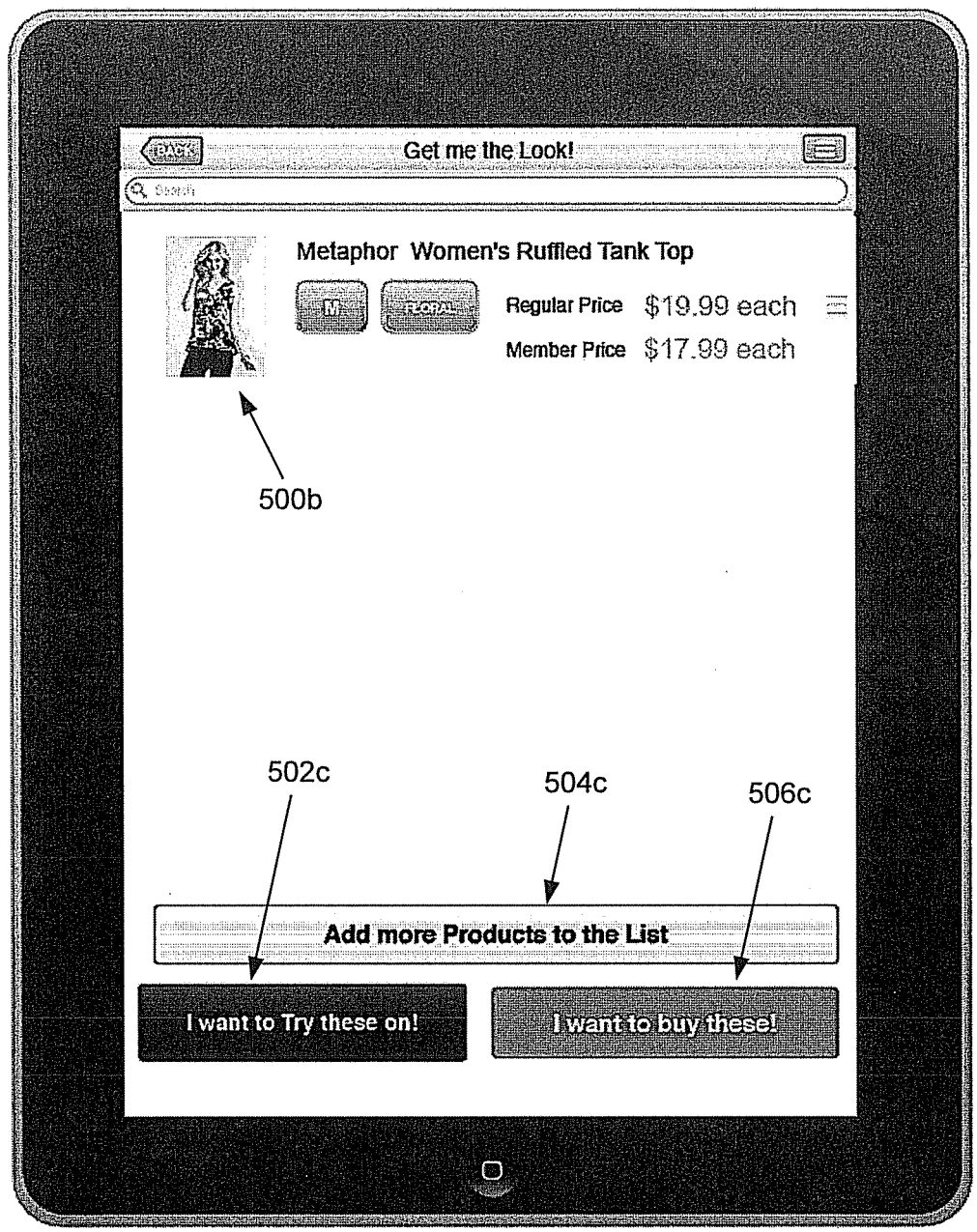
Figure 5D:
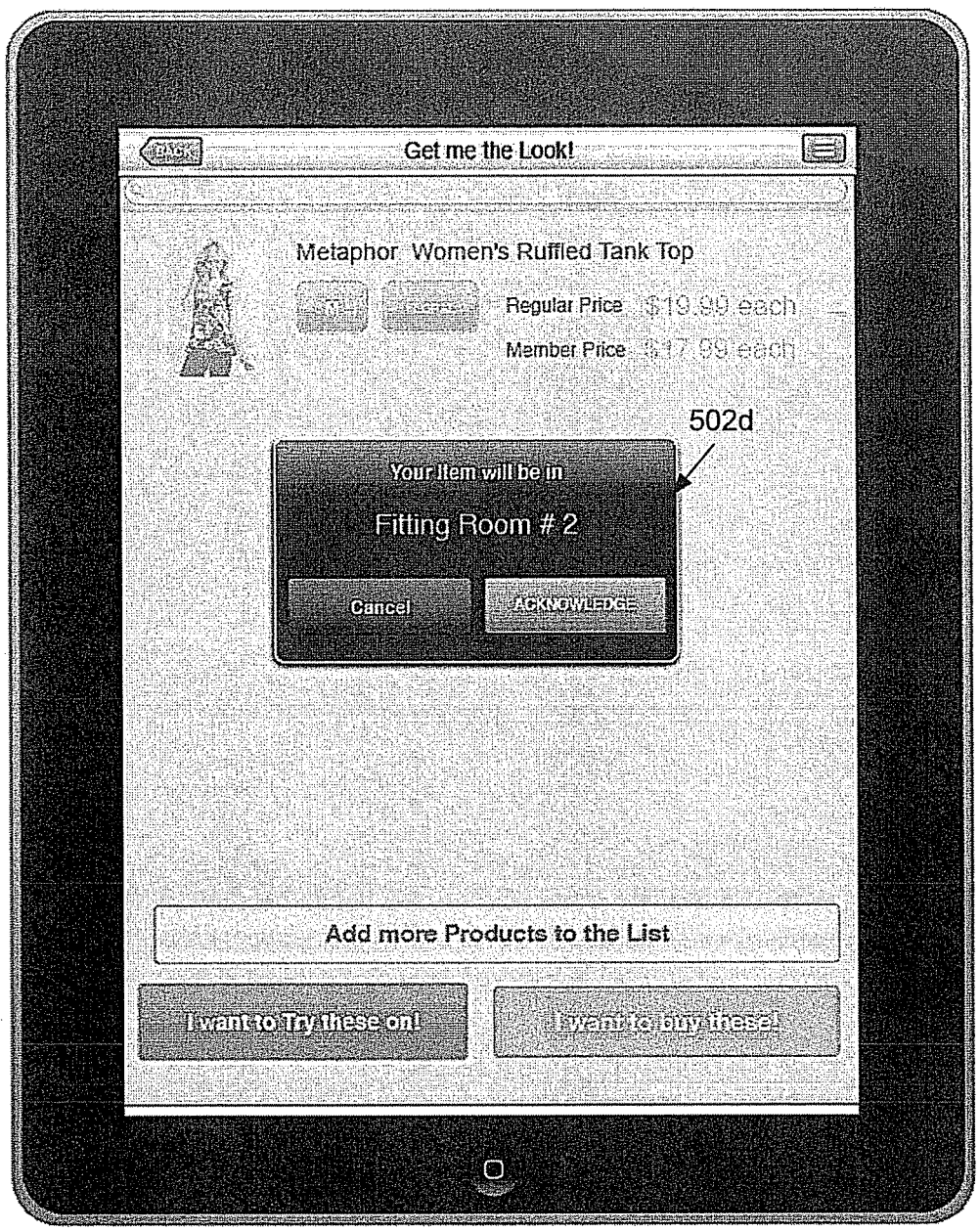
Figure 5E:
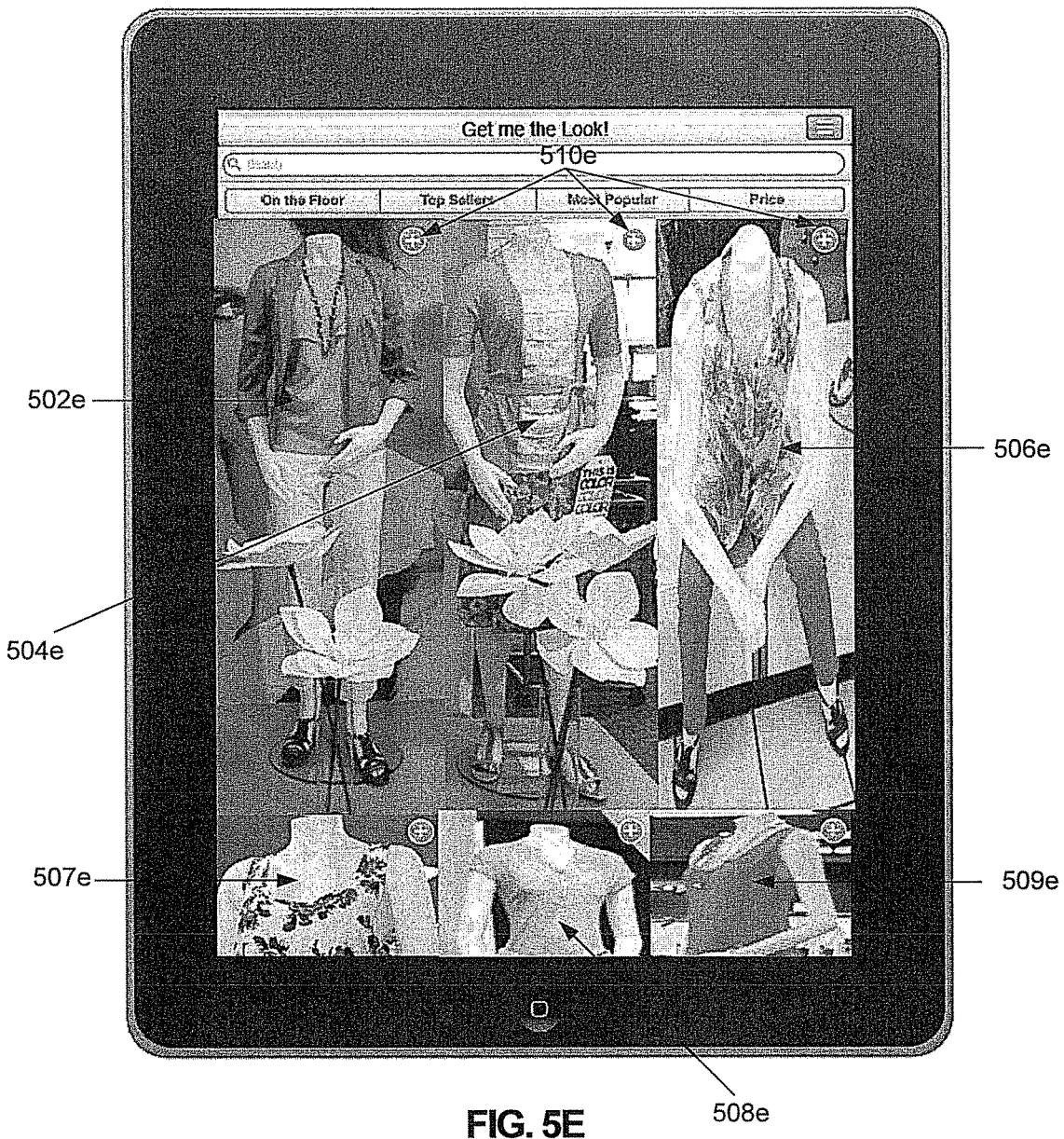
Figure 5F:
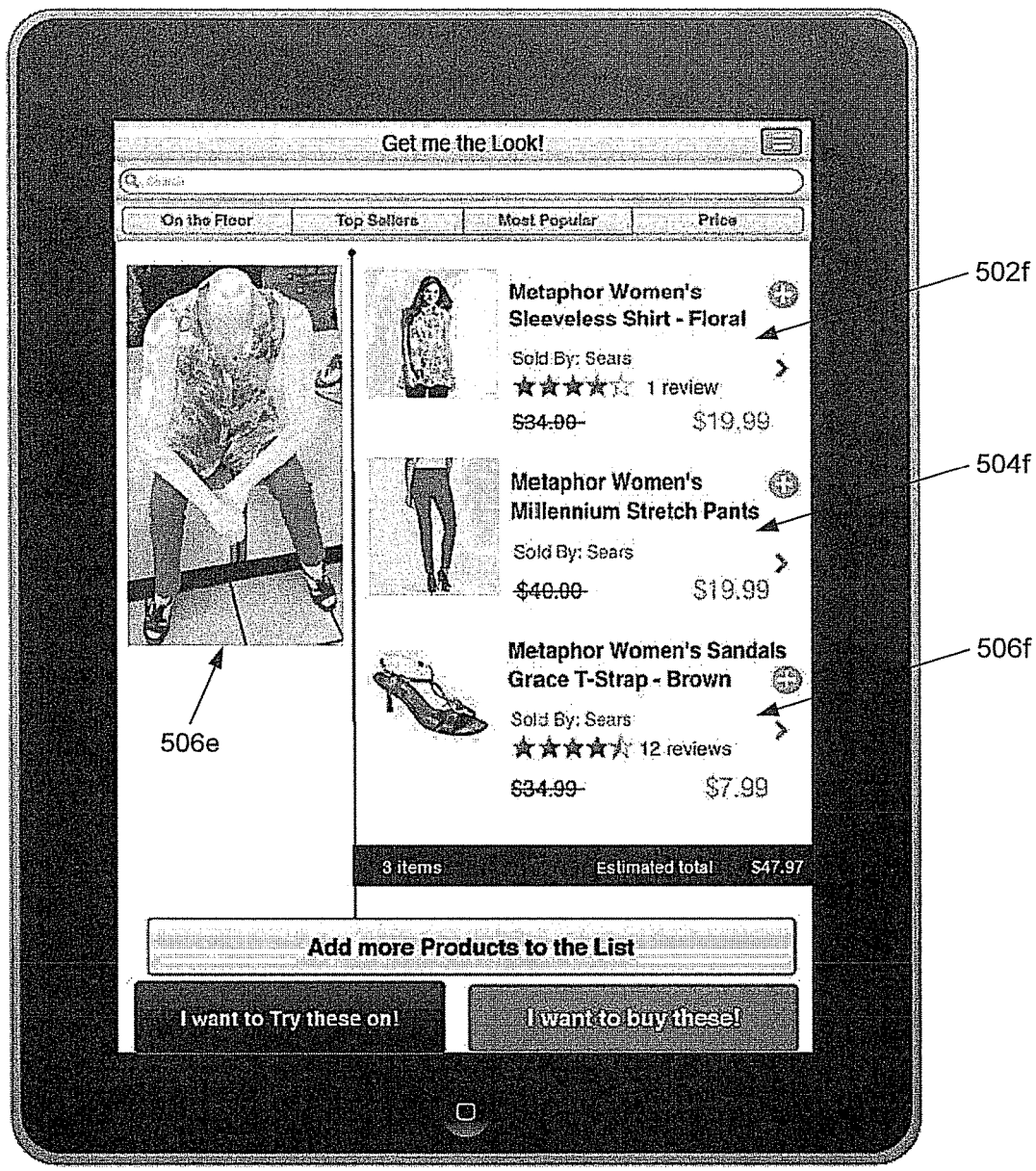

In instances when the customer decides that they would like to try the outfit items (e.g., the customer has pressed button 408b), the customer device may display item attribute selection buttons 402c-406c so that item attributes (e.g., size and color) may be selected for each item in the outfit. After item attributes are selected, the customer may proceed with having the items delivered to a fitting room for a trial (e.g., by pressing the TRY button 408c). A screen shot of the fitting room assignment 402d is illustrated in FIG. 4D.

FIGS. 5A-5F illustrate product details and/or functionality selection pages appearing on a customer computing device after an outfit hang tag scan during a "scan, try and/or buy" experience associated with an outfit with a single hang tag, in accordance with an example embodiment of the disclosure. In instances when the customer device (e.g., 502a in FIG. 5A) does not have any scanning capabilities (or the customer is not using the scanning capabilities of device 502a), the app 216 may provide "browse and search" functionalities where the customer may browse through an e-commerce web site 504a of the retailer and search for one or more products available for purchase from the retailer. Once the customer selects (e.g., clicks on) a given product, a product details page 502b (in FIG. 5B) may be displayed. The product details page 502b may include a photo 500b of the selected product, product price 504b, product attributes selection 506b (e.g., size and color), "add to trial list" selection 508b, and purchase selection 510b.

If the product 500b is added to the trial list, the customer may still select to add additional products to the trial list (e.g., selecting button 504c in FIG. 5C), select the items in the trial list for trial in a fitting room (by selecting button 502c), or buy the products in the trial list (by selecting button 506c). If the customer selects an item for trial (selecting 502c), a fitting room notification 502d (FIG. 5D) may be displayed.

The app 216 may also provide "browse and search" functionalities where the customer may browse through an e-commerce web site 504a of the retailer and search for one or more outfits 502e-509e (FIG. 5E) products available for purchase from the retailer. A desired outfit may be selected and added to the customer trial list by using the "add" buttons 510e. Once an outfit (e.g., 506e) is selected, the device 502a may display information 502f-506f (e.g., item photo, price, ratings/reviews, add-to-list functionality, etc.) for each of the items that make up the outfit 506e.

In accordance with an example embodiment of the disclosure, various item statistics (or information) may be collected at different point of the above described "scan, try and/or buy" experiences. For example, information on item attributes (e.g., size, color, style, etc.) associated with items discarded/returned in a fitting room, items purchased and designated for shipment or pick-up and items available in stock may all be fed back to the host 68 to manage inventory in retailer's warehouse(s) and ensure appropriate stock is available in the retailer's store(s).

Figure 6A:
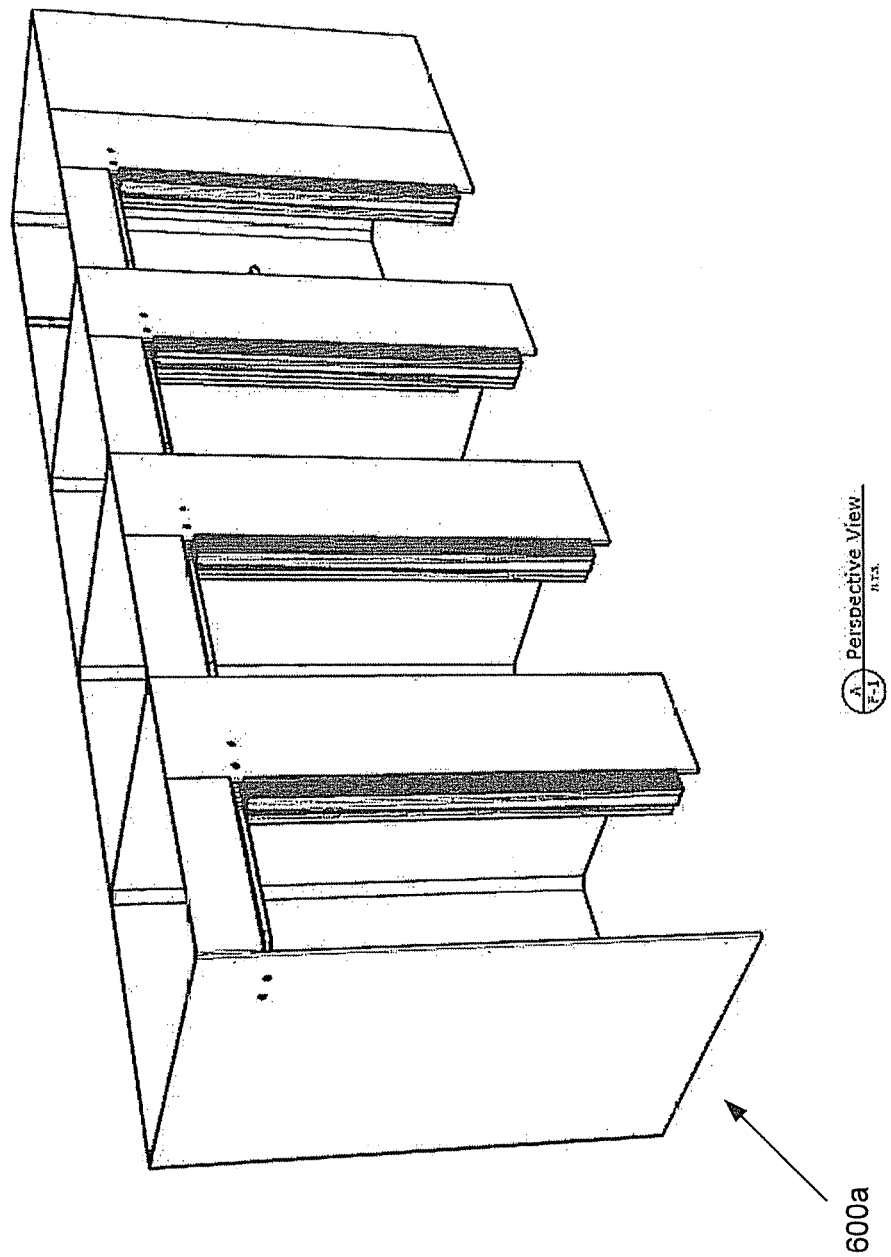
FIGS. 6A-6B illustrate various views of a first fitting room design, which may be used in accordance with an example embodiment of the disclosure.
Figure 6B:
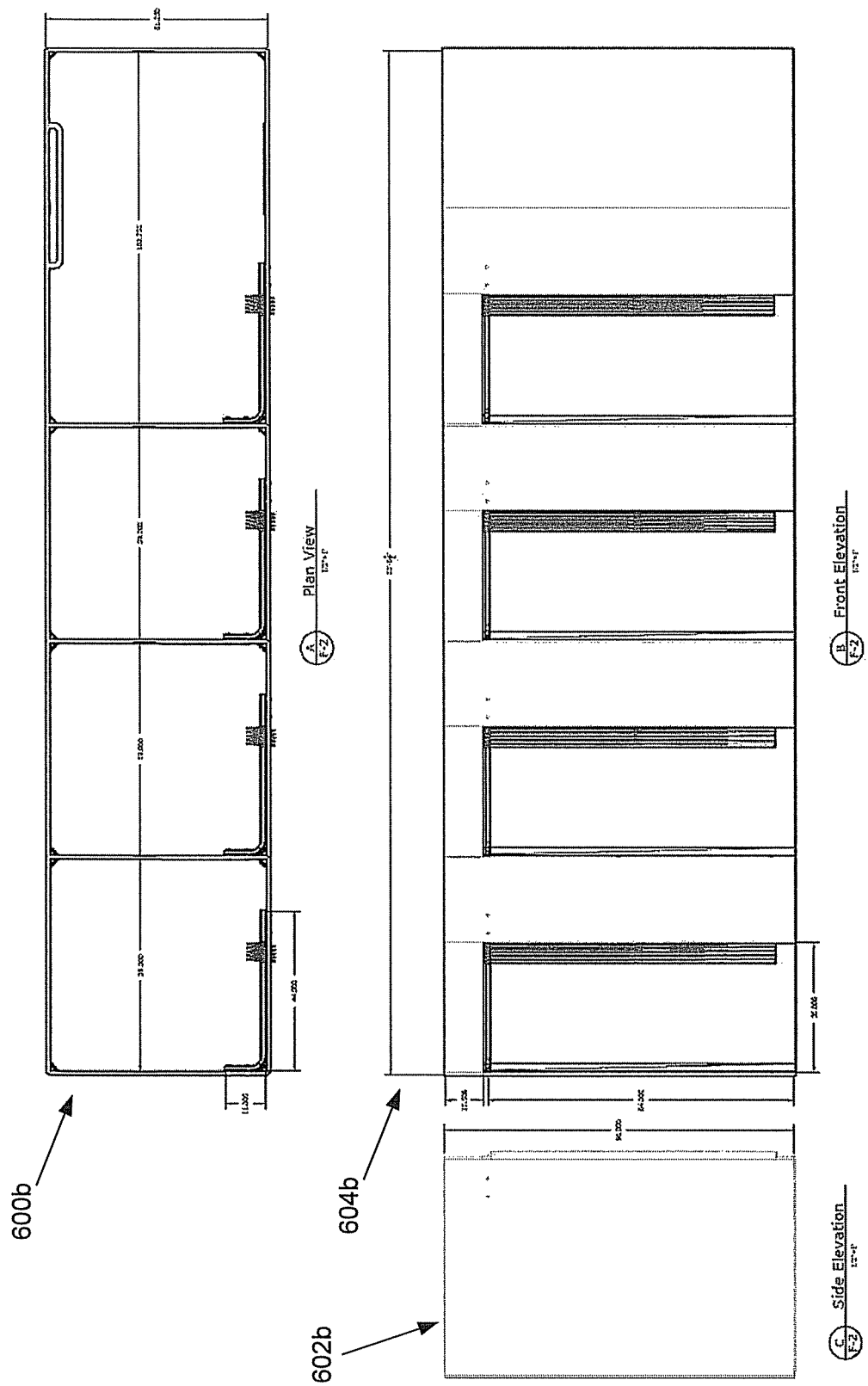

FIGS. 6A-6B illustrate various views of a first fitting room design, which may be used in accordance with an example embodiment of the disclosure. Referring to FIG. 6A, there is illustrated a perspective view of a first fitting room design, which may be used in accordance with an example embodiment of the disclosure. Referring to FIG. 6B, there is illustrated a plan view 600b, a side elevation view 602b, and a front elevation view 604b of the first fitting room design, which may be used in accordance with an example embodiment of the disclosure.

Figure 7A:
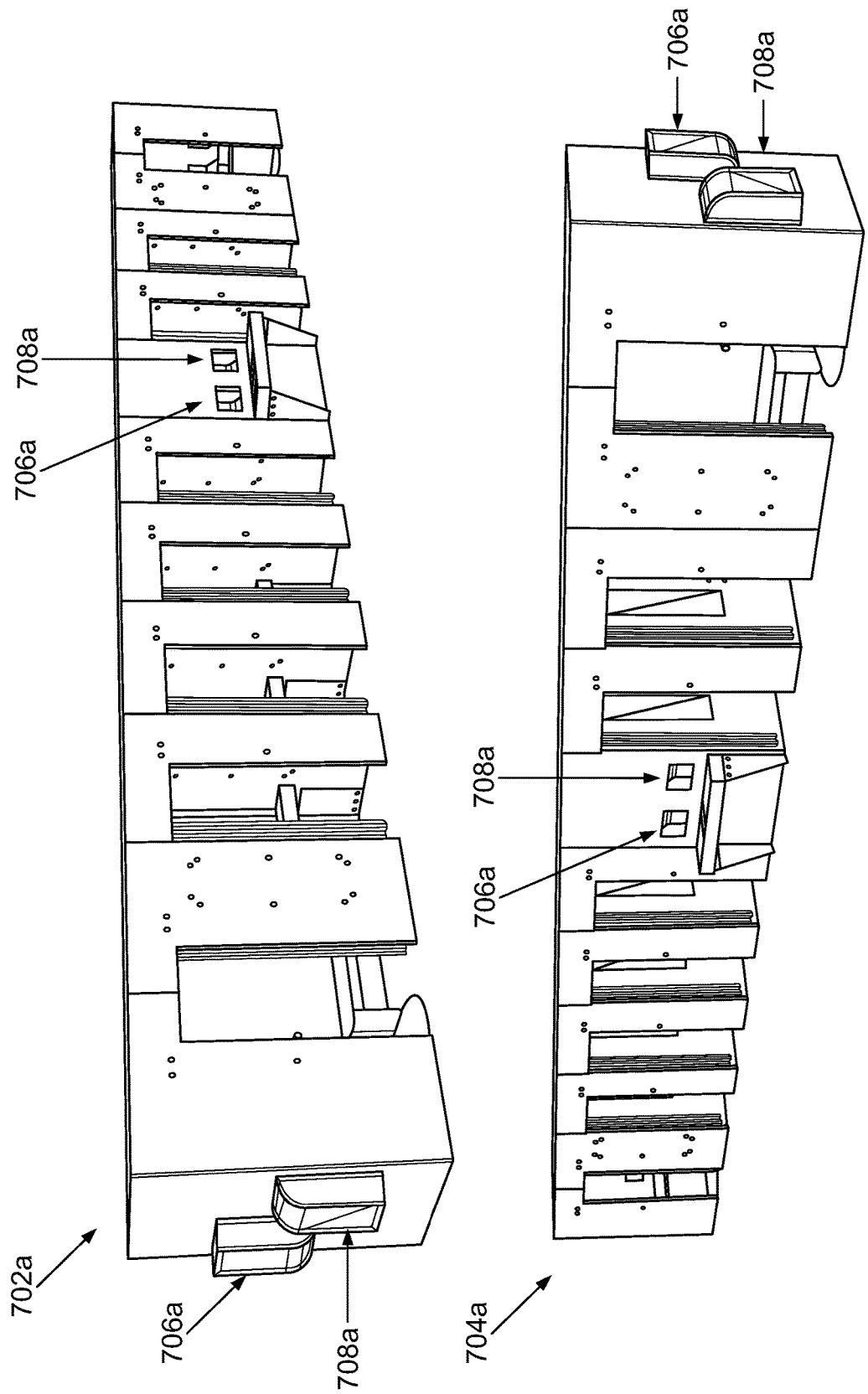

FIGS. 7A-7E illustrate various views of an example second fitting rooms design using item delivery and item return chutes, which may be used in accordance with an example embodiment of the disclosure. Referring to FIG. 7A, there are illustrated perspective views 702a-704a of the second fitting room design. As seen in FIG. 7A, the illustrated fitting rooms may utilize a product delivery chute 706a and a product return chute 708a. The items being delivered to the fitting room via chute 706a may be dropped in the chute and delivered to the fitting room manually (e.g., by a sales associate) or automatically (e.g., via a mechanical delivery mechanism and/or conveyor belt). Similarly, the items being taken away from the fitting room (e.g., unwanted, discarded items) via chute 708a may be dropped in the chute and taken away from the fitting room manually (e.g., by a sales associate) or automatically (e.g., via a mechanical delivery mechanism and/or conveyor belt).

Figure 7B:
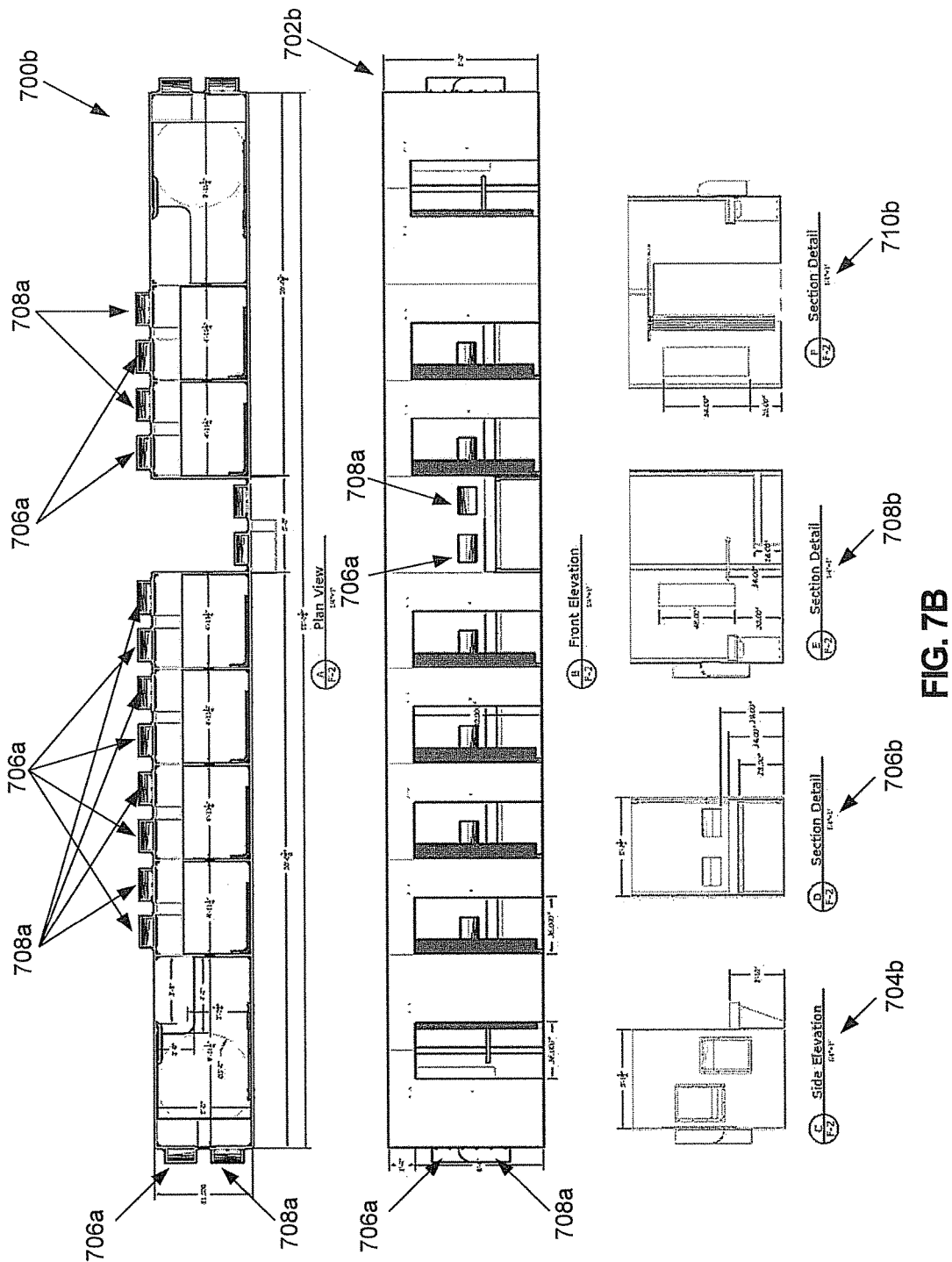

FIG. 7B illustrates a plan view 700*b*, a front elevation view 702*b*, a side elevation view 704*b*, and section detail views 706*b*-710*b* of the second fitting room design, using product delivery chutes 706*a* and product return chutes 708*a*.

FIG. 7C illustrates an example mechanical structure (or shell), which may be mounted to an opening of a fitting room in order to obtain product delivery chutes 706*a* and product return chutes 708*a*.

Figure 7D:
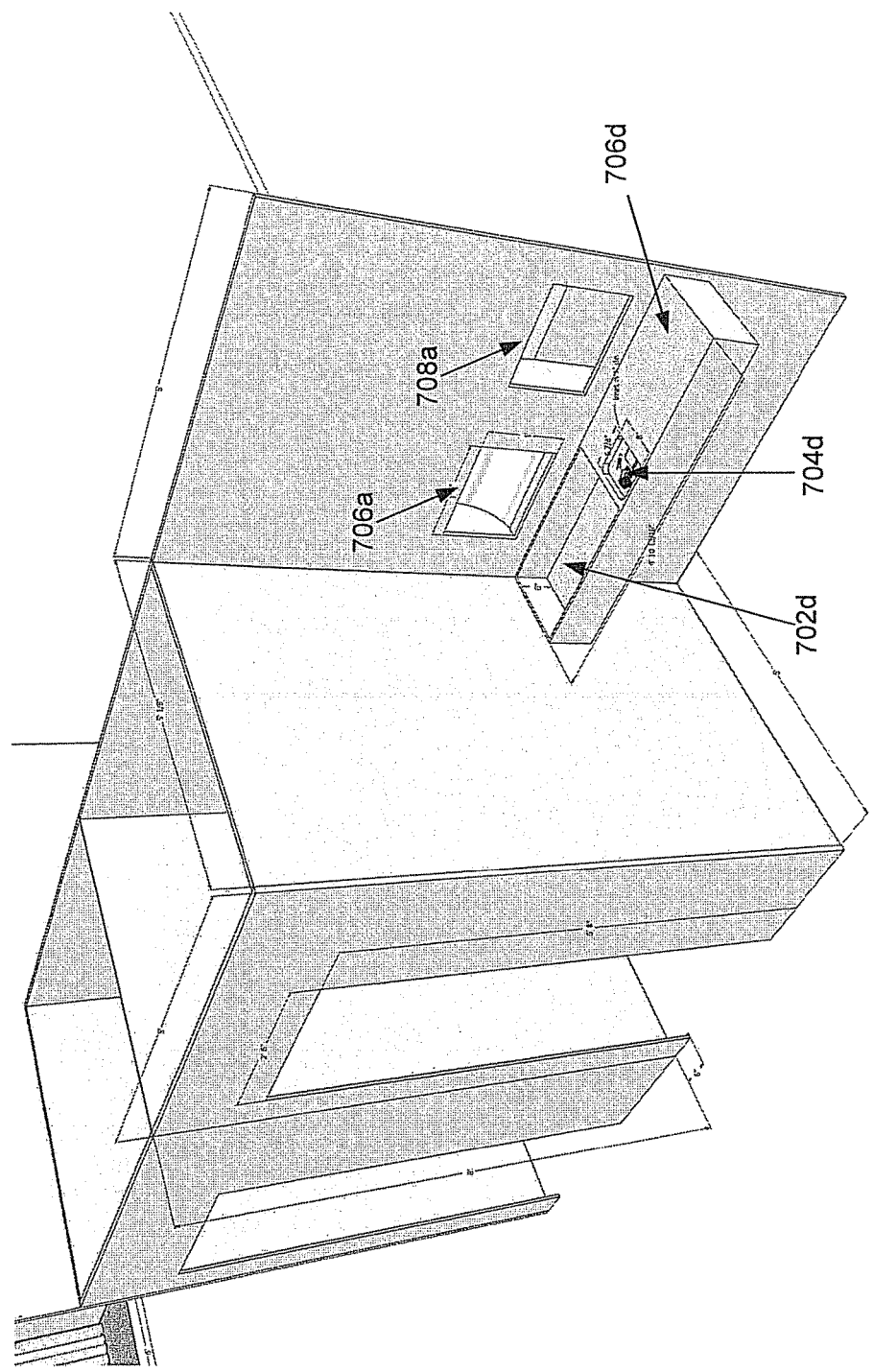
Figure 7E:
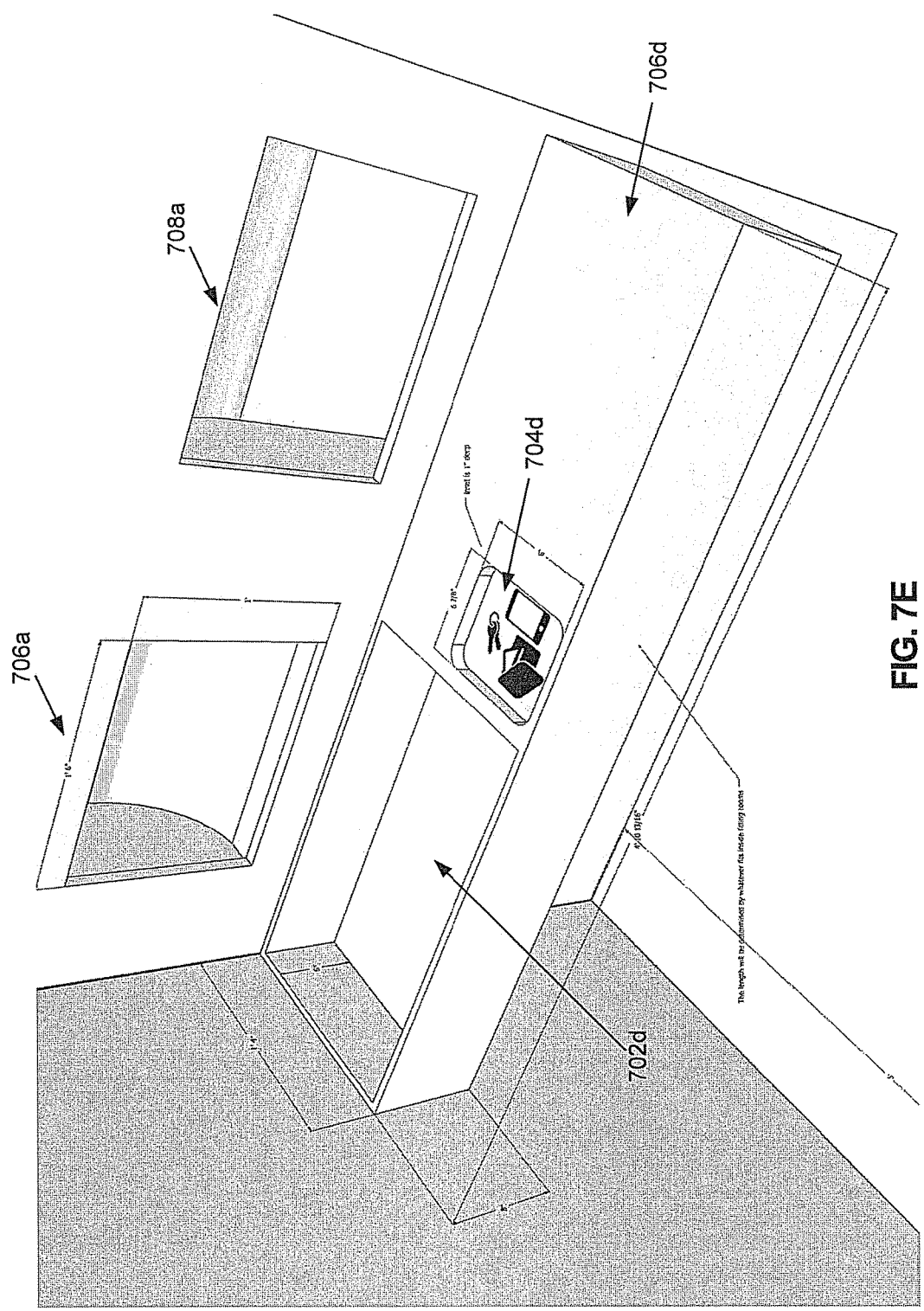
Figure 7F:
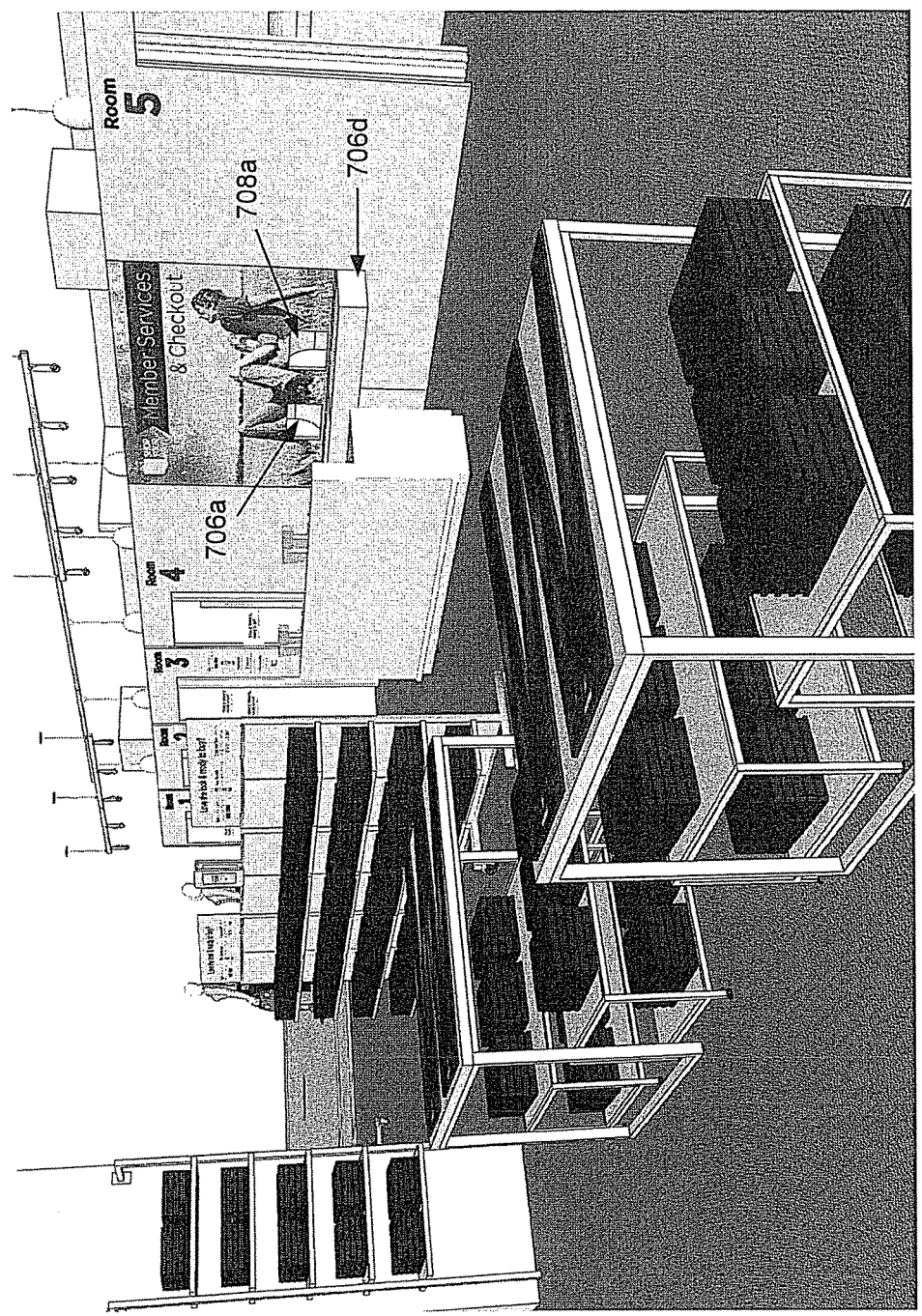

FIGS. 7D-7E illustrate an example counter area 706*d*, which may be located near a check-out location of a retail store and/or inside a fitting room. The counter area 706*d* may include a recessed tray area 702*d*, which may be disposed in the vicinity of the product delivery chute 706*a*. The counter area 706*d* may also include personal items space 704*d*, which may be used by a customer to place personal belongings during a product fitting.

Figure 7G:
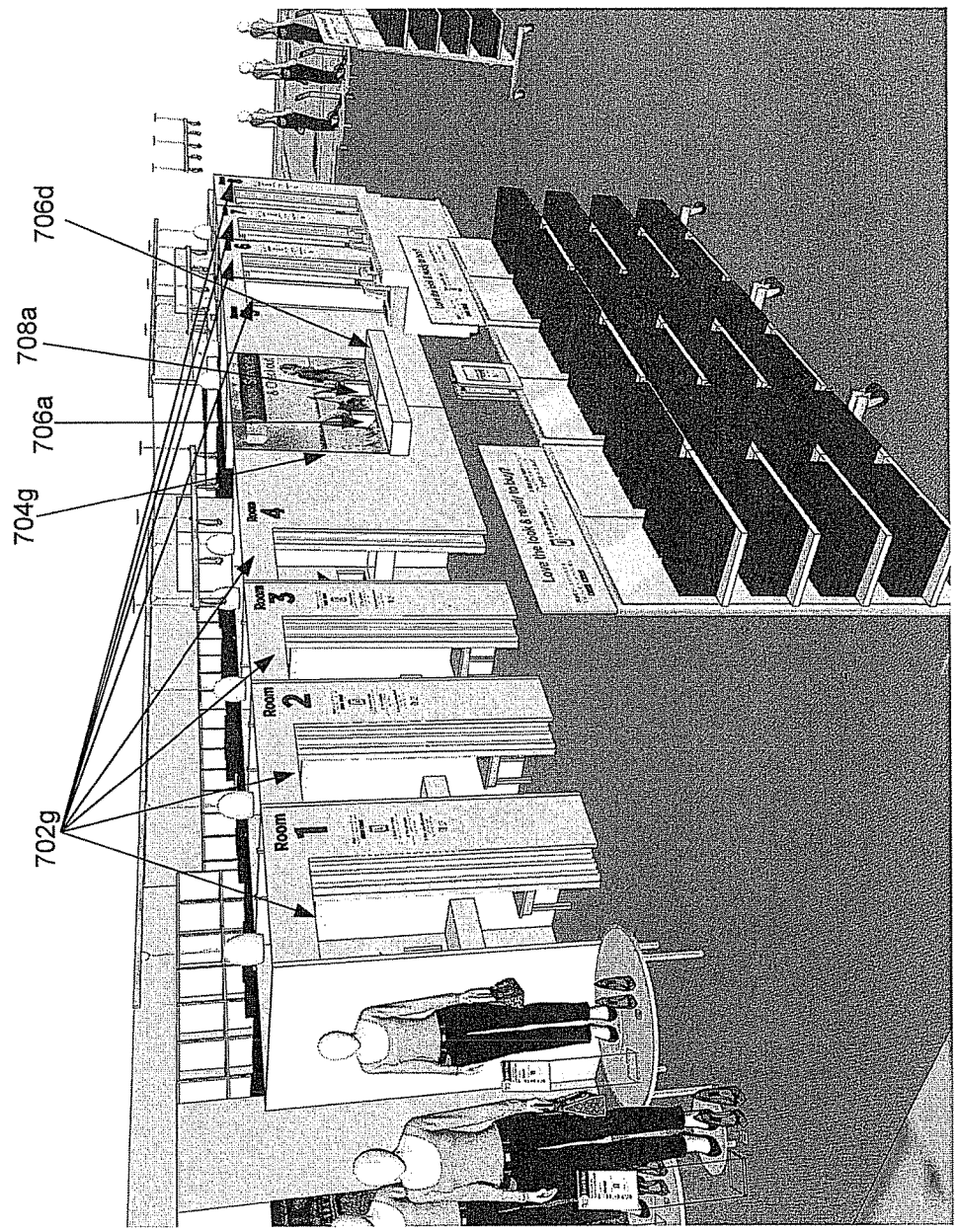
Figure 7H:
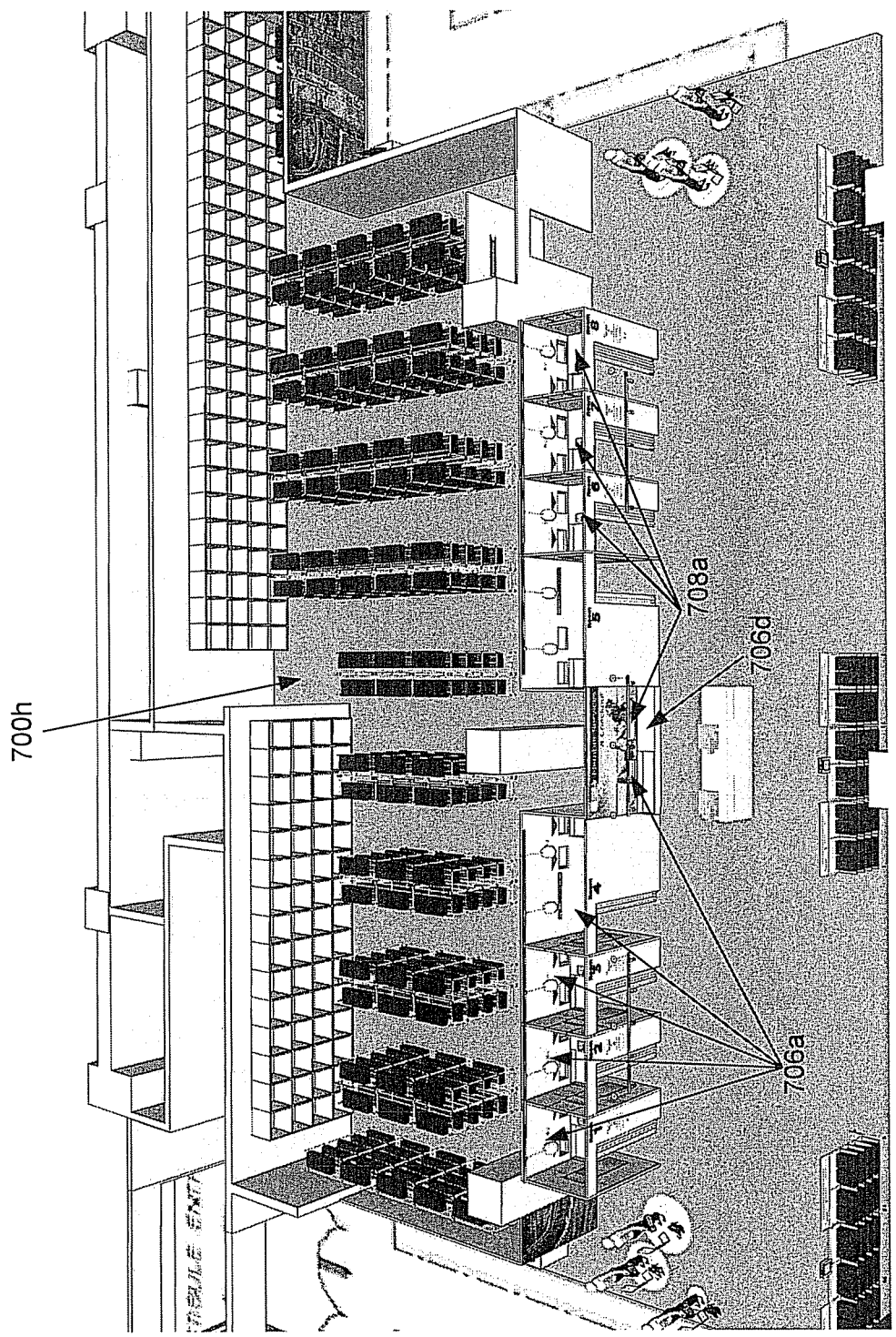
Figure 71:
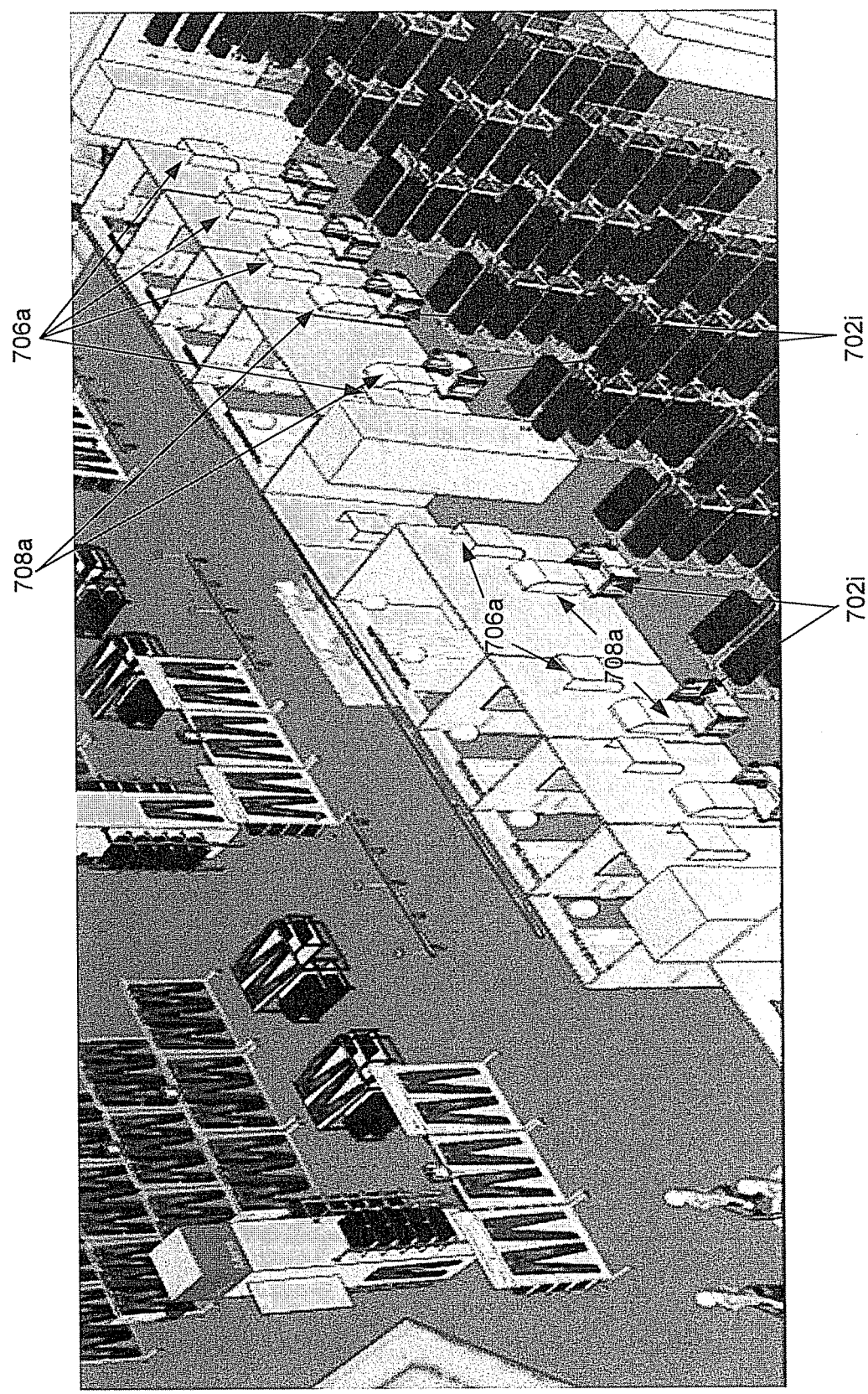

FIGS. 7F-7I illustrate various views of an example product floor space arrangement using the fitting rooms design of FIGS. 7A-7E, in accordance with an example embodiment of the disclosure. FIG. 7G illustrates an example arrangement of fitting rooms 702*g* near a product check-out area 704*g*. FIG. 7H illustrates example arrangement 700*h* of product space near the fitting rooms 702*g*. FIG. 7I illustrates the back side of the fitting rooms 702*g*, showing the delivery chutes 706*a* and the return chutes 708*a*. Additionally, the return chutes 708*a* may use product collection bins 702*i* for collecting the discarded/returned products.

Figure 8A:
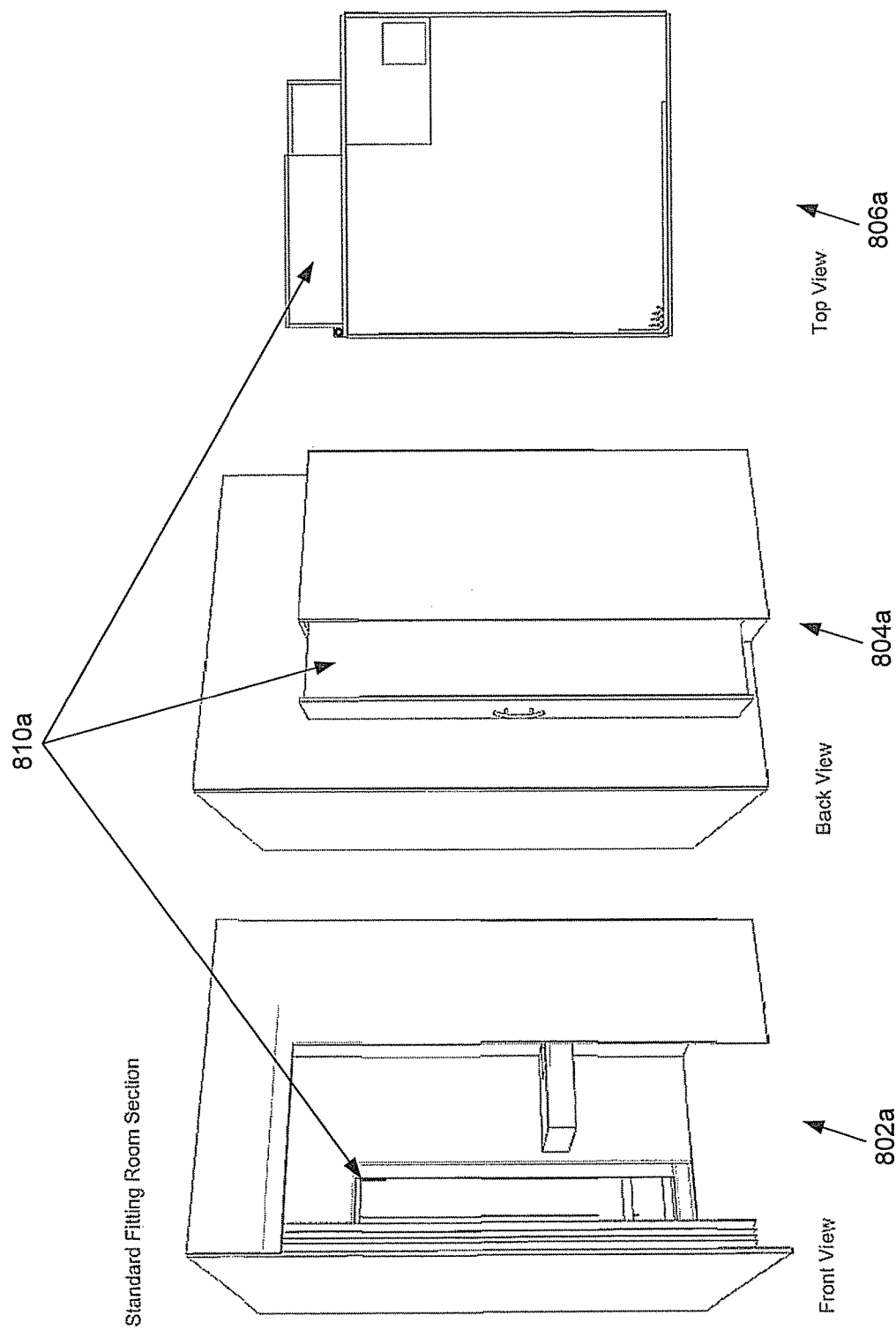
FIGS. 8A-8C illustrate various views of a third fitting room design, which may be used in accordance with an example embodiment of the disclosure.
Figure 8B:
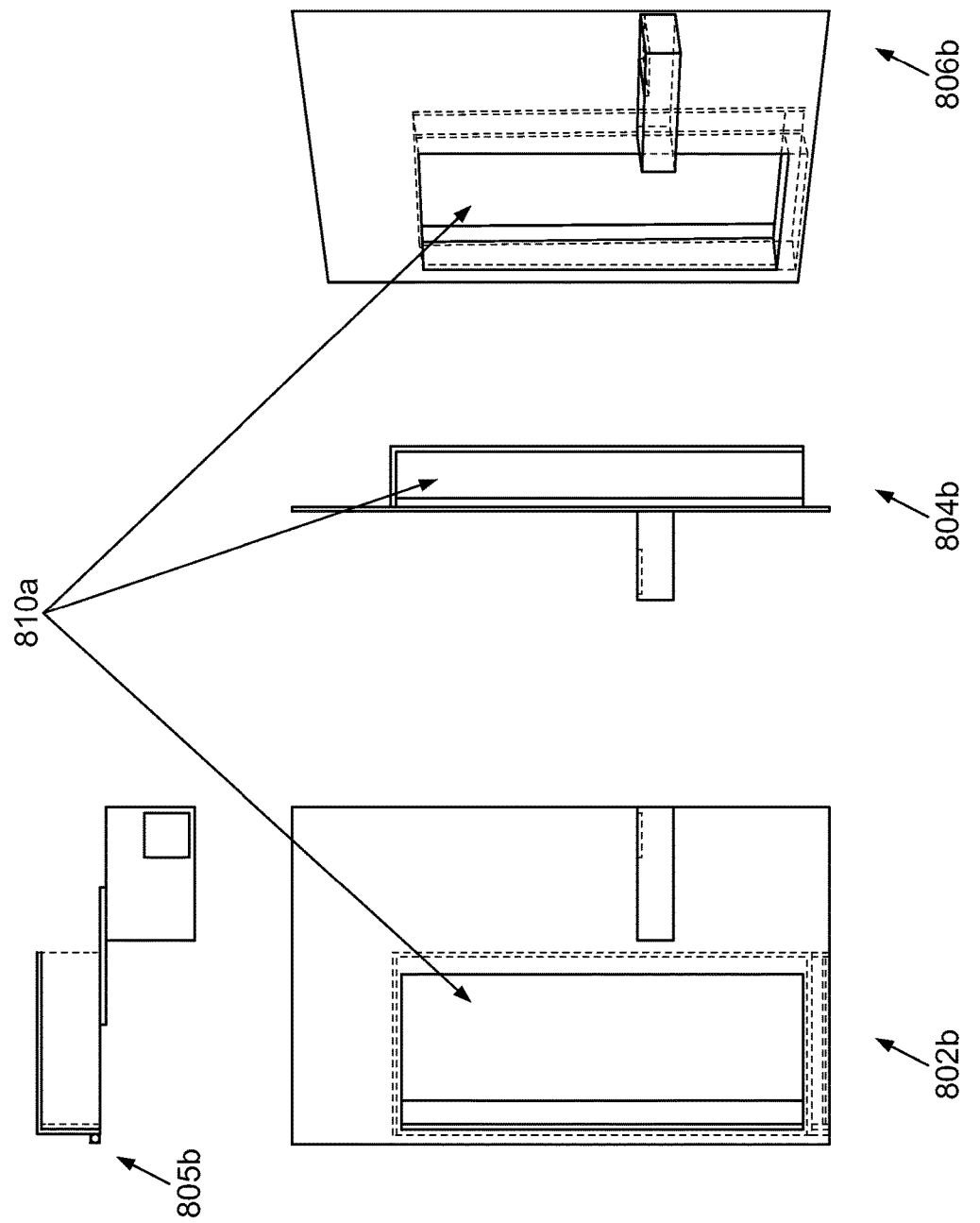
Figure 8C:
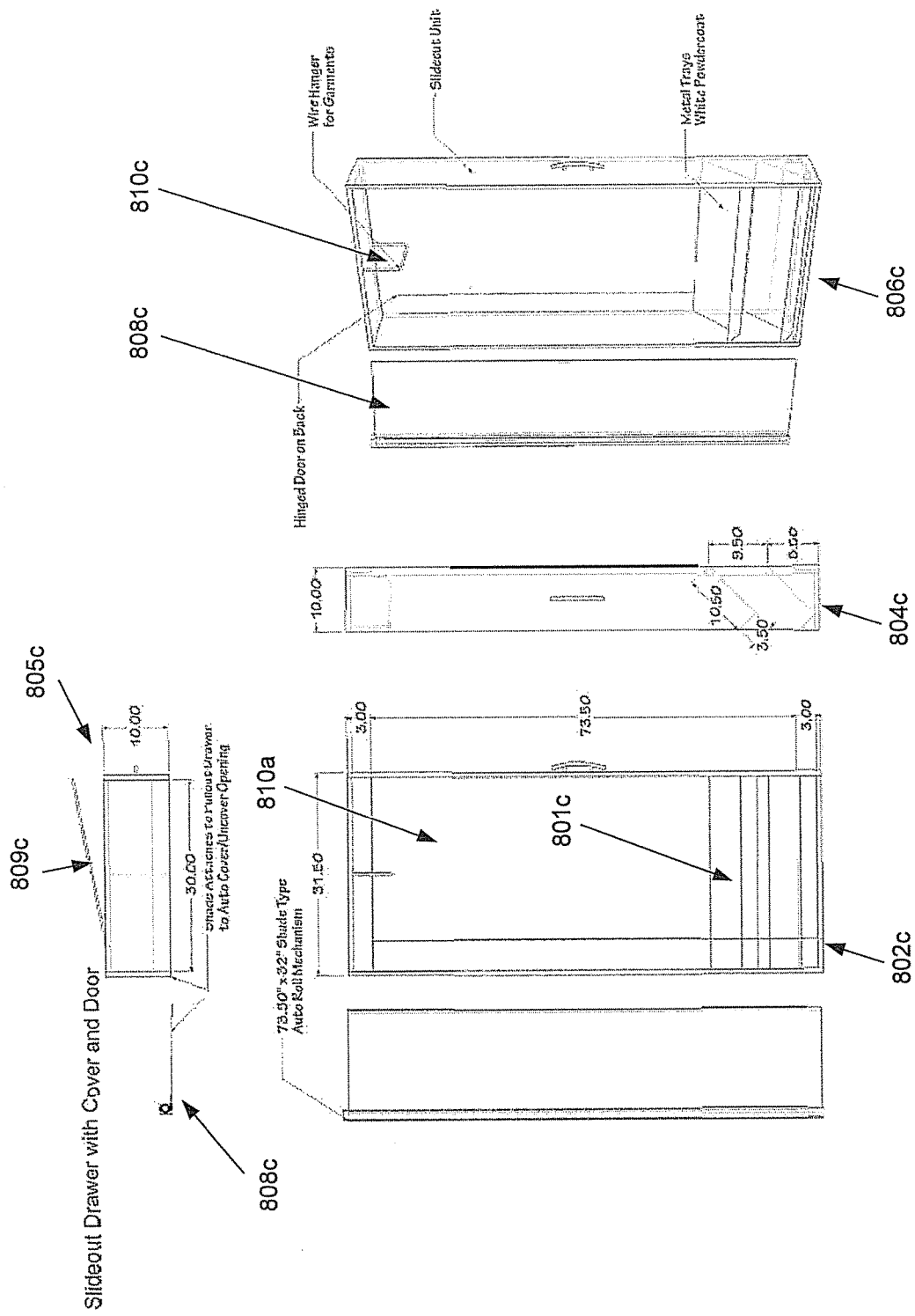

FIGS. 8A-8C illustrate various views of a third fitting room design, which may be used in accordance with an example embodiment of the disclosure. More specifically, FIG. 8A illustrates a front view 802*a*, a back view 804*a*, and a top view 806*a* of a third fitting room design, which includes a slideout drawer (or closet) 810*a* with cover and door. FIG. 8B illustrates a front view 802*b*, a side view 804*b*, a top view 805*b*, and a perspective view 806*b* of the slideout drawer 810*a* with cover and door.

FIG. 8C illustrates a front view 802*c*, a side view 804*c*, a top view 805*c*, and a perspective view 806*c* of the slideout drawer 810*a* with cover (e.g., 808*c*) and door (e.g., 809*c*). The drawer 810*a* may also include trays 801*c* (e.g., for placing shoes or other small items in the drawer 810*a*), and a hanger 810*c*.

Figure 9A:
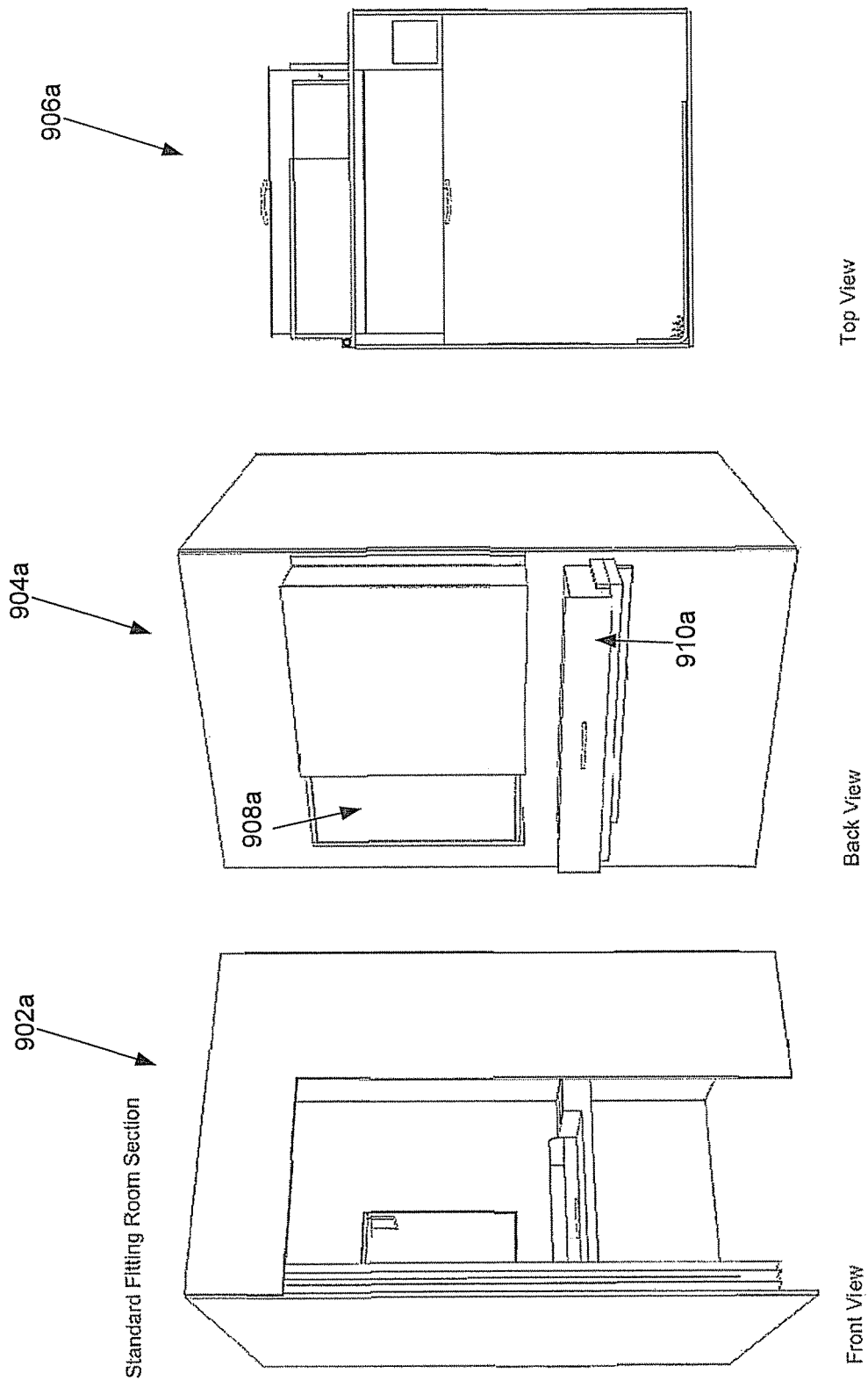
Figure 9C:
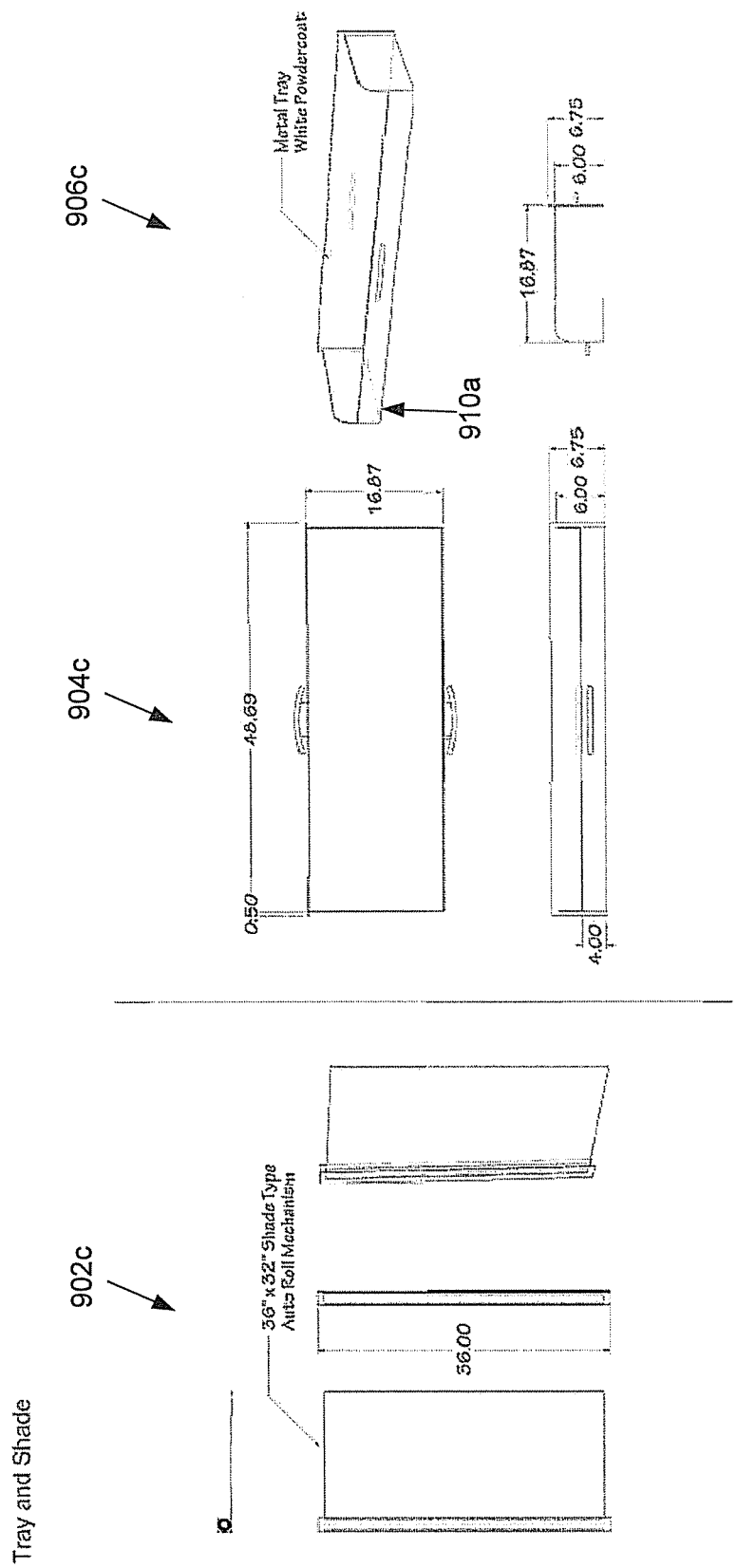

FIGS. 9A-9D illustrate various views of a fourth fitting room design, which may be used in accordance with an example embodiment of the disclosure. FIG. 9A illustrates a front view 902*a*, a back view 904*a*, and a top view 906*a* of the fourth fitting room design using a slideout drawer 908*a* and a pullout tray 910*a*. FIG. 9B illustrates a top view 902*b*, a front view 904*b*, a side view 906*b*, and a perspective view 908*b* of the back wall of the fourth fitting room design of FIG. 9A. FIG. 9C illustrates various views 902*c* of the shade (e.g., 910*d* in FIG. 8D) used in connection with the slideout drawer 908*a*, as well as various views 904*c*-906*c* of the pullout tray 910*a*. FIG. 9D illustrates a top view 902*d*, front views 904*d*-906*d*, and a side view 908*d* of the slideout drawer 908*a*. The drawer 908*a* may also include a shade 910*d* and a hanger 912*d*.

Figure 10:
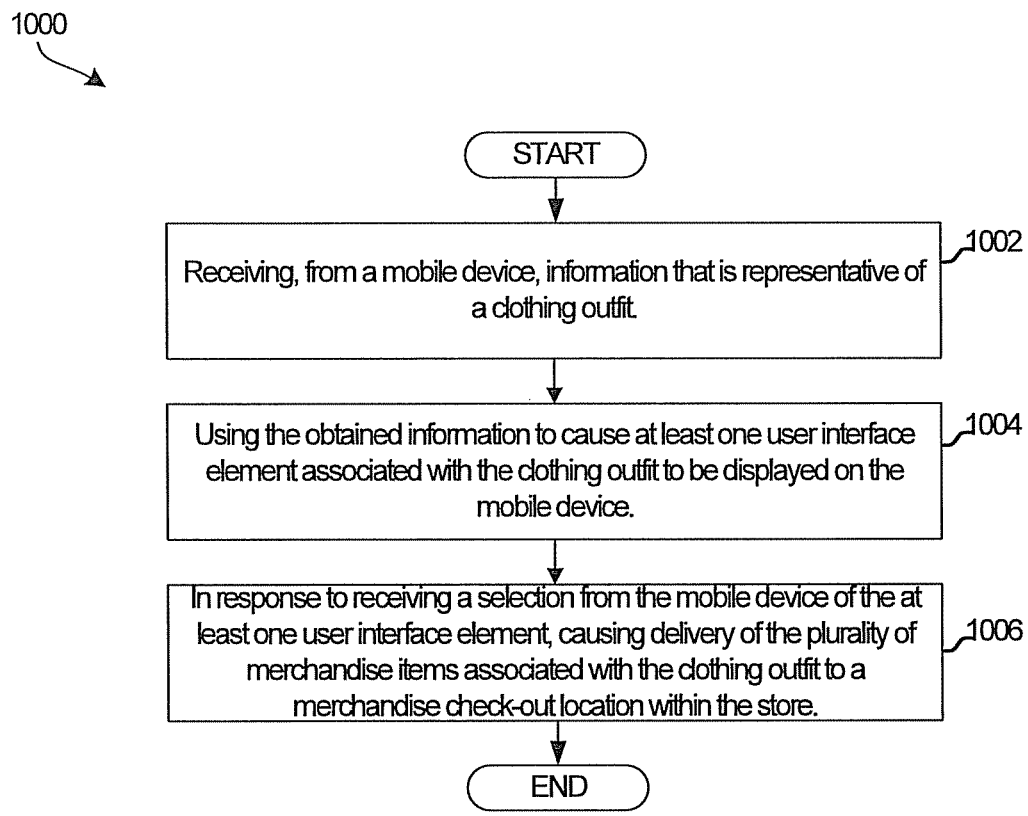
FIG. 10 is a flow chart illustrating example steps of a method for providing a scan, try and/or buy experience, in accordance with an example embodiment of the disclosure.

FIG. 10 is a flow chart illustrating example steps of a method for providing a scan, try and/or buy experience, in accordance with an example embodiment of the disclosure. Referring to FIG. 10, the example method 1000 may start at 1002, when information that is representative of a clothing outfit (e.g., QR code on tag 408*a*) may be received from a mobile device (e.g., 200). The clothing outfit may include a plurality of merchandise items (e.g., 402*a*-406*a*) available for purchase through a store. The information may be obtained by the mobile device by scanning a single code (e.g., code on tag 408*a*) associated with the clothing outfit. At 1004, the obtained information may be used to cause at least one user interface element associated with the clothing outfit to be displayed on the mobile device (e.g., as illustrated in FIGS. 4A-4C). At 1006, in response to receiving a selection from the mobile device of the at least one user interface element (e.g., entering product attributes such as size, color and then selecting the product for trial and purchase), causing delivery of the plurality of merchandise items associated with the clothing outfit to a merchandise check-out location within the store (e.g., as illustrated in FIGS. 3Y-3EE). The merchandise check-out location may be operable to receive payment from the user for the clothing outfit (e.g., as illustrated in FIGS. 3Y-3EE).

Figure 11:
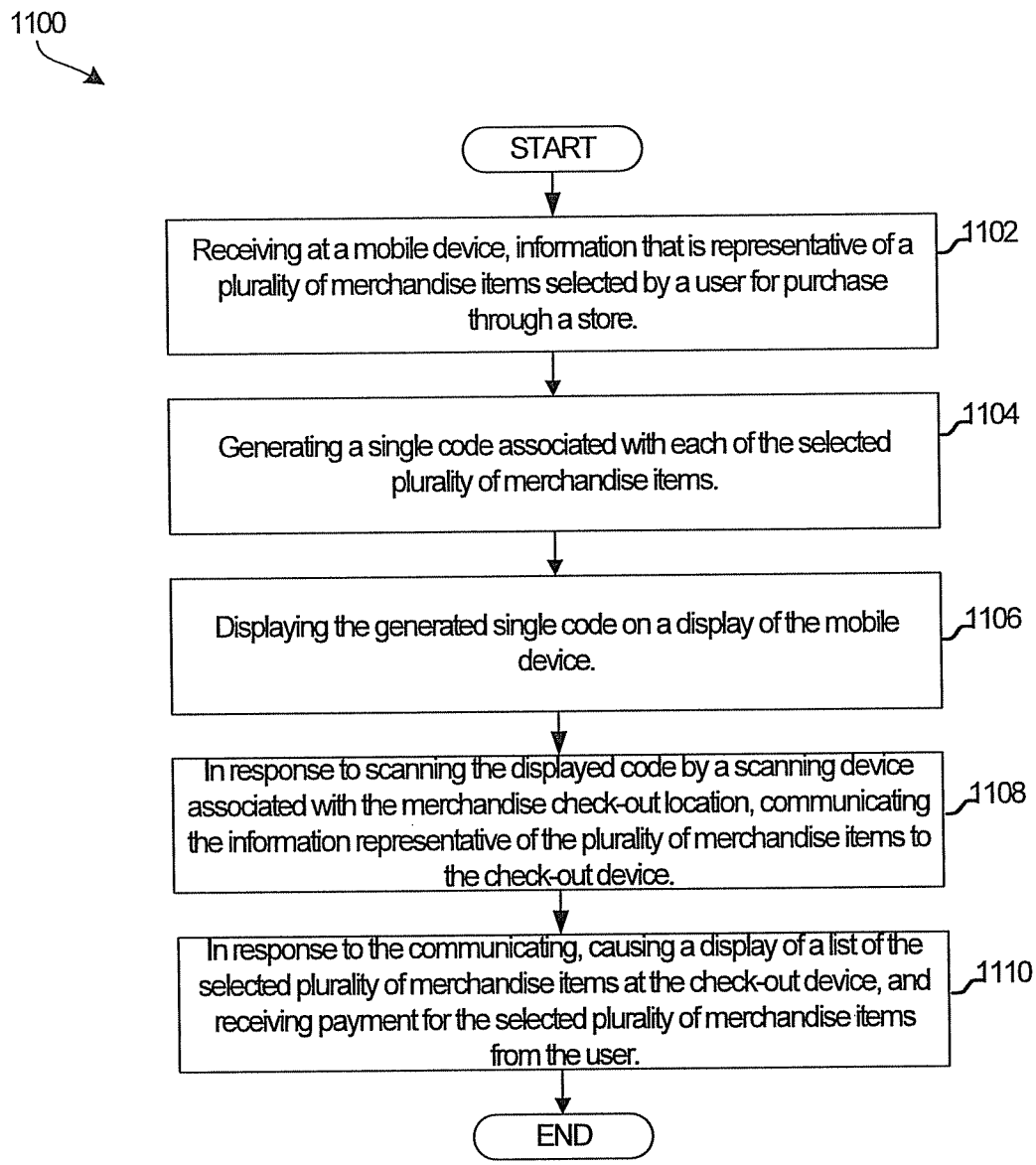
FIG. 11 is a flow chart illustrating example steps of another method for providing a scan, try and/or buy experience, in accordance with an example embodiment of the disclosure.

FIG. 11 is a flow chart illustrating example steps of another method for providing a scan, try and/or buy experience, in accordance with an example embodiment of the disclosure. Referring to FIG. 11, the example method 1100 may start at 1102, when information that is representative of a plurality of merchandise items (e.g., QR codes scanned from product tags of products) selected by a user for purchase through a store may be received at a mobile device (e.g., 200 or 20). At 1104, a single code associated with each of the selected plurality of merchandise items (e.g., code 302*z* in FIG. 3AA) may be generated. At 1106, the generated single code may be displayed on a display of the mobile device. At 1108, in response to scanning the displayed code by a scanning device (e.g., 304*z* in FIGS. 3Z-3AA) associated with the merchandise check-out location, the information representative of the plurality of merchandise items (e.g., the shopping list of items 302*q*-304*q* in FIG. 3Q) may be communicated to the check-out device (304*z*). At 1110, in response to the communicating, a list of the selected plurality of merchandise items may be displayed at the check-out device, and payment for the selected plurality of merchandise items may be received from the user.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method, comprising:
    receiving, via a first processor in a vendor system server as part of a retail computer network environment, from a camera of a mobile device, information that is representative of a clothing outfit located in a display area of a store, wherein:
        the clothing outfit comprises a plurality of merchandise items with corresponding individual codes available for individual purchase through a store; and
        the information is obtained by the mobile device by scanning a single code associated with the clothing outfit;
    based on the single code associated with the clothing outfit, configuring at least one user interface element of a graphical user interface of the mobile device so that the graphical user interface can display product information, a product review, and a product video related to the clothing outfit on the mobile device when one or more of the at least one user interface element are selected;
    using, via a display and a second processor of the mobile device, the obtained information to cause the at least one user interface element associated with the clothing outfit to be displayed on the mobile device;
    receiving, via a third processor of a host server system as part of the retail computer network environment, a first selection from the mobile device of the at least one user interface element indicating that a customer wants to try on the plurality of merchandise items, wherein the first selection is received before assigning a fitting room within the store;
    placing, via the display and the second processor of the mobile device on a list in an electronic shopping cart displayed on the graphical user interface, the plurality of merchandise items that the customer indicated that the customer wants to try on;
    in response to receiving the first selection from the mobile device of the at least one user interface element,
        assigning, via the third processor of the host server system, a fitting room for receiving the plurality of merchandise items associated with the clothing outfit; and
        triggering, via the third processor of the host server system, the delivery of the plurality of merchandise items associated with the clothing outfit from a storage area of the store to the fitting room of the store;
    removing, via the second processor of the mobile device, from the list in the electronic shopping cart displayed on the graphical user interface, any of the plurality of merchandise items that the customer initiates a return of the merchandise item back to the storage area of the store;
    in response to receiving a second selection from the mobile device of the at least one user interface element, triggering, via the third processor of the host server system, a delivery of the plurality of merchandise items associated with the clothing outfit that are listed in the electronic shopping cart to a merchandise check-out location within the store, wherein the merchandise check-out location comprises a check-out scanner or associate mobile device, and wherein the merchandise check-out location is operable to receive payment from the user for the clothing outfit.

2. The method according to claim 1, wherein the single code comprises one of a Quick Response (QR) code, a Universal Product Code (UPC), or a Near Field Communication (NFC) tag.

3. The method according to claim 1, comprising:
    displaying a representation of each of the plurality of merchandise items on the mobile device.

4. The method according to claim 3, comprising:
    displaying the at least one user interface element for each of the plurality of merchandise items.

5. The method according to claim 3, comprising:
    upon scanning the single code, displaying one or more of product demonstration information, product review information, and/or at least one product view associated with the at least one of the plurality of merchandise items.

6. The method according to claim 1, comprising:
    receiving a selection of one or more of product quantity, product size, product color, product shipping preference, and/or product pick-up preference for each of the plurality of merchandise items, using the at least one interface element.

7. The method according to claim 1, comprising:
    in response to receiving a selection from the mobile device of the at least one user interface element, causing shipment of the plurality of merchandise items associated with the clothing outfit to a shipping location associated with the user.

8. A non-transitory, machine-readable storage medium, having stored thereon a computer program having at least one code section, the at least one code section executable by a machine for causing the machine to perform operations comprising:
    receiving, via a first processor in a vendor system server as part of a retail computer network environment, from a camera of a mobile device, information that is representative of a clothing outfit located in a display area of a store, wherein:
        the clothing outfit comprises a plurality of merchandise items with corresponding individual codes available for individual purchase through a store; and
        the information is obtained by the mobile device by scanning a single code associated with the clothing outfit;
    based on the single code associated with the clothing outfit, configuring at least one user interface element of a graphical user interface of the mobile device so that the graphical user interface can display product information, a product review, and a product video related to the clothing outfit on the mobile device when one or more of the at least one user interface element are selected;
    using, via a display and a second processor of the mobile device, the obtained information to cause the at least one user interface element associated with the clothing outfit to be displayed on the mobile device;
    receiving, via a third processor of a host server system as part of the retail computer network environment, a first selection from the mobile device of the at least one user interface element indicating that a customer wants to try on the plurality of merchandise items, wherein the first selection is received before assigning a fitting room within the store;

placing, via the display and the second processor of the mobile device on a list in an electronic shopping cart displayed on the graphical user interface, the plurality of merchandise items that the customer indicated that the customer wants to try on;

in response to receiving the first selection from the mobile device of the at least one user interface element, assigning, via the third processor of the host server system, a fitting room for receiving the plurality of merchandise items associated with the clothing outfit; and triggering, via the third processor of the host server system, the delivery of the plurality of merchandise items associated with the clothing outfit from a storage area of the store to the fitting room of the store;

removing, via the second processor of the mobile device, from the list in the electronic shopping cart displayed on the graphical user interface, any of the plurality of merchandise items that the customer initiates a return of the merchandise item back to the storage area of the store;

in response to receiving a second selection from the mobile device of the at least one user interface element, triggering, via the third processor of the host server system, a delivery of the plurality of merchandise items associated with the clothing outfit that are listed in the electronic shopping cart to a merchandise check-out location within the store, wherein the merchandise check-out location comprises a check-out scanner or associate mobile device, and wherein the merchandise check-out location is operable to receive payment from the user for the clothing outfit.

9. The non-transitory, machine-readable storage medium according to claim 8, wherein the single code comprises one of a Quick Response (QR) code, a Universal Product Code (UPC), or a Near Field Communication (NFC) tag.

10. The non-transitory, machine-readable storage medium according to claim 8, wherein the at least one code section comprises code for:
displaying a representation of each of the plurality of merchandise items on the mobile device.

11. The non-transitory, machine-readable storage medium according to claim 10, wherein the at least one code section comprises code for:
displaying the at least one user interface element for each of the plurality of merchandise items.

12. The non-transitory, machine-readable storage medium according to claim 10, wherein the at least one code section comprises code for:
upon scanning the single code, displaying one or more of product demonstration information, product review information, and/or at least one product view associated with the at least one of the plurality of merchandise items.

13. The non-transitory, machine-readable storage medium according to claim 8, wherein the at least one code section comprises code for:
receiving a selection of one or more of product quantity, product size, product color, product shipping preference, and/or product pick-up preference for each of the plurality of merchandise items, using the at least one interface element.

14. The non-transitory, machine-readable storage medium according to claim 8, wherein the at least one code section comprises code for:
in response to receiving a selection from the mobile device of the at least one user interface element, causing shipment of the plurality of merchandise items associated with the clothing outfit to a shipping location associated with the user.

15. The method according to claim 1, wherein the selection that causes the delivery of the plurality of merchandise items associated with the clothing outfit to the fitting room within the store occurs during shopping within the store.

16. The method of claim 1, wherein the information representative of the clothing outfit is sent by the mobile device from within the store.

17. The method of claim 1, wherein the plurality of merchandise items are represented by a second single code, which is different from the single code scanned by the mobile device, for use during check-out.

18. The method according to claim 1, comprising:
displaying a second single code on the mobile device that is scanned at the merchandise check-out location within the store.

19. The method according to claim 1, wherein causing the delivery of the plurality of merchandise items to the fitting room includes causing the delivery of the plurality of merchandise items through a chute in the fitting room.

20. The method according to claim 1, comprising:
scanning the single code on a physical tag attached to the clothing outfit to indicate that the customer wants to try on the plurality of merchandise items.

* * * * *